(12) United States Patent
Nagahama et al.

(10) Patent No.: US 9,575,526 B2
(45) Date of Patent: Feb. 21, 2017

(54) ELECTRONIC DEVICE HAVING POWER GENERATION FUNCTION, CONTROL METHOD OF ELECTRONIC DEVICE HAVING POWER GENERATION FUNCTION, AND PORTABLE ELECTRONIC DEVICE HAVING POWER GENERATION FUNCTION, AND CONTROL METHOD OF PORTABLE ELECTRONIC DEVICE HAVING POWER GENERATION FUNCTION

(71) Applicant: SEIKO EPSON CORPORATION, Tokyo (JP)

(72) Inventors: Reiko Nagahama, Nagano (JP); Keiichi Mukaiyama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 509 days.

(21) Appl. No.: 14/109,351

(22) Filed: Dec. 17, 2013

(65) Prior Publication Data

US 2014/0172181 A1 Jun. 19, 2014

(30) Foreign Application Priority Data

Dec. 19, 2012 (JP) ................................ 2012-277363
Dec. 19, 2012 (JP) ................................ 2012-277364

(51) Int. Cl.
*G05D 3/12* (2006.01)
*G06F 1/26* (2006.01)
(Continued)

(52) U.S. Cl.
CPC ................ *G06F 1/26* (2013.01); *G04C 10/00* (2013.01); *G06F 1/3206* (2013.01); *G06F 1/3212* (2013.01)

(58) Field of Classification Search
CPC .................... H04W 52/0258; H04W 52/0251; H04W 52/0261; H04W 52/226; H04W 52/0277; G06F 1/3203; G06F 1/32; G06F 9/4418

See application file for complete search history.

(56) References Cited

U.S. PATENT DOCUMENTS 6,061,304 A  5/2000  Nagata et al.
6,320,822 B1 11/2001 Okeya et al.
(Continued)

FOREIGN PATENT DOCUMENTS

JP  2000-230988 A   8/2000
JP  2000-356690 A  12/2000
(Continued)

*Primary Examiner* — Darrin Dunn
(74) *Attorney, Agent, or Firm* — Global IP Counselors, LLP

(57) ABSTRACT

An electronic device is equipped with power generating means (unit), a secondary battery, a device, charging detection means (unit), battery voltage detection means (unit), and a time display control means (unit). The time display control means (unit) is equipped with an operation suspension portion, an operation resumption portion, a timer, a persistence display control portion and a timer updating portion. The timer updating portion updates the remaining time of the timer to the persistence time according to the detected voltage detected by the battery voltage detection means (unit) is longer than the remaining time, and operates the timer in operation as it is when the persistence time according to the detected voltage is equal to or less than the remaining time of the timer in operation.

14 Claims, 26 Drawing Sheets

(51) Int. Cl.
*G04C 10/00* (2006.01)
*G06F 1/32* (2006.01)

(56) References Cited

U.S. PATENT DOCUMENTS

| | | | | |
|---|---|---|---|---|
| 6,571,343 | B1* | 5/2003 | Johnson | G06F 1/28 |
| | | | | 713/340 |
| 6,580,665 | B1 | 6/2003 | Kamiyama et al. | |
| 6,586,911 | B1* | 7/2003 | Smith | G06F 1/3203 |
| | | | | 320/134 |
| 6,628,572 | B1 | 9/2003 | Yabe et al. | |
| 6,694,156 | B2* | 2/2004 | Seo | H04W 88/02 |
| | | | | 455/343.5 |
| 6,710,578 | B1* | 3/2004 | Sklovsky | H04W 52/0264 |
| | | | | 320/127 |
| 6,992,464 | B2* | 1/2006 | Takano | H02J 7/047 |
| | | | | 320/150 |
| 7,389,439 | B2* | 6/2008 | Yoon | G06F 1/3203 |
| | | | | 713/300 |
| 7,546,477 | B2* | 6/2009 | Breen | G01S 5/0294 |
| | | | | 320/132 |
| 7,729,207 | B2* | 6/2010 | Kawaguchi | G04C 10/04 |
| | | | | 368/204 |
| 7,933,168 | B2 | 4/2011 | Kawaguchi | |
| 2004/0017180 | A1* | 1/2004 | Cook | G01R 31/3648 |
| | | | | 320/132 |
| 2004/0139134 | A1* | 7/2004 | Feather, Jr. | G06F 11/3433 |
| | | | | 708/300 |
| 2005/0022039 | A1* | 1/2005 | Inui | G06F 1/3203 |
| | | | | 713/300 |
| 2005/0066208 | A1* | 3/2005 | Koie | B41J 29/393 |
| | | | | 713/320 |
| 2006/0279256 | A1* | 12/2006 | Bletsas | H02J 7/0047 |
| | | | | 320/128 |
| 2007/0149256 | A1* | 6/2007 | Burgan | H04W 52/0254 |
| | | | | 455/574 |
| 2007/0198869 | A1* | 8/2007 | Miyazaki | G06F 9/4825 |
| | | | | 713/500 |
| 2007/0210754 | A1* | 9/2007 | Sato | G01R 31/3637 |
| | | | | 320/127 |
| 2008/0225647 | A1* | 9/2008 | Kawaguchi | G04C 10/04 |
| | | | | 368/66 |
| 2008/0225648 | A1* | 9/2008 | Kawaguchi | G04C 10/04 |
| | | | | 368/66 |
| 2009/0177505 | A1* | 7/2009 | Dietrich | G06Q 10/06375 |
| | | | | 705/7.37 |
| 2009/0300669 | A1* | 12/2009 | Wright | G06Q 30/02 |
| | | | | 725/10 |
| 2010/0284316 | A1* | 11/2010 | Sampathkumar | H04W 52/0216 |
| | | | | 370/311 |
| 2010/0304779 | A1* | 12/2010 | Andrews | H04W 52/287 |
| | | | | 455/522 |
| 2010/0315249 | A1* | 12/2010 | Imai | G06F 1/263 |
| | | | | 340/636.12 |
| 2011/0072280 | A1* | 3/2011 | Chiasson | G06F 1/30 |
| | | | | 713/300 |
| 2011/0136437 | A1* | 6/2011 | Zhao | G01R 31/3689 |
| | | | | 455/41.2 |
| 2011/0261706 | A1* | 10/2011 | Fujiwara | H04B 3/54 |
| | | | | 370/252 |
| 2011/0312385 | A1* | 12/2011 | Lee | H04W 52/0277 |
| | | | | 455/566 |
| 2012/0040650 | A1* | 2/2012 | Rosen | H04M 3/2218 |
| | | | | 455/414.1 |
| 2012/0054790 | A1* | 3/2012 | Kim | H04N 21/414 |
| | | | | 725/30 |
| 2012/0131367 | A1* | 5/2012 | Kamijima | H02J 7/0021 |
| | | | | 713/323 |
| 2012/0157755 | A1* | 6/2012 | D'Ambrosio | A61M 1/1086 |
| | | | | 600/16 |
| 2012/0204046 | A1* | 8/2012 | Baba | G06F 1/3231 |
| | | | | 713/323 |
| 2013/0036428 | A1* | 2/2013 | Lei | G06F 1/3206 |
| | | | | 719/318 |
| 2013/0067256 | A1* | 3/2013 | Shiraishi | G01R 31/3606 |
| | | | | 713/320 |
| 2013/0097447 | A1* | 4/2013 | Park | G06F 1/3246 |
| | | | | 713/323 |
| 2015/0303728 | A1* | 10/2015 | Miura | H01M 10/48 |
| | | | | 320/119 |

FOREIGN PATENT DOCUMENTS

| | | |
|---|---|---|
| JP | 2006-284607 A | 10/2006 |
| JP | 2008-224544 A | 9/2008 |
| JP | 2008-224545 A | 9/2008 |
| JP | 2008-241540 A | 10/2008 |
| JP | 2011-149848 A | 8/2011 |
| WO | 98/06013 A1 | 2/1998 |
| WO | 99/27423 A1 | 6/1999 |
| WO | 00/13066 A1 | 3/2000 |
| WO | 00/59091 A1 | 10/2000 |

* cited by examiner

ELECTRONIC DEVICE HAVING POWER GENERATION FUNCTION, CONTROL METHOD OF ELECTRONIC DEVICE HAVING POWER GENERATION FUNCTION, AND PORTABLE ELECTRONIC DEVICE HAVING POWER GENERATION FUNCTION, AND CONTROL METHOD OF PORTABLE ELECTRONIC DEVICE HAVING POWER GENERATION FUNCTION

CROSS-REFERENCE TO RELATED APPLICATIONS

This application claims priority to Japanese Patent Application No. 2012-277363 filed on Dec. 19, 2012 and Japanese Patent Application No. 2012-277364 filed on Dec. 19, 2012. The entire disclosure of Japanese Patent Application Nos. 2012-277363 and 2012-277364 is hereby incorporated herein by reference.

BACKGROUND

Technical Field

The present invention relates to an electronic device having a power generation function, a control method of an electronic device having a power generation function, a portable electronic device having a power generation function, and a control method of an electronic device having a power generation function.

Background Technology

A watch having a power generation function has become widely used because of having an advantage that no battery replacement is required. In an electronic timepiece having a power generation function, an electric power generated by a power generation means is used by being charged in an electric storage means. Therefore, when not generating an electric power, utilizing the power stored in the electric storage means, the operation of pointers, etc., is performed.

In such an electronic timepiece having a power generation function, an electronic timepiece enhanced in convenience has been known, in which when the voltage of the electric storage means is low, the operation of pointers of the timepiece is suspended; when a power generation state is detected during suspension of the operation of the pointers, the initial voltage at that time is detected; when the initial voltage is higher than an operation resuming voltage, the operation of the pointers is continued for a preliminarily set period of time even if power generation is suspended thereafter. (See Patent Document 1)

Japanese Laid-open Patent Publication No. 2011-149848 (Patent Document 1) is an example of the related art.

SUMMARY

Problems to be Solved by the Invention

In the aforementioned Patent Document 1, when the voltage of the electric storage means (unit) after passing a predetermined period of time is higher than the initial voltage, the operation of the pointers is transited to a normal operation, and when the voltage is lower than the initial voltage, the operation of the pointers is suspended. For this reason, even in cases where the voltage of the electric storage means (unit) after passing the predetermined period of time is relatively high and the operation of pointers can be continued, when the voltage has been decreased below the initial voltage, the operation of pointers is suspended. This indicates that there is a merit that unnecessary power consumption can be suppressed when the timepiece is not in use. However, it is considered that there is a case in which, when the timepiece is in use, it is necessary to increase the voltage of the power storage means (unit) by power generation, causing deteriorated convenience.

Furthermore, in the aforementioned Patent Document 1, even in cases where an electronic device is seldom used after resuming the operation upon detection of power generation, the operation of the pointers is continued until a predetermined period of time has passed. Therefore, there is a possibility that the electric power of the power storage means (unit) is consumed uselessly.

A first advantage of the invention is to provide an electronic device having a power generation function capable of appropriately adjusting an operation persistence time depending on a voltage of the power storage means (unit) when charging is detected to enhance convenience and also to provide a control method of an electronic device having a power generating function. A second advantage of the invention is to provide a portable electronic device having a power generation function capable of suppressing useless power consumption of a power storage means (unit) and also to provide a control method of the portable electronic device having a power generation function.

Means Used to Solve the Above-Mentioned Problems

The invention includes power generation means (unit); power storage means (unit) for storing electric energy generated by the power generation means (unit); a device which is operated by the electric energy stored in the power storage means (unit); charge detection means (unit) for detecting a charging state from the power generation means (unit) to the power storage means (unit); voltage detection means (unit) for detecting a voltage of the power storage means (unit); display operation means (unit) for instructing a display of an operation persistence time of the device; persistence time display means (unit) for displaying the operation persistence time of the device; and operation control means (unit) for controlling an operation status of the device, wherein the operation control means (unit) includes: an operation suspension portion for controlling the device into an operation suspension state; an operation resuming portion for resuming an operation of the device when the device is in the suspension state; persistence time display control portion for operating the persistence time display means (unit) to display the operation persistence time when the display operation means (unit) is operated; a timer for timing the remaining time of the operation persistence time; and a timer updating portion for updating the remaining time of the timer when the charging state is detected by the charge detection means (unit) during an operation of the timer; wherein, the operation resuming portion resumes the operation of the device and operates the timer by setting a persistence time according to the detected voltage when a detected voltage detected by the voltage detection means (unit) is higher than the operation resuming voltage at a time of detecting the charging state by the charge detection means (unit), wherein the suspension portion controls the device into the operation suspension state when the remaining time becomes 0 (zero) hour, wherein, the operation duration display control portion displays the operation persistence time according to the detected voltage detected by the voltage detection means (unit) by the persistence time display means (unit) and operates the timer by setting the persistence time when the display operation means (unit) is operated; and wherein the timer updating portion updates the remaining time of the timer to the persistence time according to the detected voltage when the persistence time according to the detected voltage detected by the voltage detection means (unit) is longer than the remaining time of the timer in operation, and operates the timer in operation as it is when the persistence time according to the detected voltage is not longer than the remaining time of the timer in operation.

According to the invention, since the persistence time display control portion and the timer updating portion are equipped, the persistence time display can be performed appropriately, and the suspension of operation in a shorter time than the displayed persistence time can be prevented. When a charging state is detected, the operation persistence time can be appropriately adjusted according to the detected voltage. Thus, the convenience can be enhanced. That is, when the display operation means (unit) is operated, the operation persistence time according to the detected voltage detected by the voltage detection means (unit) is displayed by the persistence time display means (unit). For that reason, when a user wants to check the operation persistence time, the operation persistence time can be appropriately displayed based on the voltage of the power stored at that point. Also, since the timer updating portion will be operated only when a charging state is detected, when a charging state is not detected as in a case in which an electronic device is not used, the timer is not updated by the voltage of the stored power, and therefore, a wasteful consumption of electricity by continuing the operation for more than the set persistence time can be prevented. Therefore, the voltage of the power storage means (unit) can be prevented from decreasing below the operation resuming voltage when the operation is suspended, and the operation can be immediately started at the operation resumption time, which enhances the convenience. Furthermore, since the timer updating portion updates the timer only when the persistence time according to the detected voltage is longer than the remaining time of the timer in operation, the suspension of the operation in a shorter time than the displayed persistence time can be prevented, and therefore the convenience can be enhanced.

In the invention, it is preferable that the operation persistence time is set for every plural voltage ranges preliminarily sectioned, and the operation persistence time corresponding to the detected voltage is the operation persistence time set for a voltage range to which the detected voltage corresponds.

If plural voltage ranges are set and the persistence time is set according to the voltage ranges when setting the persistence time according to the detected voltage, the control can be made easy since the persistence time can be set only by judging which detected voltage corresponds to the voltage ranges. Also, since the persistence time to be set can be reduced to about 3 or 4 types, different pointer operations can be performed for displaying by using a second hand, etc., without using an exclusive persistence time display means (unit).

In the invention, it is preferable that the timer includes a plurality of timers corresponding to the plural voltage ranges, and when setting the persistence time according to the detected voltage, the persistence time is set by combining the timer corresponding to a voltage range in which the detected voltage is included and the timer corresponding to a voltage range lower than the voltage range.

The timer is provided on a one-to-one basis to the voltage ranges. Therefore, for example, if four voltage ranges (first, second, third and fourth voltage ranges) are set, in which the voltage increases sequentially, four timers (first, second, third, and fourth timers) are set corresponding to each voltage range. When the detected voltage corresponds to the third voltage range, the persistence time is set by combining the third timer and the first and second timers corresponding to the first and second voltage ranges that are lower voltage ranges than the third voltage range. In this case, if the first timer times 1 day, the second timer times 6 days, and the third timer times 23 days, a total of 30 days of persistence time is set by the first to third timers. In this way, when a plurality of timers are prepared and linked to set the persistence time, the design structure of the timer can be simplified as compared to a case in which only one timer is provided to set different persistence times.

In the invention, it is preferable that the timer is equipped with a timer for timing the remaining time of a normal operation mode and a timer for timing the remaining time of a BLD operation mode which issues a warning a low voltage state, the operation control means (unit) operates the device in the BLD operation mode when the remaining time of the timer for timing the remaining time of the normal operation mode becomes 0 (zero) hour, and the operation suspension portion controls the device into an operation suspension state when the remaining time of the timer for timing the remaining time of the BLD operation mode becomes 0 (zero) hour.

If providing a BLD operation mode, the operation can be suspended after issuing a warning to the user that the voltage of the power storage means (unit) is decreased when the remaining time of the persistence time becomes 0 hours, instead of suddenly suspending the operation. Therefore, the user can operate a power generation operation using the power generating means (unit) to thereby prevent the suspension of operation, which enhances the convenience.

In the invention, the device is a time display means (unit) for displaying a time, and it is preferable that the operation control means (unit) continues the operation of the timer even when it becomes a time correction state for correcting a time to be displayed by the time display means (unit).

According to the invention, even when the electronic device becomes unattended in a time correction state, the timer continues to operate and the operation is suspended when the persistence time becomes 0 (zero), so the voltage of the power storage means (unit) can be prevented from decreasing significantly.

The invention includes a control method of an electronic device having power generating functions, including: a power generation means (unit); power storage means (unit) for storing electric energy generated by the power generation means (unit); a device which is operated by the electric energy stored in the electric storage means (unit); charge detection means (unit) for detecting a charging state from the power generation means (unit) to the power storage means (unit); voltage detection means (unit) for detecting a voltage of the power storage means (unit); display operation means (unit) for instructing a display of a persistence time of the device; persistence time display means (unit) for displaying the persistence time of the device; and operation control means (unit) for controlling the operation status of the device; wherein the operation control means (unit) is equipped with a timer for timing a remaining time of the persistence time, and executes: when the display operation means (unit) is operated, persistence time display processing for displaying the persistence time according to the detected voltage detected by the voltage detection means (unit) by the persistence time display portion and operating the timer by setting the persistence time; timer updating processing for updating the remaining time of the timer to a persistence time according to the detected voltage when the persistence time according to the detected voltage detected by the voltage detection means (unit) is longer than the remaining time of the timer in operation, and for operating the timer in operation as it is when the persistence time according to the detected voltage is equal to or less than the remaining time of the timer in operation; operation suspension processing for controlling the device into an operation suspension state when the remaining time of the timer becomes 0 (zero); and when the detected voltage detected by the voltage detection means (unit) is larger than the operation resuming voltage at a time of detecting the charging state by the charge detection means (unit), operation resumption processing for resuming the operation of the device and operates the timer by setting the persistence time according to the detected voltage. According to the invention, it can exert the same functions and effects as the aforementioned electronic device having a power generating function.

The invention includes a portable electronic device having a power generation function for portable use, including: a power generation means (unit); power storage means (unit) for storing electric energy generated by the power generation means (unit); a device which is operated by the electric energy stored in the electric storage means (unit); charge detection means (unit) for detecting a charging state from the power generation means (unit) to the power storage means (unit); and operation control means (unit) for controlling the operation state of the device, wherein the operation control means (unit) includes: an operation suspension portion for controlling the device into an operation suspension status; an operation resumption portion for resuming an operation of the device when the device is in the suspension status; a timer capable of setting the persistence time of the device and configured to time a remaining time of the persistence time; a carrying amount detection portion for detecting a carrying amount at the time of resuming the operation of the device; and a persistence time adjusting portion for adjusting the persistence time of the timer at the time of resuming the operation of the device, wherein the operation suspension portion controls the device into the operation suspension status when the remaining time becomes 0 (zero), wherein the operation resumption portion resumes the operation of the device when the charging state is detected by the charge detection means (unit), wherein the persistence time adjusting portion sets the persistence time to the timer when the carrying amount detected by the carrying amount detection portion becomes a predetermined value.

According to the invention, the invention is provided with a carrying amount detection portion and a persistence time adjusting portion, and when charging state is detected and the operation is resumed from a suspension state, a persistence time according to the carrying amount is set to the timer after the carrying amount has reached the predetermined value. The carrying amount is a parameter corresponding to the length of time in which it is judged that the user is portably using the electronic device having a power generation function. Specifically, when the power generation means (unit) generates power in a carried state, the carrying amount can be determined by the time of the charging status from the power generation means (unit) to the power storage means (unit). Also, when power can be generated by oscillating the portable electronic device having a power generation function, the carrying amount can be determined by counting the amount of oscillation. That is, the carrying amount is not only the time that the device was actually being carried, but can be detected by converting to the amount of power generated while being carried.

According to the invention, when the operation is resumed after detection of a charge, the carrying amount is detected by the carrying amount detection portion. Also, the persistence time adjusting portion sets the predetermined persistence time after the carrying amount becomes a predetermined value, e.g., a carrying amount longer than 6 hours, and is thereby judged that the user is portably using the electronic device. Therefore, long persistence time can be prevented from being set only by a temporary detection of a charging state, and the electricity of the power storage means (unit) can be prevented from being wastefully consumed.

In the invention, it is preferable that a voltage detection means (unit) for detecting the voltage of the power storage means (unit) is provided, and that the persistence time adjusting portion sets the persistence time set for the timer in plural steps based on the detected voltage detected by the voltage detection means (unit) and the carrying amount.

If the persistence time adjusting portion can set the persistence time set for the timer in plural steps based on the detected voltage and the carrying amount, a persistence time of an appropriate length can be set as compared to a case in which the persistence time is set in one step.

In the invention, it is preferable that voltage detection means (unit) for detecting the voltage of the power storage means (unit) is provided, wherein the persistence time is set every plural voltage ranges preliminarily sectioned, and wherein the operating resumption portion sets the timer to a shortest persistence time when the detected voltage detected by the voltage detection means (unit) at a time of detecting the charging state by the charge detection means (unit) corresponds to a first voltage range corresponding to the shortest persistence time, and operates the persistence time adjusting portion when the detected voltage corresponds to a voltage range higher than the first voltage range.

According to the invention, when a persistence time is capable of being set in plural steps according to the voltage range to which the detected voltage corresponds, the persistence time adjusting portion is always in operation when a persistence time other than the shortest persistence time is set. If the persistence time is set based on the detected voltage, even when a power is temporarily generated by a carrying motion, if the voltage of the suspension power storage means (unit) is high, the persistence time is set as a long time period and therefore electricity is wastefully consumed. On the other hand, in the invention, even if the detected voltage is at a voltage level in which a persistence time other than the shortest persistence time can be set, since the persistence time is not set until the carrying amount becomes a predetermined value, a long persistence time can be prevented from being set by a temporary power generation, and therefore wasteful electricity consumption can be controlled.

In the invention, it is preferable that the carrying amount detection portion divides one day into a plural time periods from the operating resumption time as a starting point, and when the charging state is detected plural times by the charge detection means (unit) in a time period, it sets the time period as a carrying state detection time period. Also, the carrying amount detection portion judges that there is one day's carrying amount when there exists more than a predetermined number of carrying state detection time period in one day, and the persistence time adjusting portion sets the persistence time to the timer when the number of days of carrying amount reaches the preliminarily set predetermined value.

In the invention, the carrying amount detection portion divides one day into a plural time periods, and when a charging state is detected plural times in each time period, the time period is set as the carrying amount detection time period in which the electronic device was being carried. Therefore, a possibility of an erroneous judgment can be made low in which a charge detection by a sporadic movement that changes the placement of the electronic device is erroneously judged to be a carrying state. Furthermore, since it is judged that one day's carrying amount exists when more than a predetermined number of carrying state detection time range exists, the user's carrying state can be accurately determined. That is, when the user is portably carrying the electronic device, in view of the user's general activity time, a charging state can be detected for around 7 hours of carrying. Therefore, if the length of the time period is set to 3 hours and a carrying state is detected in three time periods, it can be accurately determined that the electronic device has been carried for 7 or more hours, which enables a correct judgment that there is one day's carrying amount. Also, in the invention, when the carrying amount detected by the carrying amount detection portion reaches a preliminarily set predetermined value, such as 2 days or 7 days, an appropriate persistence time can be set by setting the timer to a persistence time according to the predetermined value, e.g., when the carrying amount is 2 days, the persistence time can be set to 7 days, and when the carrying amount is 7 days, the persistence time can be set to 30 days.

In the invention, it is preferable that the charge detection means (unit) is constituted so as to be able to detect a continuous charging state from the power generation means (unit) to the power storage means (unit) and that the carrying amount detection portion detects the carrying amount based on a length of the detected time of the continuous charging state. The detection of continuous charging state means (unit) that, for example, when charge detection is performed in one second intervals, a charging state can be detected continuously in charge detecting timings of one second intervals. That is, when a time in which charging is not detected continues for longer than the set time, it can be judged that a continuous charging state is detected. Therefore, when the power storage means (unit) is quick charged using a charger or the power storage means (unit) is quick charged by operating the power generation device by manual operation, a continuous charging state is detected.

According to the invention, the carrying amount detection portion detects the carrying amount based on the length of time in which a continuous charging state is detected by the charge detection means (unit). Also, the persistence time adjusting portion sets the persistence time based on the length of detection time of the carrying amount, that is, the continuous charging state. For example, when a self-winding power generation means (unit) using a rotor capable of generating a power by hand operation is provided, in a case in which the user is performing quick charging by intentionally shaking by hand, or quick charging is performed using a charger, by detecting the charge time, the carrying amount can be detected appropriately. That is, in a self-winding power generation means (unit) using a rotor, if a user is carrying it, a power can be generated automatically without the user being specifically conscious of it, or a power can also be generated when the user intentionally shakes it by hand. For example, the amount of generated power corresponding to the self-winding power generation when the device was carried for one day can be obtained if the user intentionally and continuously shakes the device by hand for a number of minutes. Therefore, the convenience can be enhanced when the user, for example, performs a shaking operation by hand corresponding to 1 or 7 days' carrying amount at the time of resuming the operation to thereby upgrade the persistence time to a longer time at an early stage. Similarly, in cases where a charger is used in which a magnetic field is generated to generate an electric flow to a power generating coil as a power generating means (unit) to thereby charge the power storage means (unit), since the user can set a time in which an amount of charge (amount of power generation) corresponding to, e.g., 1 or 7 days of carrying amount can be obtained, the persistence time can be upgraded to a longer time promptly, and its convenience can be enhanced.

In the invention, it is preferable that the aforementioned timer is equipped with a timer for timing a remaining time of a normal operation mode and a timer for timing a remaining time of a BLD operation mode which issues a warning of a low voltage state, wherein the operation control means (unit) operates the device in the BLD operation mode when the remaining time of the timer for timing the remaining time of the normal operation mode becomes 0 (zero) hour and the carrying amount detected by the carrying amount detection portion is below the predetermined value, and wherein the operation suspension portion controls the device into the operation suspension state when the timer for timing the remaining time of the BLD mode becomes 0 (zero) hour, and wherein the persistence time adjusting portion is operated when a charging state is detected during the BLD operation mode.

If the BLD operation mode is provided, the operation can be suspended after the user is warned that the voltage of the power storage means (unit) has decreased when the remaining time of the persistence time becomes 0 (zero) hour, instead of suddenly shutting down the operation. Therefore, the convenience can be enhanced and the user can prevent the suspension of operation by performing a power generation operation by a power generation means (unit). Furthermore, this convenience can be enhanced since the persistence time adjusting portion is operated when a charging state is detected during the BLD operation mode, the user can perform a power generating operation and transit to the persistence time adjusting processing upon checking that the BLD operation mode is in operation. In the invention, it is preferable that the device is a time display means (unit) for displaying a time, and the operation control means (unit) continues the operation of the timer even when it becomes a time correction state in which a time to be displayed by the time display means (unit) is to be corrected.

In the invention, even if the electronic device is left unattended in a time correction state, since the timer continues to operate and the operation is suspended when the persistence time becomes 0 (zero) hour, the voltage of the power storage means (unit) can be prevented from decreasing significantly.

The invention includes a control method of a portable electronic device having power generation function for portable use, the portable electronic device including: power generation means (unit); power storage means (unit) for storing electric energy generated by the power generation means (unit); a device which is operated by the electric energy stored in the electric storage means (unit); charge detection means (unit) for detecting a charging state from the power generation means (unit) to the power storage means (unit); and operation control means (unit) for controlling the operation state of the device, wherein the operation control means (unit) is equipped with a timer capable of setting the persistence time and configured to time a remaining time thereof, and executes: operation suspension processing for controlling the device into an operation suspension state when the remaining time of the timer becomes 0 (zero); and persistence time adjusting processing for resuming the operation of the device when the charging state is detected by the charge detection means (unit) and setting the persistence time to the timer when the carrying amount becomes a predetermined value by detecting the carrying amount. According to the invention, the same effects as the portable electronic device having a power generation function can be exerted.

BRIEF DESCRIPTION OF THE DRAWINGS

Referring now to the attached drawings which form a part of this original disclosure.

DETAILED DESCRIPTION OF EXEMPLARY EMBODIMENTS

An embodiment in which an electronic device having a power generation function according to the invention is applied to an electronic timepiece 1 will be explained with reference to drawings.

[Overall Structure of Electronic Timepiece]

Figure 1:
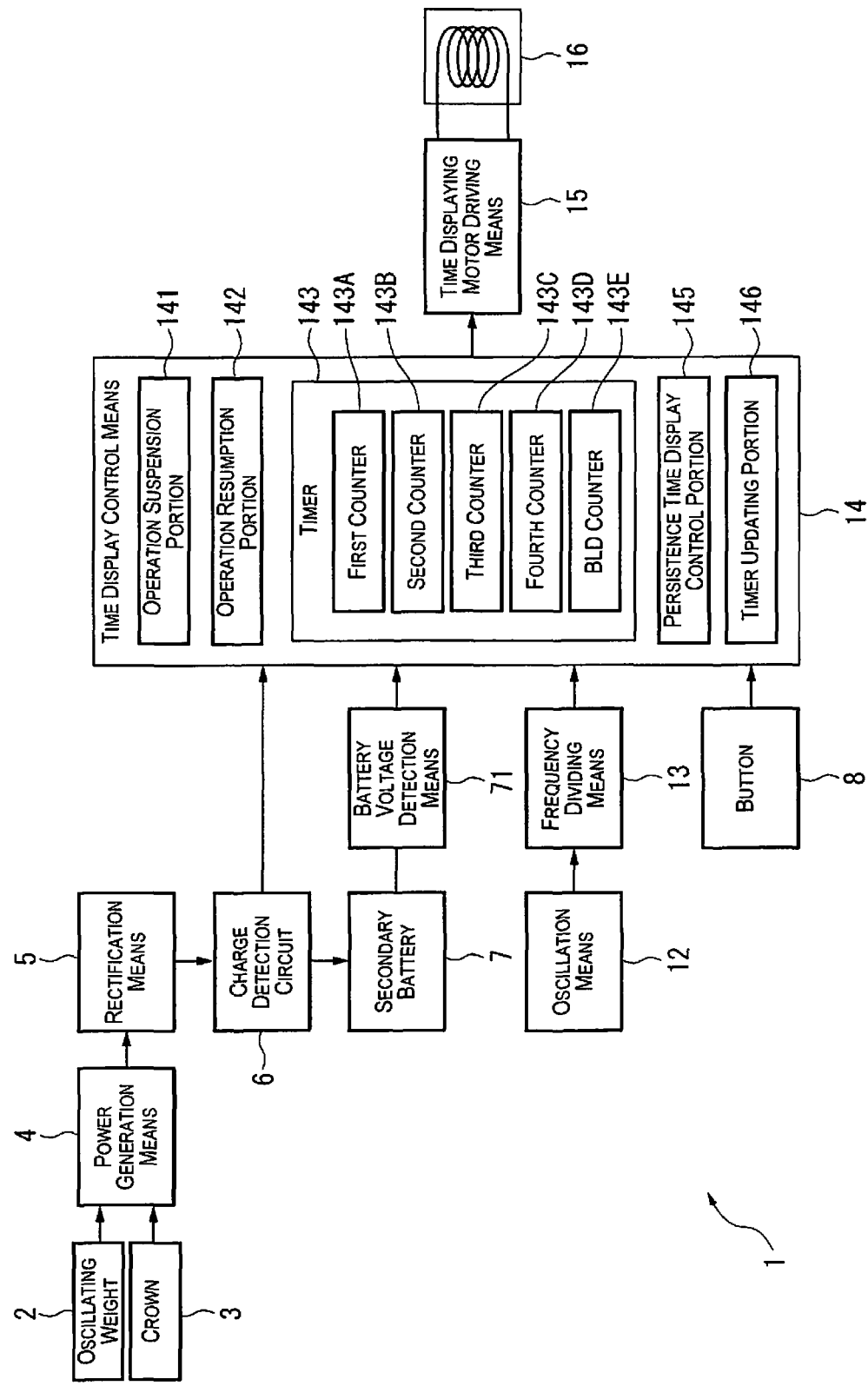
FIG. 1 is a block diagram showing a structure of an electronic timepiece as an electronic device having a power generation function.

The electronic timepiece 1, as shown in FIG. 1, is provided with an oscillating weight 2, a crown 3, a power generation means (unit) 4, a rectification means (unit) 5, a charge detection means (unit) 6, a secondary battery 7 as a power storage means (unit), a button 8 as a display operation means (unit), an oscillation means (unit) 12, a frequency dividing means (unit) 13, a time display control means (unit) 14 as an operation control means (unit), a time displaying motor driving means (unit) 15, and a time displaying motor 16. The electronic timepiece 1 is further provided with a battery voltage detection means (unit) 71 as a voltage detection means (unit) for detecting the voltage of the secondary battery 7.

Figure 2:
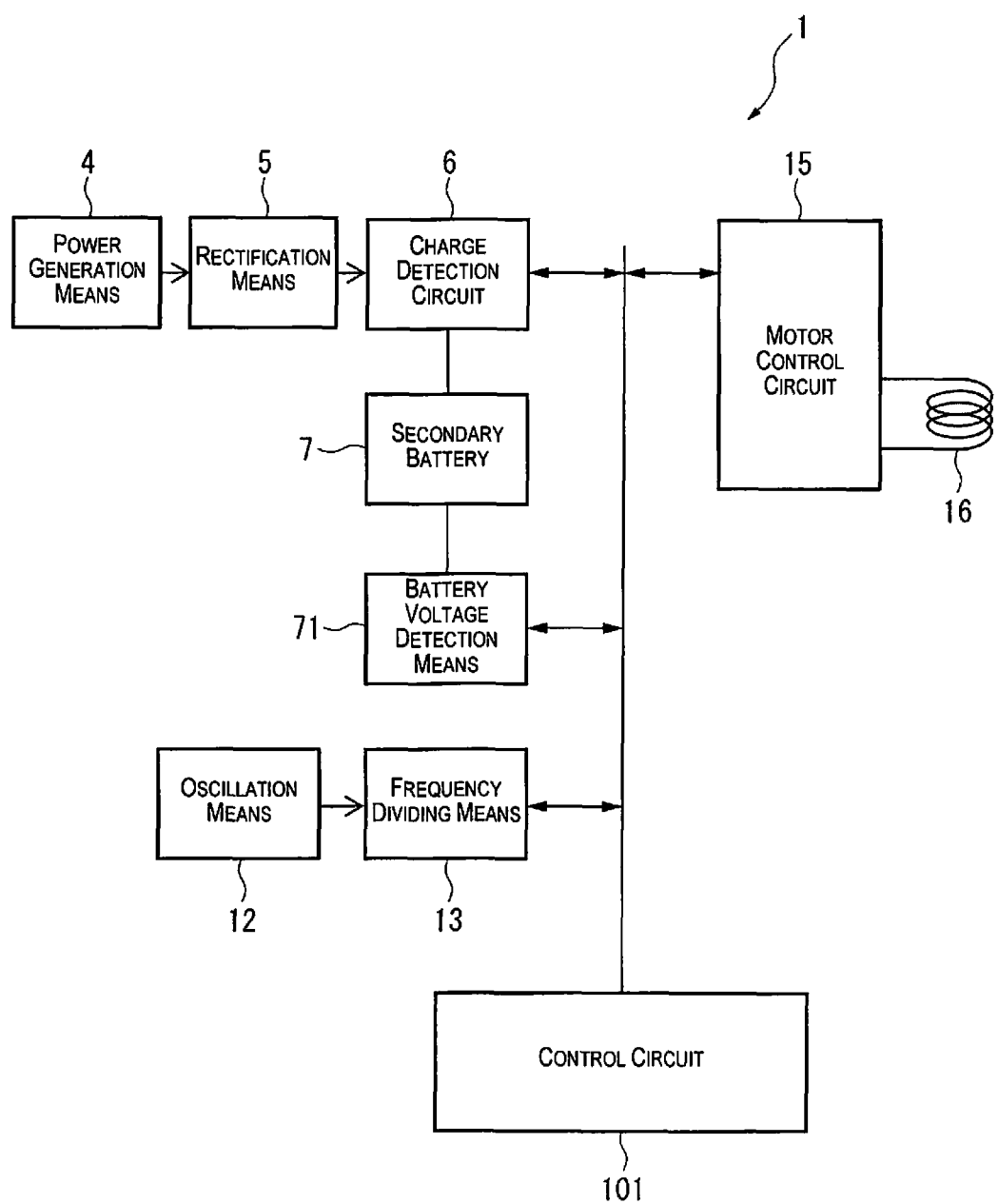
FIG. 2 is a circuit block diagram of the electronic timepiece.

As also shown in the hardware block diagram of FIG. 2, the charge detection means (unit) (charge detection circuit) 6, the frequency dividing means (unit) (frequency dividing circuit) 13, the motor driving means (unit) (motor control circuit) 15, and the battery voltage detection means (unit) (battery voltage detection circuit) 71 are connected to a control circuit (control means (unit)) 101 made of a logic IC (Integrated Circuit). The time display control means (unit) 14 is actualized by the control circuit 101. A CPU (central processing unit), a ROM (read only memory), and a RAM (random access memory), etc., can be provided in place of the logic IC. In this case, the time display control means (unit) 14 can be actualized by executing predetermined software by using the CPU, ROM, and RAM.

Figure 3:
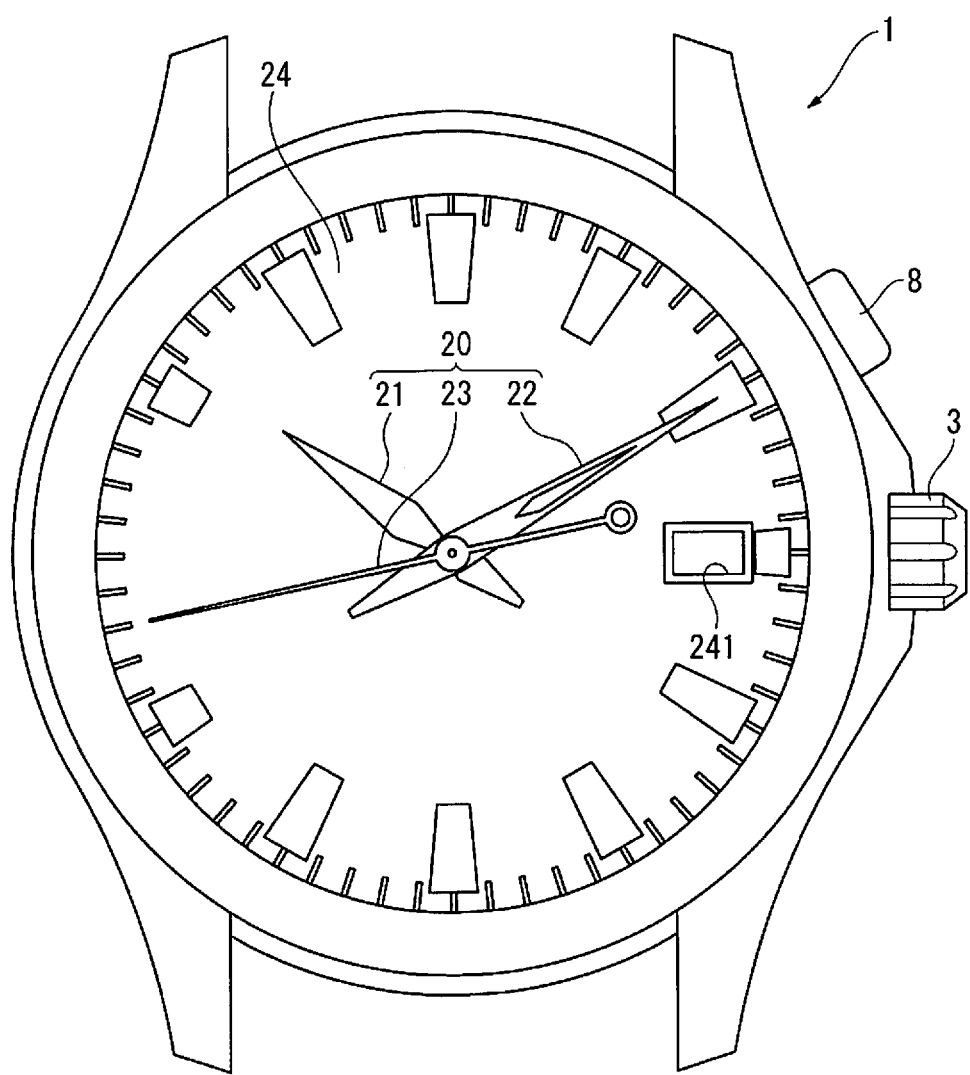
FIG. 3 is a drawing showing the electronic timepiece.

The electronic timepiece 1, as shown in FIG. 3, is equipped with time displaying pointers 20 including a hour hand 21, a minute hand 22, and a second hand 23. The time displaying pointers 20 are driven by the time displaying motor 16. A window 241 is formed at the 3 o'clock position on the dial 24, so that the date is displayable with a day wheel arranged on the back face of the dial 24. The day wheel is interlocked with the time displaying motor 16.

In the electronic timepiece 1 as structured above, the oscillation means (unit) 12, the frequency dividing means (unit) 13, and the time display control means (unit) 14 constitute a time control means (unit), and the time displaying motor driving means (unit) 15, the time displaying motor 16, and the time displaying pointers 20 constitute the time display means (unit). The time display means (unit) constitutes a device which is a subject of the operation control in the invention.

The time displaying motor driving means (unit) 15, the time displaying motor 16, and the second hand 23 constitute the persistence time display means (unit). That is, the persistence time display means (unit) displays the operation persistence time (hereinafter can be abbreviated as a persistence time in some cases) by the movement of the second hand 23. The time display control means (unit) 14 is equipped with an operation suspension portion 141 for suspending the operation of the time display means (device), an operation resumption portion 142 for resuming the operation, a timer (counter) 143 for measuring the time set by using a reference signal from the frequency dividing means (unit) 13, a persistence time display control portion 145 for controlling the display of the persistence time by controlling the drive of the second hand 23, and a timer updating portion 146 for updating the remaining time of the timer 143.

[Power Generation Means]

Figure 4:
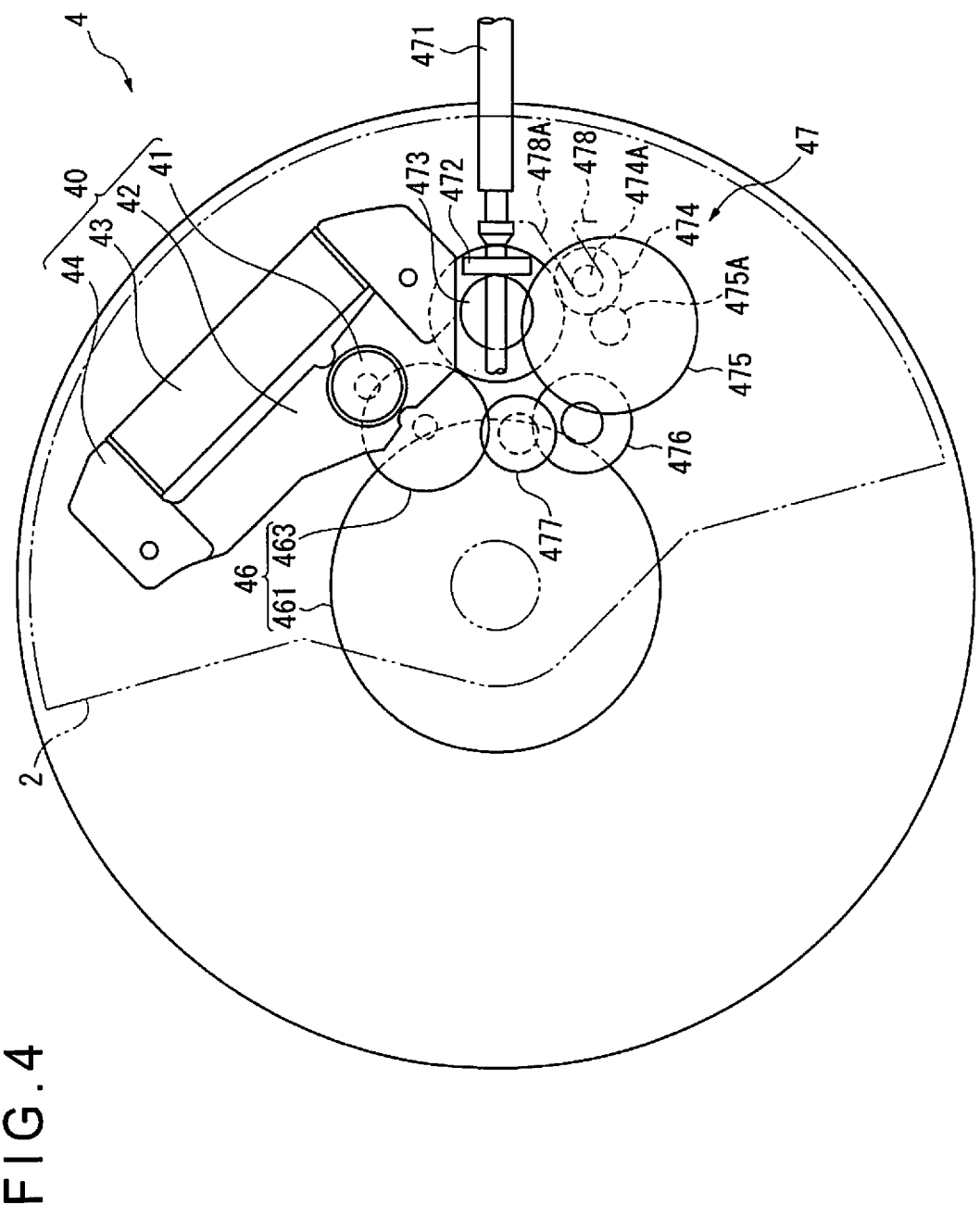
FIG. 4 is a drawing showing a structure of a power generation means (unit) of the electronic timepiece.

The power generation means (unit) 4 is constituted so as to be able to perform self-winding power generation using the oscillating weight 2 disposed inside the case of the electronic timepiece 1, and hand-winding poer generation using a crown 3, as also shown in FIG. 4. That is, the power generation means (unit) 4 is provided with a power generation device 40, a self-winding power generating transmission means (unit) 46 for transmitting mechanical energy from the oscillating weight 2 to the power generation device 40, and a hand-winding power generating transmission means (unit) 47 for transmitting mechanical energy from the crown 3 to the power generation device 40. As the power generation means (unit), only the power generation device 40 and the self-winding power generating transmission means (unit) 46 can be provided without providing a hand-winding power generating transmission means (unit) 47.

The power generation device 40 is a common alternating current generator provided with a stator 42 in which a rotor 41 is rotatably disposed, and a coil block 44 in which a coil 43 is wound.

The self-winding power generating transmission means (unit) 46 is provided with an oscillating weight wheel 461 that integrally rotates with the oscillating weight 2 and a coupling wheel 463 to which the rotation of the oscillating weight wheel 461 is transmitted. The coupling wheel 463 is engaged with the pinion of the rotor 41, and when the oscillating weight 2 rotates, the revolution force is transmitted to the rotor 41 via the oscillating weight wheel 461 and the coupling wheel 463, and power is generated by the power generation device 40. The coupling wheel 463 has a structure having an interference avoidance means (unit) by a ratchet wheel or a slippage structure, not illustrated in the drawings, and is constituted so that the transmission of the force at the time of the hand-winding power generation and the transmission of the force from the movement of the rotor at the time of the self-winding power generation do not interfere.

The hand-winding power generating transmission means (unit) 47 is equipped with a pendant winding-mechanism 471, a winding pinion 472, a crown 473, an oscillating wheel 474, a first hand-winding transmission wheel 475, a second hand-winding transmission wheel 476, a third hand-winding transmission wheel 477, and the coupling wheel 463. Since a crown 3 is attached to the front end of the pendant winding-mechanism 471, the pendant winding-mechanism 471 rotates when a user turns the crown 3. The rotation of the pendant winding-mechanism 471 is transmitted to the oscillating wheel 474 via the winding pinion 472 and the crown 473, the rotation of the oscillating wheel 474 is transmitted to the first hand-winding transmission wheel 475. The rotation of the first hand-winding transmission wheel 475 is transmitted to the coupling wheel 463 via the second hand-winding transmission wheel 476 and the third hand-winding transmission wheel 477.

In this case, the oscillating wheel 474 is engaged with a pinion 475A of the first hand-winding transmission wheel 475 only during the rotation of the pendant winding-mechanism 471 in one direction. Specifically, a slit 478A is provided on a bridge 478 to which the oscillating wheel 474 is attached, and a supporting axis 474A of the oscillating wheel 474 is slidably fit in the slit 478A. Therefore, in the case of FIG. 4, when the crown 473 rotates in the clockwise direction by the winding operation, the oscillating wheel 474 moves toward the center side of the first hand-winding transmission wheel 475 while rotating in the counterclockwise direction, and engages with the pinion 475A. On the other hand, when the first hand-winding transmission wheel 475 rotates in the counterclockwise direction by the drive from the coupling wheel 463, the oscillating wheel 474 separates from the pinion 475A while rotating in the clockwise direction, and disengages from the first hand-winding transmission wheel 475. With such structure, the rotation of the oscillating weight 2 is not transmitted to the pendant winding-mechanism 471. When a hand-winding power generating transmission means (unit) 47 is not provided, there is no need to provide the oscillating wheel 474, the first hand-winding transmission wheel 475, the second hand-winding transmission wheel 476 and the third hand-winding transmission wheel 477.

[Rectification Means]

The rectification means (unit) 5 is for rectifying the alternating current output from the power generation device 4, and a commonly known rectifying circuit, such as a full-wave rectifying circuit and a half-wave rectifying circuit, can be used.

[Charge Detection Means]

The charge detection means (unit) 6 is for detecting whether or not the electric current generated by the power generation means (unit) 4 is charged in the secondary battery 7. Therefore, the charge detection means (unit) 6 can be an electric current detection circuit for detecting the magnitude of the current rectified by the rectifying means (unit) 5 or a voltage detection circuit for detecting the voltage generated by the rectifying means (unit) 5 during charging. Therefore, for the current detection means (unit) 6, well-known various types of electric current detection circuits and voltage detection circuits can be used. For example, as an electric current detection circuit, e.g., an electric current detection circuit including a resistance disposed between the rectifying means (unit) 5 and the secondary battery 7, a peak detection circuit for detecting the peak value of the generated current by measuring the electric current flowing through the resistance, and a comparison circuit for comparing the value detected by the peak detection circuit and the threshold value can be used.

The charge detection means (unit) 6 having such a structure checks the charging current to be charged in the secondary battery 7. When a CPU is provided, the charge detection means (unit) 6 can be driven by a predetermined sampling rate (sampling period) by a signal from the CPU, and can sample the charging current to be charged in the secondary battery 7. Also, when a peak detection circuit and a comparison circuit are provided as the current detection circuit, the peak detection circuit samples the charging current output from the rectifying means (unit) 5 to detect the peak value of each sampling. In the comparison circuit, the peak value detected by the peak detection circuit is compared with a predetermined threshold value and the detected result signal thereof can be output to the time display control means (unit) 14.

[Power Storage Means]

The power storage means (unit) is constituted by a secondary battery 7 capable of charging a charging current (generated current). The secondary battery 7 is, for example, constituted by a lithium-ion battery. In addition, the output of the power generation means (unit) 4 is rectified by the rectifying means (unit) 5 and charged to the secondary battery 7 via the current detection means (unit) 6. As a power storage means (unit), not only a secondary battery 7 but also a capacitor can be used.

[Charge Detection Means of Secondary Battery]

The voltage of the secondary battery 7 is detected by the battery voltage detection means (unit) 71. The battery voltage detection means (unit) 71 is constituted by a common voltage detection means (unit) for detecting the voltage of the secondary battery 7 by a predetermined sampling timing (2 second intervals, for example).

[Timing Control Means and Time Display Means]

Since a well-known timing control means (unit) and a time display means (unit) for displaying the time have the structure of a well-known and common analog-type quartz timepiece, the detailed explanation will be omitted. That is, the oscillation means (unit) 12 is constituted by a crystal oscillator, an oscillation circuit, etc., and outputs a predetermined frequency signal. The frequency dividing means (unit) 13 divides the frequency of the signal from the oscillation means (unit) 12, and outputs a reference signal of 1 Hz, for example. The time display control means (unit) 14 outputs a driving signal to the time displaying motor driving means (unit) 15 based on the reference signal of the frequency dividing means (unit) 13. Normally, a driving signal is output every time a reference signal of 1 Hz is input from the oscillation means (unit) 12. The time displaying motor driving means (unit) 15 inputs a signal into a motor coil of the time displaying motor 16 based on the driving signal and the time displaying motor 16 operates the time displaying pointers 20 in a step motion. In this embodiment, the timepiece circuit is constituted by the oscillation means (unit) 12, the frequency dividing means (unit) 13, the time display control means (unit) 14, etc.

[Operation Suspension Portion]

The operation suspension portion 141 of the time display control means (unit) 14 is constituted so that, when the persistence time timed by the timer 143 becomes 0 (zero) hour, the time displaying pointers 20 are suspended and switched to a sleep mode, as will be explained later. This embodiment is also equipped with a BLD counter 143E as the timer 143, so the BLD display mode will be in operation after the persistence time in a normal operation becomes 0 (zero) hour. Therefore, the operation suspension portion 141 suspends the operation of the pointers when the BLD counter 143E operating in the BLD display mode becomes 0 (zero) hour.

The aforementioned sleep mode includes: (A) a pointer operation suspension mode in which the operation of the pointers 20 are suspended by suspending the time displaying motor driving means (unit) 15 while the oscillation means (unit) 12 and the frequency dividing means (unit) 13 are in operation to continue timing the current time; and (B) an IC operation suspension mode (IC operation suspension function) in which the timing of the current time is suspended by stopping the IC operation and the timing of the current time to further reduce the electricity consumption. In the sleep mode of this embodiment, the aforementioned (B) IC operation suspension mode is to be set. In the electronic timepiece 1, one of the aforementioned suspension modes can be equipped or both suspension modes can be equipped for the user to select the suspension mode. Furthermore, both suspension modes can be provided wherein the operation is switched to an operation suspension mode immediately after switching to the sleep mode, and when the operation suspension mode continues for a predetermined period (for example, one week), the operation can automatically switch to the IC operation suspension mode.

[Operation Resumption Portion]

The operation resumption portion 142 of the time display control means (unit) 14 is constituted so that, when charging (generation of the power generation means (unit) 4) is detected by the charge detection means (unit) 6 when the operation is suspended (during sleep mode) and the voltage of the secondary battery 7 at this time is the operation resumption voltage, which is the system suspension voltage Von or more, the operation of the pointers is immediately resumed. When the sleep mode is the IC operation suspension mode, since the current time is not apparent, the operation resumption portion 142 starts the operation of the suspended pointers 20 as it is. In this case, since the current time and the time that the pointers 20 point to are often unmatched, the user is required to match the time by operating the crown 3 or the button 8. It is configured that, when the time correction operation is being performed with the crown 3, etc., the operation of the timer 143 is continued and the remaining time of the persistence time continues to be counted. When the sleep mode is the operation suspension mode, since the current time is timed, the operation resumption portion 142 automatically corrects the pointers 20 to the current time by operating the time displaying motor driving means (unit) 15.

[Timer]

The timer 143 is a counter for counting the persistence time. In this embodiment, a counter for counting the remaining time in the normal operation mode and a counter for counting the remaining time in the warning displaying operation mode (BLD operation mode) for issuing a warning for a decrease in voltage are prepared. As a counter for counting the remaining time of the normal operation mode, a plurality of counters, specifically 4 counters 143A to 143D, are provided. These counters 143A to 143D are down counters that count by sequentially subtracting the set initial value. The first counter (first timer) 143A down counts one day (24 hours). Also, the second counter (second timer) 143B down counts a period of 6 days, the third counter (third timer) 143C down counts a period of 23 days, and the fourth counter (fourth timer) 143D down counts a period of 150 days. Therefore, the persistence time of a maximum of: 1 day+6 days+23 days+150 days=180 days can be counted by the first to fourth counters 143A to 143D.

As a counter for counting the remaining time in the BLD operation mode, a BLD counter 143E is provided. The BLD counter (BLD timer) 143E down counts 24 hours. The BLD counter 143E is for setting a period for a BLD display by the pointers 20. The BLD display denotes an operation for displaying a warning called a Battery Low Display or a Battery Life Indicator. For example, the second hand is moved for 2 seconds every 2 seconds as a warning movement that differs from a normal operation. This notifies the user that the battery voltage is decreasing. When the operation is suspended without using the BLD display, the BLD counter 143E does not have to be provided for the timer 143.

[Persistence Time Display Control Portion]

Figure 5:
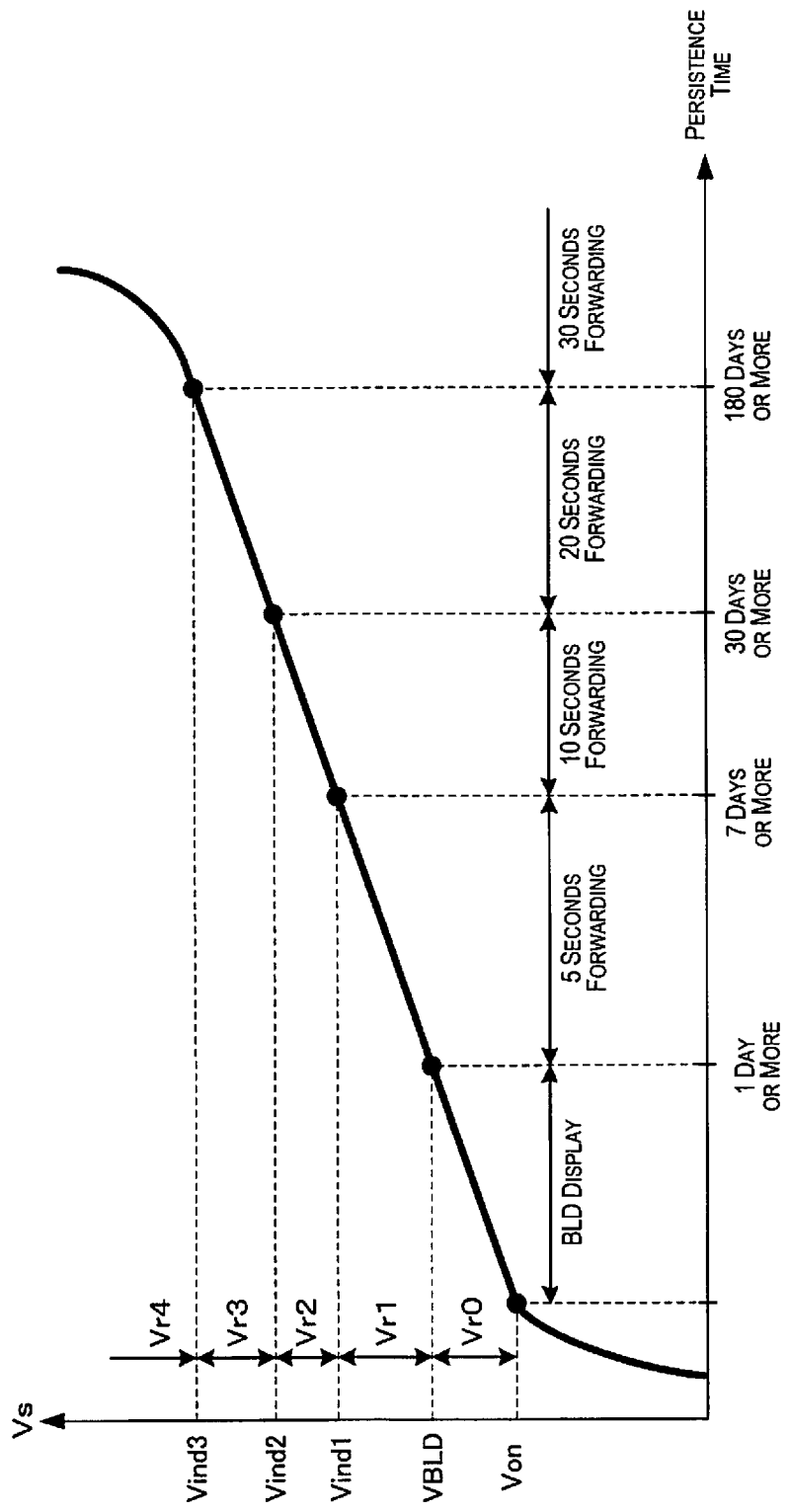
FIG. 5 is a graph showing a relationship between a voltage of a secondary battery and a persistence time.

The persistence time display control portion 145 includes: (A) an indicator display function of the persistence time in which the second hand 23 is used; and (B) a function for controlling the operation of the timer 143. That is, the persistence time display control portion 145 checks the voltage of the secondary battery 7 detected by the battery voltage detection means (unit) 71 when the persistence time display operation is performed by the button 8. The persistence time display control portion 145 judges whether or not the voltage of the secondary battery 7 corresponds to any of the plural voltage ranges preliminarily set. In this embodiment, the four continuous voltage ranges Vr1-Vr4 are set, as shown in FIG. 5. The specific voltage values of each voltage range are arbitrarily set depending on the type of the electronic timepiece 1, etc., and are exemplified as follows. For the first voltage range Vr1, the voltage of the secondary battery is a VBLD (for example, 1.2 V) or more, but less than Vind1 (for example, 1.3 V). For the second voltage range Vr2, the voltage of the secondary battery is a Vind1 (for example, 1.3 V) or more, but less than Vind2 (for example, 1.4 V). For the third voltage range Vr3, the voltage of the secondary battery is a Vind2 (for example, 1.4 V) or more, but less than Vind2 (for example, 1.5 V). For the fourth voltage range Vr4, the voltage of the secondary battery is a Vind3 (for example, 1.5 V) or more. When the voltage of the secondary battery 7 is in a range of lower than the VBLD (for example, 1.2 V), but the Von (for example, 1.1 V) or more, the BLD voltage range Vr0 for the BLD display is set.

The persistence time display control portion 145 judges which voltage range the voltage of the secondary battery 7 corresponds to, and performs the indicator display processing set for each voltage range and the persistence time setting processing for the timer 143, as shown in Table 1.

TABLE 1

| Voltage Range | Indicator Display | Persistence Time Setting | Corresponding Counter |
|---|---|---|---|
| First Voltage Range | 5 seconds | 1 Day<br>1 Day of Normal Operation of Pointers + 1 Day BLD | First + BLD (Second counter is prioritized when second counter is in operation) |
| Second Voltage Range | 10 seconds | 1 Week<br>7 Days of Normal Operation of Pointers + 1 Day BLD | First + Second + BLD (Third counter is prioritized when third counter is in operation) |
| Third Voltage Range | 20 seconds | 1 Month<br>30 Days Normal Operation of Pointers + 1 Day BLD | First + Second + Third + BLD (Fourth counter is prioritized when fourth counter is in operation) |
| Fourth Voltage Range | 30 seconds | Full (6 Months) Display<br>180 Days of Normal Operation of Pointers + 1 Day BLD | First + Second + Third + Fourth + BLD |
| BLD Voltage Range | BLD display | 1 Day of BLD (24 hours) | BLD |

5 seconds in the indicator display refer to an operation method for forwarding the second hand 23 by 5 seconds. That is, the persistence time display control portion 145 controls the time displaying motor driving means (unit) 15 to suspend the second hand 23 for 5 seconds from the forwarding starting point after forwarding it by 5 seconds. Similarly, 10 seconds in the indicator display refer to an operation method of suspending the second hand 23 for 10 seconds from the forwarding starting point after forwarding it for 10 seconds; 20 seconds in the indicator display refer to an operation method of suspending the second hand 23 for 20 seconds from the forwarding starting point after forwarding it for 20 seconds; and 30 seconds in the indicator display refer to an operation method of suspending the second hand 23 for 30 seconds from the forwarding starting point after forwarding it for 30 seconds. As explained above, the BLD display is an operation method for, for example, forwarding the second hand 23 for 2 seconds every 2 seconds.

The persistence time display control portion 145 starts a counter corresponding to the voltage range in which the detected voltage of the secondary battery 7 is included and sets the persistence time of the timer 143. The timer (counter) and the persistence time operated by or set by the persistence time display control portion 145 are as shown in the aforementioned Table 1.

[Timer Updating Portion]

The timer updating portion 146 updates the remaining time of the timer 143 when a charging state is detected by the charge detection means (unit) 6 during the operation of the timer 143 (first to fourth counters 143A to 143D) and when predetermined conditions are met. Specifically, the timer updating portion 146 updates the remaining time of the timer 143 to a persistence time according to the detected voltage when the persistence time according to the detected voltage Vs of the secondary battery 7 detected by the battery voltage detection means (unit) 71 is longer than the remaining time of the operating timer 143. On the other hand, when the persistence time according to the detected voltage is the same as or lower than the remaining time of the operating timer 143, the timer updating portion 146 keeps the timer in operation instead of updating the timer 143 in operation. The persistence time according to the detected voltage is the same as the time set by the persistence time display control portion shown in Table 1.

[Explanation of Operation of Electronic Timepiece 1]

Next, the operation of the electronic timepiece 1 having the structure as mentioned above will be explained.

[Operation Suspension Mode S1]

Figure 6:
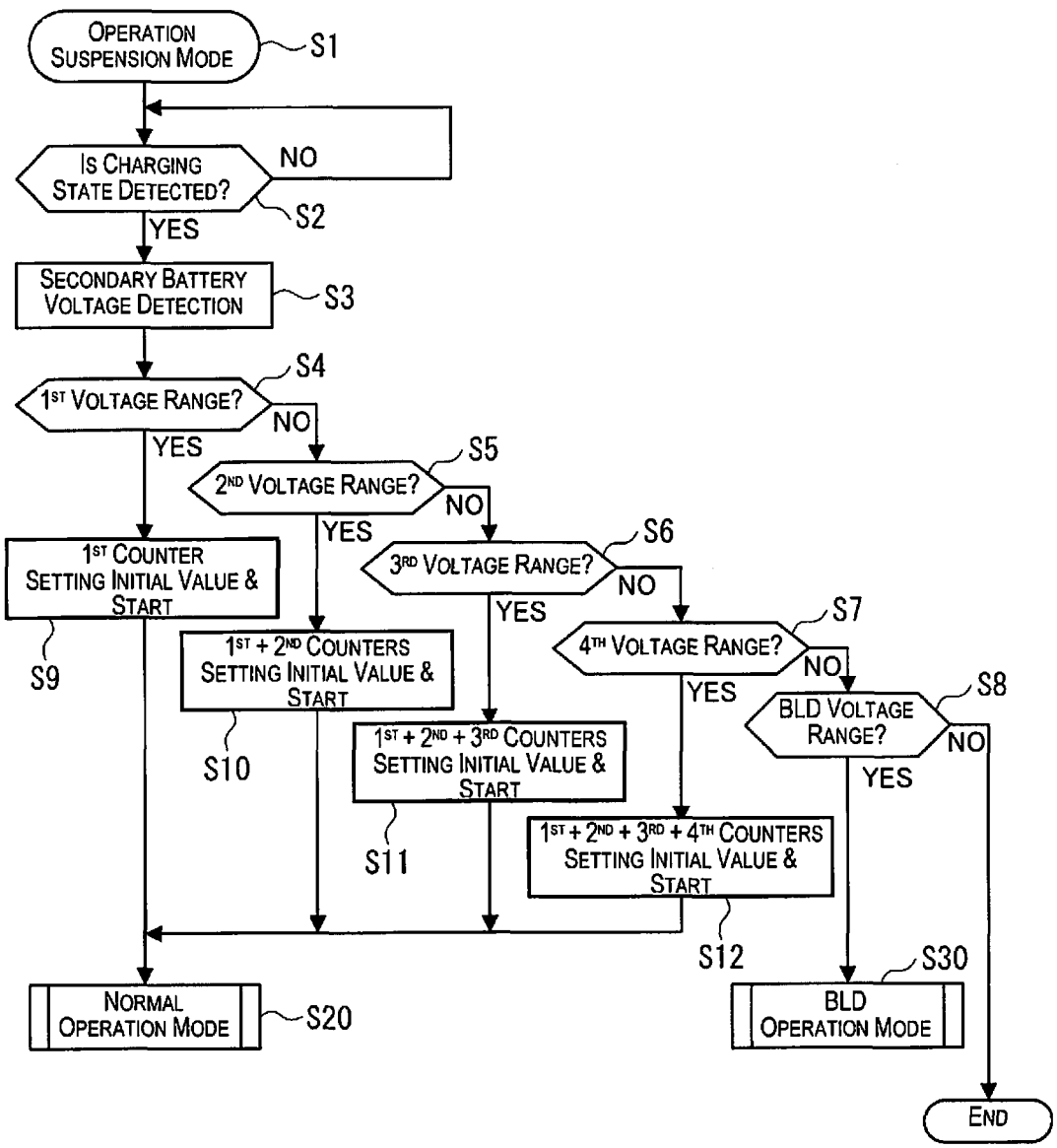
FIG. 6 is a flow chart showing a process of an operation suspension mode of the electronic timepiece.

First, the operation suspension mode in which the time display means (unit, device) is in an IC operation suspension state (Step 1, hereinafter the Step will be abbreviated as "S") will be explained with reference to the flow chart of FIG. 6. The operation suspension mode S1 is executed, as will be described later, when the persistence time in the normal operation is 0 (zero) hour and the counter 143E for the BLD display becomes 0 (zero) hour, and when the voltage of the secondary battery 7 decreases below the system suspension voltage Von.

When the operation of the time display means (unit) is suspended and therefore the operation suspension mode S1 is being executed, the motion of IC or the time display control means (unit) 14 is suspended, and only the charge detection means (unit) 6 is in operation. Therefore, the charge detection means (unit) 6 checks whether or not a charging state is detected (S2). Until a charging state is detected at S2, the charge detection means (unit) 6 continues to check for the charging detection.

On the other hand, when a charging state is detected at S2 ("Yes" at S2), a detection signal is input into the time display control means (unit) 14 from the charge detection means (unit) 6, which unlocks the IC motion suspension function to start the operation resumption portion 142, and the operation resumption portion 142 detects the voltage (detected voltage) Vs of the secondary battery 7 during the charge detection with the battery voltage detection means (unit) 71 (S3). In cases where a memory such as a RAM is provided, the detected voltage value can be stored in a memory such as a RAM.

Next, the operation resumption portion 142 judges whether or not the detected voltage Vs corresponds to the first to fourth voltage ranges Vr1-Vr4 and the BLD voltage range Vr0. Specifically, the operation resumption portion 142 judges whether or not the detected voltage Vs is included in the first voltage range (S4), and when the result of S4 is "NO", it judges whether or not the detected voltage Vs is included in the second voltage range (S5). Furthermore, when the result of S5 is "NO", it judges whether or not the detected voltage Vs is included in the third voltage range (S6), and when the result of S6 is "NO", it judges whether or not the detected voltage Vs is included in the fourth voltage range (S7). Since only the lower limit value (Vind3) is set for the fourth voltage range, it is judged to be "YES" as S7 when the detected voltage Vs is the Vind3 or higher. Further, the operation resumption portion 142 judges whether or not the detected voltage Vs is included in the BLD voltage range when the result of S7 is "NO", that is, when the detected voltage Vs is below the lower limit value (VBLD) of the first voltage range (S8).

The lower limit value of the BLD voltage range is the system suspension voltage Von. The system suspension voltage Von is the minimum voltage needed for operating each electric circuit of IC, etc., of the electronic timepiece 1. When the voltage of the secondary battery 7 falls below the voltage Von, the oscillation means (unit) 12, the frequency dividing means (unit) 13, the control circuit 101, etc., will be suspended. Therefore, when it is judged to be "NO" at S8, the operation resumption portion 142 terminates the process without resuming the operation of the time display means (unit). Therefore, the system suspension voltage Von is an operation resumption voltage for judging whether or not the operation resumption is allowed.

[Start-Up Process in First Voltage Range]

When the detected voltage Vs is included in the first voltage range ("YES" at S4), the operation resumption portion 142 sets an initial value to the first counter 143A and starts counting (S9). The first counter 143A is a down counter for counting one day (24 hours). Therefore, an initial value for timing the persistence time for one day is set as a counter value for the first counter 143A to constitute the timer 143 for timing the persistence time for one day. For example, when the first counter 143A is down counted every second, the initial value is 60 seconds×60 minutes×24 hours=86,400. Therefore, the operation resumption portion 142 sets the initial value 86,400 to the first counter 143A and decreases the counter value by "1" every second using, e.g., a reference signal of 1 Hz input from the frequency dividing means (unit) 13.

Here, the lower limit value of the first voltage range, VBLD, is set so that, when the voltage of the secondary battery 7 is the VBLD, and at a point when the time displaying motor 16 is operated for the day with only power from the secondary battery 7 in a state in which power is not generated by the power generation means (unit) 4, the voltage of the secondary battery 7 does not decrease below the system suspension voltage Von.

[Start-Up Process in Second Voltage Range]

When the detected voltage Vs is included in the second voltage range ("YES" at S5), the operation resumption portion 142 sets an initial value to the first counter 143A and the second counter 143B to start counting (S10). For the second counter 143B, an initial value corresponding to 6 days is set as the counter value. Therefore, a timer 143 for timing a persistence time for 7 days is constituted by the first counter 143A and the second counter 143B. When the timer 143 is constituted with a plurality of counters, the down counting is started at the counter having the longest period to count. Therefore, at the second voltage range using the first counter 143A and the second counter 143B, initially down counting is performed with the second counter 143B, and when the counter value of the second counter 143B becomes 0 (zero) hour after 6 days has passed, one days is counted by down counting by the first counter 143A. That is, a period of 6 days+1 day=7 days is counted by the first counter 143A and the second counter 143B.

Here, the lower limit value of the second voltage range, Vind1, is set so that the voltage of the secondary battery 7 does not decrease below the system suspension voltage VBLD, when the voltage of the secondary battery 7 is Vind1 at a point when the time displaying motor 16 is operated for 7 days with only power from the secondary battery 7 in a state in which power is not generated by the power generation means (unit) 4. In this embodiment, Vind1 is set to a voltage capable of securing about 20 days of persistence time.

[Start-Up Process in Third Voltage Range]

When the detected voltage Vs is included in the third voltage range ("YES" at S6), the operation resumption portion 142 sets an initial value to the first counter 143A, the second counter 143B, and the third counter 143C to start counting (S11). For the third counter 143C, an initial value corresponding to 23 days is set as the counter value. Therefore, a timer 143 for timing a persistence time for 30 days is constituted by the first counter 143A, the second counter 143B, and the third counter 143C. In the third voltage range, the third counter 143C initially performs down counting, and when the counter value of the third counter 143C becomes 0 (zero) hour after 23 days have passed, the second counter 143B performs down counting. Next, when the counter value of the second counter 143B becomes 0 (zero) hour after 6 days have passed, the first counter 143A performs down counting. That is, a period of 23 days+6 days+1 day=30 days (1 month) is counted by the first counter 143A, the second counter 143B, and the third counter 143C. Here, the lower limit value of the third voltage range, Vind2, is set so that the voltage of the secondary battery 7 does not decrease below the system suspension voltage VBLD, when the voltage of the secondary battery 7 is Vind2 at a point when the time displaying motor 16 is operated for 30 days with only power from the secondary battery 7 in a state in which power is not generated by the power generation means (unit) 4. In this embodiment, Vind2 is set to a voltage capable of securing about 80 days of persistence time.

[Start-Up Process in Fourth Voltage Range]

When the detected voltage Vs is included in the fourth voltage range ("YES" at S7), the operation resumption portion 142 sets an initial value to the first counter 143A, the second counter 143B, the third counter 143C, and the fourth counter 143D to start counting (S12). For the fourth counter 143D, an initial value corresponding to 150 days is set as the counter value. Therefore, a timer 143 for timing a persistence time for 180 days is constituted by the first counter 143A, the second counter 143B, the third counter 143C, and the fourth counter 143D. In the fourth voltage range, the fourth counter 143D initially performs down counting, and when the counter value of the fourth counter 143D becomes 0 (zero) hour after 150 days have passed, the third counter 143C performs down counting. Next, when the counter value of the third counter 143C becomes 0 (zero) hour after 23 days have passed, the second counter 143B performs down counting. Next, when the counter value of the second counter 143B becomes 0 (zero) hour after 6 days have passed, the first counter 143A performs down counting. That is, a period of 150 days+23 days+6 days+1 day=180 days (6 months) is counted by the first counter 143A, the second counter 143B, the third counter 143C, and the fourth counter 143D.

Here, the lower limit value of the fourth voltage range, Vind3, is set so that the voltage of the secondary battery 7 does not decrease below the system suspension voltage VBLD, when the voltage of the secondary battery 7 is Vind3 at a point when the time displaying motor 16 is operated for 180 days with only power from the secondary battery 7 in a state in which power is not generated by the power generation means (unit) 4. In this embodiment, Vind3 is set to a voltage capable of securing about 200 days of persistence time.

The time display control means (unit) 14 shifts to the process of the normal operation mode S20, which will be detailed, after the processes of S9 to S12 are performed by the operation resumption portion 142. On the other hand, the time display control means (unit) 14 shifts to the process of the BLD operation mode S30 when the detected voltage Vs is included in the BLD voltage range ("YES" at S8).

[Normal Operation Mode]

Next, the process of the normal operation mode S20 will be explained with reference to FIG. 7. In the normal operation mode S20, the time display control means (unit) 14 controls the time displaying motor driving means (unit) 15 to perform the process of the normal operation of pointers (S21). This normal pointer operation process is continued until the operation is suspended by the operation suspension portion 141. However, for the persistence time display process S50 and the BLD operation mode S30, which will be explained later, a pointer driving control different from a normal operation of pointers is performed.

The time display control means (unit) 14 judges whether or not the persistence time of the normal operation has become 0 (zero) hour (S22). Specifically, since the persistence time set by each voltage range terminates at the time when the first counter 143A finally becomes 0 (zero) hour, it is judged whether or not the first counter 143A has become 0. If it is judged to be "YES" at S22, the time display control means (unit) 14 executes the BLD operation mode (S30) which will be explained later.

On the other hand, if it is judged to be "NO" as S22, the time display control means (unit) 14 checks the output of the charge detection means (unit) 6 to judge whether or not a charging state is detected (S23). When it is judged to be "YES" at S23, the time display control means (unit) 14 executes the timer updating process S40, which will be explained later, by the timer updating portion 146. On the other hand, if it is judged to be "NO" at S23, that is, when a charge detection is not performed, the time updating process S40 will not be executed.

After the execution of the timer updating process S40, or when it is judged to be "NO" by the charging state detection process S23, the time display control means (unit) 14 judges whether or not the persistence time display operation is performed by the operation of the button 8 (S24). If it is judged to be "YES" at S24, the persistence time display control portion 145 executes the persistence time display process S50 which will be explained later and returns to the normal pointer operation process (S21). On the other hand, If it is judged to be "NO" at S24, the time display control means (unit) 14 returns to the normal pointer operation process (S21) without executing the persistence time display process. Therefore, the normal operation mode S20 is continuously executed until the normal persistence time becomes 0 (zero) hour.

[Time Updating Process]

Figure 8:
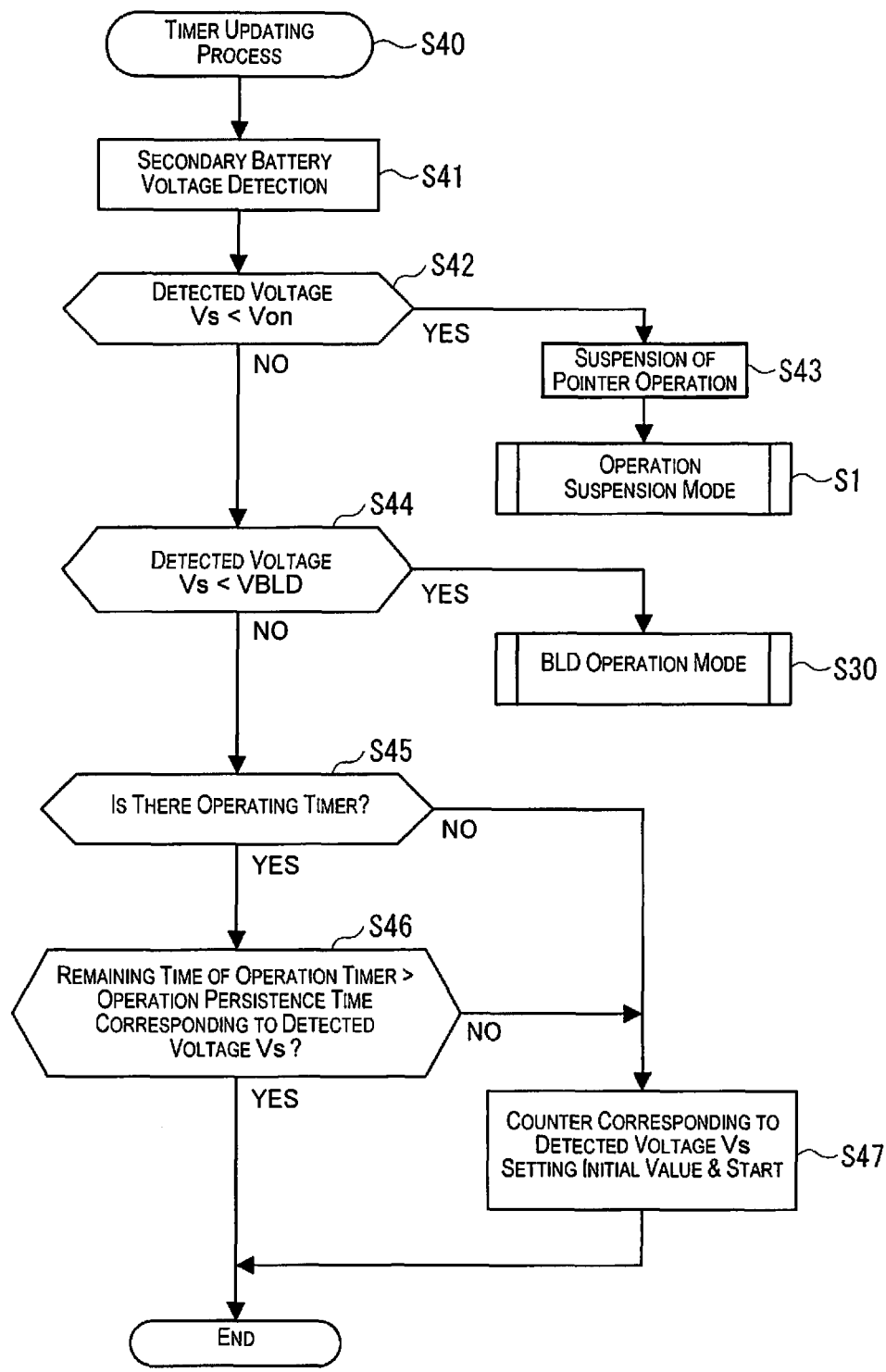
FIG. 8 is a flow chart showing a timer updating process of the electronic timepiece.

Next, the process of the timer updating process S40 will be explained with reference to FIG. 8. When the timer updating process S40 is executed, the timer updating portion 146 acquires the voltage Vs of the secondary battery 7 detected by the battery voltage detection means (unit) 71 (S41). Next, the timer updating portion 146 judges whether or not the detected voltage Vs is below the system suspension voltage Von (S42). If it is judged to be "YES" at S42, the operation suspension portion 141 suspends the operation of the pointers (S43) and executes the operation suspension mode S1 which is a motion process when the operation is suspended.

On the other hand, if it is judged to be "NO" at S42, the timer updating portion 146 judges whether or not the detected voltage Vs is below VBLD (S44). If it is judged to be "YES" at S44, the time display control means (unit) 14 executes the BLD operation mode S30. Since the timer updating process S40 is executed when charging is detected during the normal operation mode, there is rarely a possibility that the detected voltage Vs is below the system suspension voltage Von or VBLD, but in this embodiment, the processes of S42 to S44 are set as a countermeasure for errors when the voltage decreases.

If it is judged to be "NO" at S44, the timer updating portion 146 checks whether or not there is an operating timer 143 (S45). During the normal operation mode, normally, since the timer 143 constituted by one or more counters in which the initial values are set in the operation suspension mode S1 as shown in FIG. 6 is operating, it is judged to be "YES" at S45. In that case, the timer updating portion 146 judges whether or not the remaining persistence time which is being counted by the operating timer 143 is longer than the persistence time set according to the detected voltage Vs detected at S41, that is, the initial value of the timer 143 set by the first to fourth voltage ranges in which the detected voltage Vs is included (S46). That is, the timer updating portion 146 judges to be "Yes" at S46 when there is a counter corresponding to a voltage range higher than the voltage range corresponding to the detected voltage Vs in the timers constituting the operating timer.

For example, when the detected voltage Vs is in the first voltage range, the corresponding persistence time is 1 day. Therefore, when the remaining persistence time of the timer 143 in operation is longer than 1 day, it is judged to be "YES" at S46, and the timer updating portion 146 uses the timer 143 currently in operation as it is without resetting the timer 143. When the remaining persistence time of the timer in operation is longer than 1 day, it is a case in which down counting is performed at the second counter 143B, or a case in which an initial value is set for the second counter 143B and down counting is being performed at the third counter 143C or the fourth counter 143D. Therefore, it can be judged whether or not the remaining persistence time of the timer 143 in operation is longer than 1 day by checking whether the second counter 143B has become 0 hours. Similarly, when the detected voltage Vs is in the second voltage range and the remaining persistence time of the timer 143 in operation is longer than 7 days, it is judged to be "YES" at S46 and the timer updating portion 146 uses the counter currently in operation as it is without resetting the timer 143. Also in this case, the judgment can be made by checking whether or not the third counter 143C has become 0 (zero) hour. Also, when the detected voltage Vs is in the third voltage range and the remaining persistence time of the timer 143 in operation is longer than 30 days, it is judged to be "YES" at S46, and the timer updating portion 146 uses the counter currently in operation as it is without resetting the timer 143. Also in this case, the judgement can be made by confirming that the fourth counter 143D has become 0 hours.

That is, in some cases, the timer updating portion 146 judges that it is judged to be "YES" at S46 when the voltage value of the current detected voltage Vs decreases and corresponds to a voltage range lower than the detected voltage Vs when the timer 143 currently in operation was set. In that case, the timer 143 in operation is used as it is.

On the other hand, the timer updating portion 146 judges to be "NO" at S46 when the persistence time corresponding to the current detected voltage Vs is longer than the remaining persistence time of the timer 143 currently in operation. For example, when an operation of 175 days is performed without charge detection after originally setting a persistence time of 180 days, the remaining persistence time will be 5 days. In this case, a user can sometimes oscillate the electronic timepiece 1 or operate the crown 3 to generate power by the power generation means (unit) 4 to charge the secondary battery 7 to increase the voltage in order to extend the persistence time. When the voltage of the secondary battery 7 is increased to the second, third or fourth voltage range in such a way, the persistence time according to the detected voltage becomes longer than 7 days, 30 days, or 180 days, which are longer than the current remaining persistence time of 5 days. In this case, it is judged to be "NO" at S46.

If it is judged to be "NO" at S45 and it is judged to be "NO" at S46, the timer updating portion 146 sets an initial value of the counter (timer 143) corresponding to the detected voltage Vs and starts counting by the counter (S47). For example, when there is 5 days of the remaining persistence time and the detected voltage Vs is in the third voltage range, it is judged to be "NO" at S46. In that case, the timer updating portion 146 sets initial values to the timer 143 (the timer 143 constituted by the first counter 143A, the second counter 143B, and the third counter 143C) corresponding to the third voltage range in which the detected voltage Vs is included and starts counting.

Figure 7:
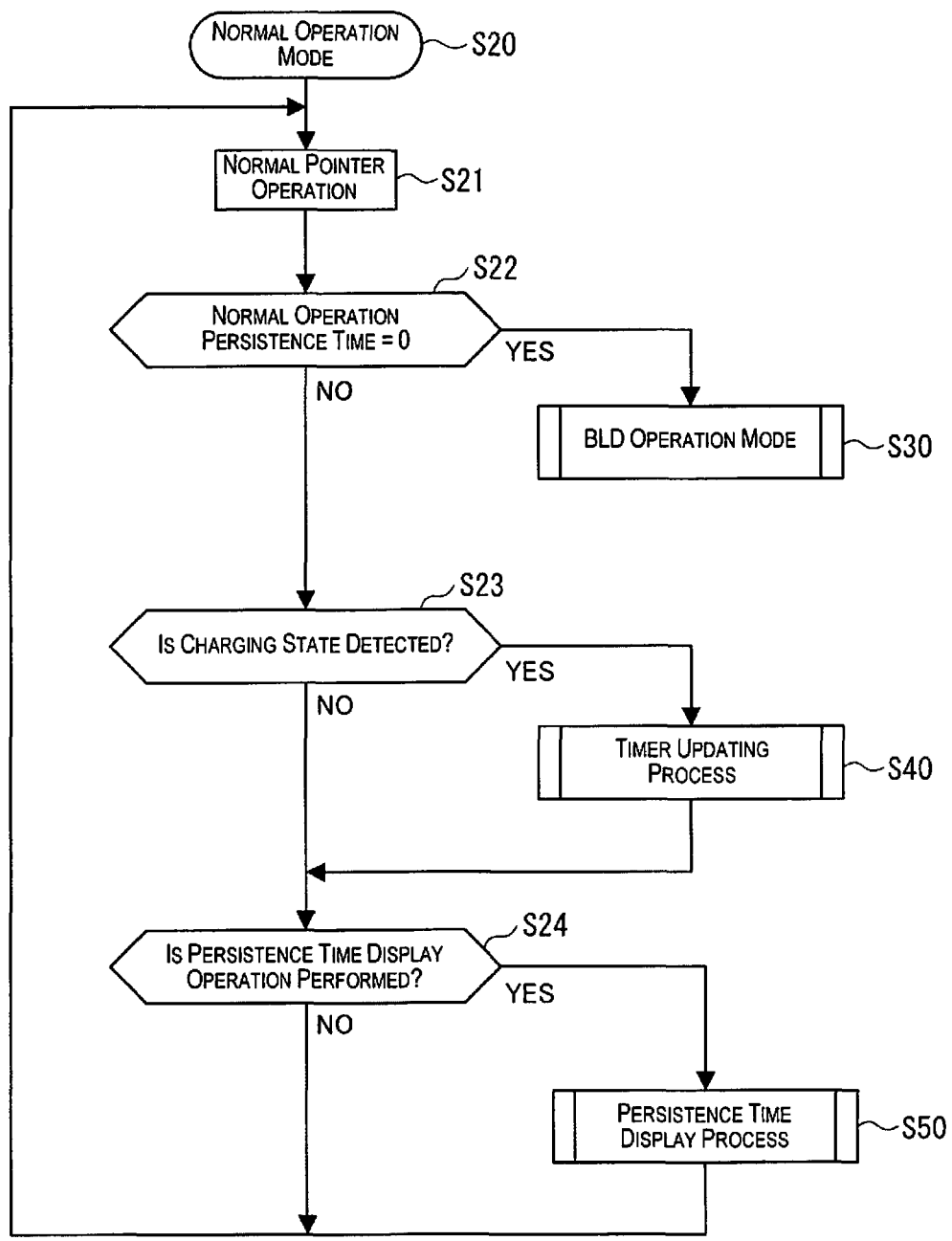
FIG. 7 is a flow chart showing a process of a normal operation mode of the electronic timepiece.

When the process of S47 is performed and it is judged to be "YES" at S46, the time display control means (unit) 14 terminates the timer updating process S40 performed by the timer updating portion 146, and returns to the normal operation mode S20 as shown in FIG. 7.

[Persistent Time Display Process S50]

Figure 9:
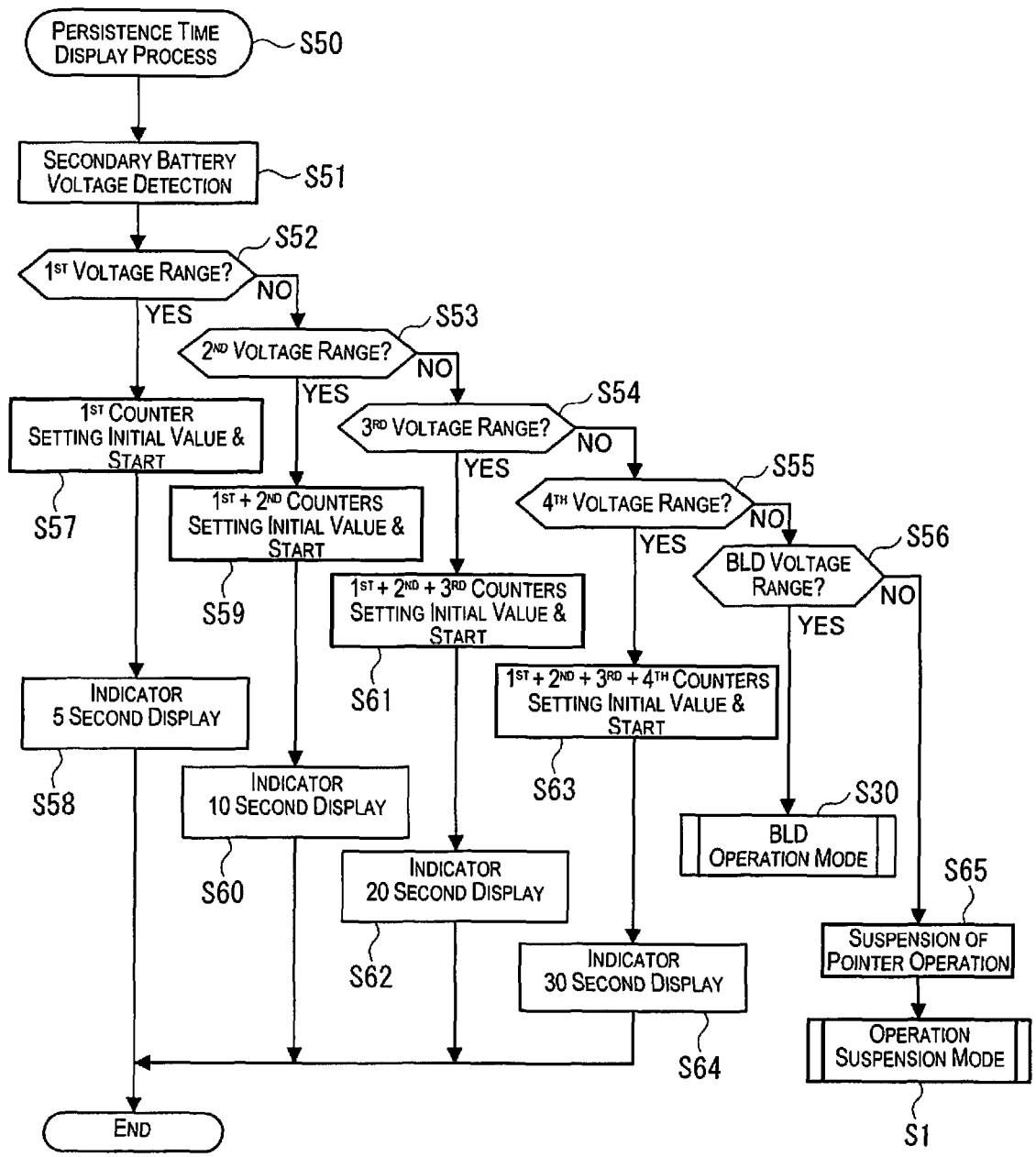
FIG. 9 is a flow chart showing a persistence time display processing of the electronic timepiece.

Next, the process of the persistence time display process S50 will be explained with reference to FIG. 9. When the persistence time display process S50 is executed, the persistence time display control portion 145 acquires the voltage Vs of the secondary battery 7 detected by the battery voltage detection means (unit) 71 (S51). Next, the persistence time display control portion 145 judges whether or not the detected voltage Vs corresponds to the first to fourth voltage ranges and the BLD voltage range (S52 to S56).

[Persistence Time Display Process of First Voltage Range]

When the detected voltage Vs is included in the first voltage range ("YES" at S52), the persistence time display control portion 145 sets an initial value to the timer 143 constituted by the first counter 143A, and starts counting (S57). Furthermore, the 5 second display process of the aforementioned indicator will be executed by controlling the time displaying motor driving means (unit) 15 (S58).

[Persistence Time Display Process in Second Voltage Range]

When the detected voltage Vs is included in the second voltage range ("YES" at S53), the persistence time display control portion 145 sets an initial value to the timer 143 constituted by the first counter 143A and the second counter 143B, and starts counting (S59). Furthermore, the 10 second display process of the aforementioned indicator will be executed by controlling the time displaying motor driving means (unit) 15 (S60).

[Persistence Time Display Process in Third Voltage Range]

When the detected voltage Vs is included in the third voltage range ("YES" at S54), the persistence time display control portion 145 sets an initial value to the timer 143 constituted by the first counter 143A, the second counter 143B, and the third counter 143C, and starts counting (S61). Furthermore, the 20 second display process of the aforementioned indicator will be executed by controlling the time displaying motor driving means (unit) 15 (S62).

[Persistence Time Display Process in Fourth Voltage Range]

When the detected voltage Vs is included in the fourth voltage range ("YES" at S55), the persistence time display control portion 145 sets an initial value to the timer 143 constituted by the first counter 143A, the second counter 143B, the third counter 143C, and the fourth counter 143D, and starts counting (S63). Furthermore, the 30 second display process of the aforementioned indicator will be executed by controlling the time displaying motor driving means (unit) 15 (S64).

Normally, each indicator display process S58, S60, S62, and S64 can be executed just once, but can be continuously executed for a predetermined period of time (for example, 1 minute) or a predetermined number of times (for example, 4 times). For example, the indicator 5 second display of S58 is a display process to forward the second hand 23 by 5 seconds and then suspend it for 5 seconds from the forwarding starting point, and this process can be performed only once, for 1 minute (that is, 12 times), or a predetermined number of times such as 4 times.

When the detected voltage Vs is included in the BLD voltage range ("YES" at S56), the BLD operation mode S30 is executed. Furthermore, when it is judged to be "NO" at S56, the detected voltage Vs is below the system suspension voltage Von, and therefore the operation suspension portion 141 suspends the operation of the pointers (S65), and executes the aforementioned operation suspended mode S1 which is a process executed during the operation suspension.

As described above, at the persistence time display process S50, a persistence time according to the detected voltage Vs is set to the timer 143, thereby starting the counting of the remaining time thereof. Furthermore, the indicator display for displaying the set persistence time is operated using the second hand 23.

[BLD Operation Mode]

Figure 10:
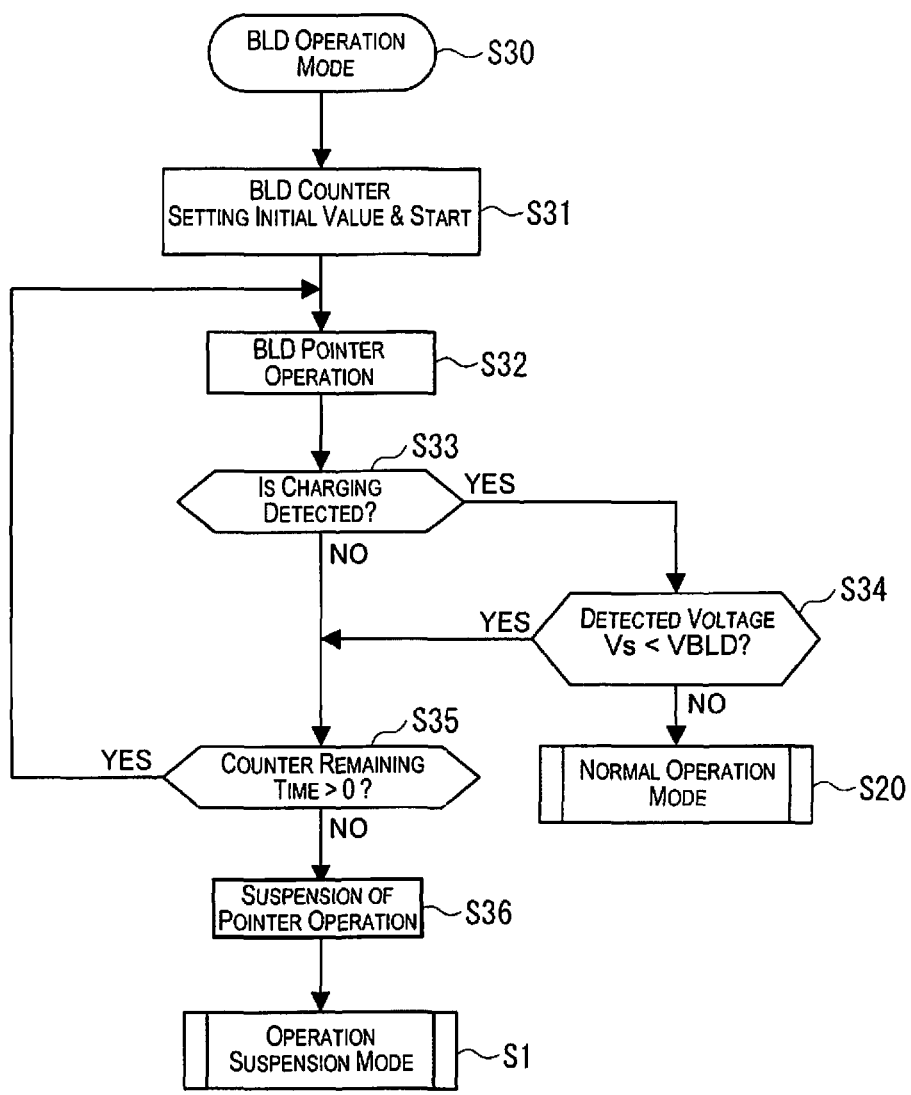
FIG. 10 is a flow chart showing a process of a BLD operation mode of the electronic timepiece.

Next, the BLD operation mode S30 will be explained with reference to FIG. 10. The BLD operation mode S30 is executed when S8 (FIG. 6), S22 (FIG. 7), S44 (FIG. 8), and S56 (FIG. 9) are determined to be "YES".

The time display control means (unit) 14 sets an initial value to the BLD counter 143E (24 hours in this embodiment) and starts down counting (S31) upon the execution of the BLD operation mode S30 to set the remaining time of the BLD operation. Next, the time display control means (unit) 14 executes the BLD operation of pointers (S32). The BLD operation of pointers forwards the second hand 23 by 2 seconds every 2 second, for example, and is preferably capable of notifying the user that a BLD operation of pointers different from a normal operation of pointers is being executed.

Next, the time display control means (unit) 14 judges whether or not there is a charge detection from the power generation means (unit) to the secondary battery 7 (S33).

When it is judged that there is a charge detection ("YES" at S33), the time display control means (unit) 14 judges whether or not the detected voltage Vs is less than the VBLD (S34). When it is judged to be "NO" at S34, or when the voltage of the secondary battery 7 has returned to a higher level than the BLD voltage range, the time display control means (unit) 14 executes the aforementioned normal operation mode S20.

When it is judged to be "NO" at S33 or when it is judged to be "YES" at S34, the time display control means (unit) 14 judges whether or not the remaining time of the BLD counter 143E is more than 0 hours (S35). When it is judged to be "YES" at S35, since the BLD operation period remains, the BLD operation of pointers is continued by returning to the process of S32. On the other hand, when it is judged to be "NO" at S35, since the BLD operation period is terminated, the operation suspension portion 141 suspends the operation of pointers (S36) and executes the aforementioned operation suspension mode S1.

According to such an embodiment, the following effects will be exerted.

(1) Since the persistence time display control portion 145 and the timer updating portion 146 are included, when the display of a persistence time is operated, the suspension of operation in a shorter time than the displayed persistence time can be prevented, and when the secondary battery 7 is charged, a persistence time can be appropriately adjusted according to the voltage of the secondary battery. This enhances the convenience. That is, when the persistence time display process S50 is performed by an operation of the button 8, the persistence time display control portion 145 resets the timer 143 according to the detected voltage Vs, and displays a persistence time according to the detected voltage Vs. Also, since the timer updating portion 146 operates only when a charging state is detected, when power generation is not performed by the power generation means (unit) 4, a normal operation is terminated at the time when the displayed persistence time has passed and the operation can be transited to a BLD operation mode. Therefore, when the power generation means (unit) 4 is not in operation and it is highly likely that the electronic timepiece 1 is not being used, the voltage of the secondary battery 7 can be prevented from decreasing to below the system suspension voltage Von by continuing the operation state beyond necessity. Further, in cases where there is a high possibility that the power generation means (unit) 4 is being operated and that the electronic timepiece 1 is being in use, since the persistence time is updated according to the voltage of the secondary battery 7, the operation can be prevented from being suspended while the electronic timepiece 1 is in use. This enhances the convenience. For example, if the timer updating portion 146 is operated even in cases where a charging state is not detected, the persistence time is consistently updated as long as the detected voltage Vs is maintained in the same voltage range, thereby continuing a normal operation until the voltage of the secondary battery 7 decreases below the VBLD. When a charging state cannot be detected, it is highly likely that the electronic timepiece 1 is not being used, and therefore, electricity is wastefully consumed, and since the voltage of the secondary battery 7 during operation suspension decreases and is highly likely that the secondary battery 7 needs to be charged when the operation is resumed. Therefore, there is a disadvantage that the electronic timepiece 1 cannot be immediately used. On the other hand, in this embodiment, since the timer updating portion 146 operates only when a charging state is detected, when a charge detection is not performed in the electronic timepiece 1, the operation can be suspended by transiting to the BLD operation mode S30 at the time when the set persistence time has passed, thereby making it possible to maintain the voltage of the secondary battery 7 high at the time of operation suspension, and the electronic timepiece 1 can be immediately used when resuming operation.

(2) Furthermore, the timer updating portion 146 newly resets the persistence time of the timer 143 only when the persistence time corresponding to the detected voltage Vs is longer than the remaining persistence time of the timer 143 in operation. Therefore, an inconvenience that a normal operation terminates before the displayed persistence time has passed can be prevented. For example, after the persistence time is set to 180 days since the detected voltage during the persistence time display processing S50 was slightly higher than Vind3, if the detected voltage Vs becomes in the third voltage range when a charging detection is performed after 10 days of operation, the remaining persistence time becomes shortened from 170 days to 30 days when the timer is automatically switched to a persistence time corresponding to the detected voltage Vs at that time. Therefore, since the normal operation terminates in a shorter time than the persistence time that a user has been aware, the user cannot trust the displayed persistence time, which, as a result, diminishes the convenience. On the other hand, in this embodiment, when the persistence time according to the detected voltage Vs is shorter than the remaining persistence time of the timer 143 in operation, the timer 143 in operation is continuously used, which enables continuous operation for the display persistence time. This enhances the convenience.

(3) Furthermore, the timer updating portion 146 newly resets the persistence time of the timer 143 when the persistence time corresponding to the detected voltage Vs is longer than the remaining persistence time of the timer 143 in operation. Therefore, when the user manually performs a power generating operation, such as rotating the oscillating weight 2 by shaking the electronic timepiece 1, for the purpose of extending the persistence time and the voltage of the secondary battery 7 has increased, a persistence time according to the voltage value thereof can be newly set. Therefore, convenience can be enhanced by meeting the expectations of the user who performed a power generation operation to extend the persistence time.

(4) When the operation is resumed from the operation suspension state (sleep mode), the voltage Vs of the secondary battery 7 at the time of resuming the operation is detected, and the counter that operates as the timer is selected according to the voltage thereof. That is, higher the detected voltage Vs, longer the persistence time of the timer in operation. Therefore, an appropriate operation resumption processing according to the detected voltage Vs can be performed. Specifically, since the persistence time can be set according to the detected voltage Vs, the voltage of the secondary battery 7 can be set so that it doesn't decrease to the system suspension voltage Von or BLD voltage range even if power is not generated by the power generation means (unit) 4 and the operation is performed for the persistence time only by the charged power. Therefore, the secondary battery 7 can be maintained at the VBLD or more even while operation is suspended, and when power is generated by the power generation means (unit) 4 and a charging state is detected, the operation of the pointers is immediately resumed, so the user can check the time, which enhances the convenience.

(5) Since four timers (counters), first to fourth counters 143A-143D, are provided as the timer 143 and each counter 143A-143D is set corresponding to each voltage range, the structural design of the timer 143 can be simplified in comparison to a case in which only one timer is provided for counting different persistence times. That is, when plural persistence times are managed by one timer, it should be designed such that different persistence times can be set. On the other hand, in this embodiment, the structural design of the timer can be simplified since only the initial value which is the maximum value capable of being counted by each counter 143A to 143D needs to be set.

(6) In this embodiment, the operation of the timer 143 is continued even during the time correction operation by the crown 3, etc. Therefore, for example, even when the electronic timepiece 1 is left while the crown 3 is pulled out two steps in a timer correction state, the voltage of the secondary battery 7 can be prevented from decreasing to the system suspension voltage Von or less, since the timer 143 operates and the operation is suspended when the persistence time becomes 0 (zero) hour.

The invention is not limited to the aforementioned embodiment, and design changes, improvements, etc., falling within the scope of capable of achieving the advantages of the invention are included in the invention. For example, in the aforementioned embodiment, a normal operation is suspended and transited to the BLD operation mode at a point when the persistence time of the normal operation set by the timer 143 according to the detected voltage Vs becomes 0 (zero) hour and the operation is suspended when a predetermined time (24 hours in the aforementioned embodiment) has passed in the BLD operation mode, but without transiting to the BLD operation mode, the operation can be suspended at a point when the persistence time of the normal operation becomes 0 (zero) hour.

The voltage range for judging the detected voltage Vs is not limited to the first to fourth voltage ranges. The number of these voltage ranges and the specific voltage values for setting each voltage range can be arbitrarily set based on the type of the electronic timepiece 1 or the characteristics of the charging means (unit) such as the secondary battery 7. Furthermore, as a method for seeking the persistence time according to the detected voltage Vs, it is not limited to a method which sets voltage ranges. For example, a formula capable of calculating the persistence time by substituting the value of the detected voltage Vs can be set. Also, counters 143A to 143D corresponding to each voltage range are combined as the timer 143, but individual counter for timing the persistence time of each voltage range can also be used. For example, a counter for timing 1 day, a counter for timing 7 days, a counter for timing 30 days, and a counter for timing 180 days can be prepared, and any one of the counters can be selected. Furthermore, the timer 143 can be constituted by one counter constituted so as to be able to time plural persistence times.

Also, the persistence time display means (unit) is not limited to a means using a second hand, and can use exclusive pointers for displaying the persistence time for display. Furthermore, in a display means (unit) such as a liquid crystal display, etc., numbers or indicators can be used for display.

As a power generation device 40, other than a hand-winding power generation device and a self-winding power generation device as described in the aforementioned embodiment, various types of power generation devices such as a power generation device using an external alternate-current magnetic field, a solar power generation device, and a temperature difference power generation device, etc., can be used. Also, in the electronic timepiece 1, one type of the various types of the aforementioned power generation devices can be mounted or plural types of power generation devices can be combined.

The invention is not limited for use in a wrist watch, and can be used for other timepieces such as a pocket watch, a table timepiece, a wall timepiece, etc., as long as it is equipped with a power generation function. Furthermore, the invention is not limited to be applied to an electronic control type mechanical timepiece, and can also be applied to various types of electronic devices such as a desk timepiece, various types of timepieces, a portable timepiece, a portable blood pressure manometer, a mobile phone device, a pager, a pedometer, a calculator, a portable personal computer, an electronic notebook, a portable radio, a music box, a metronome, an electric razor, etc. It is especially suited for a portable electronic device equipped with a power generation function and to be used only when needed, rather than all the time.

[Embodiment of Portable Electronic Device Having Power Generation Function]

Next, an embodiment in which a portable electronic device having a power generation function is applied to an electronic timepiece 1A will be explained based on drawings. In each embodiment explained below, the same symbols will be allotted to the same structures as the aforementioned embodiment.

[Overall Structure of the Electronic Timepiece]

Figure 11:
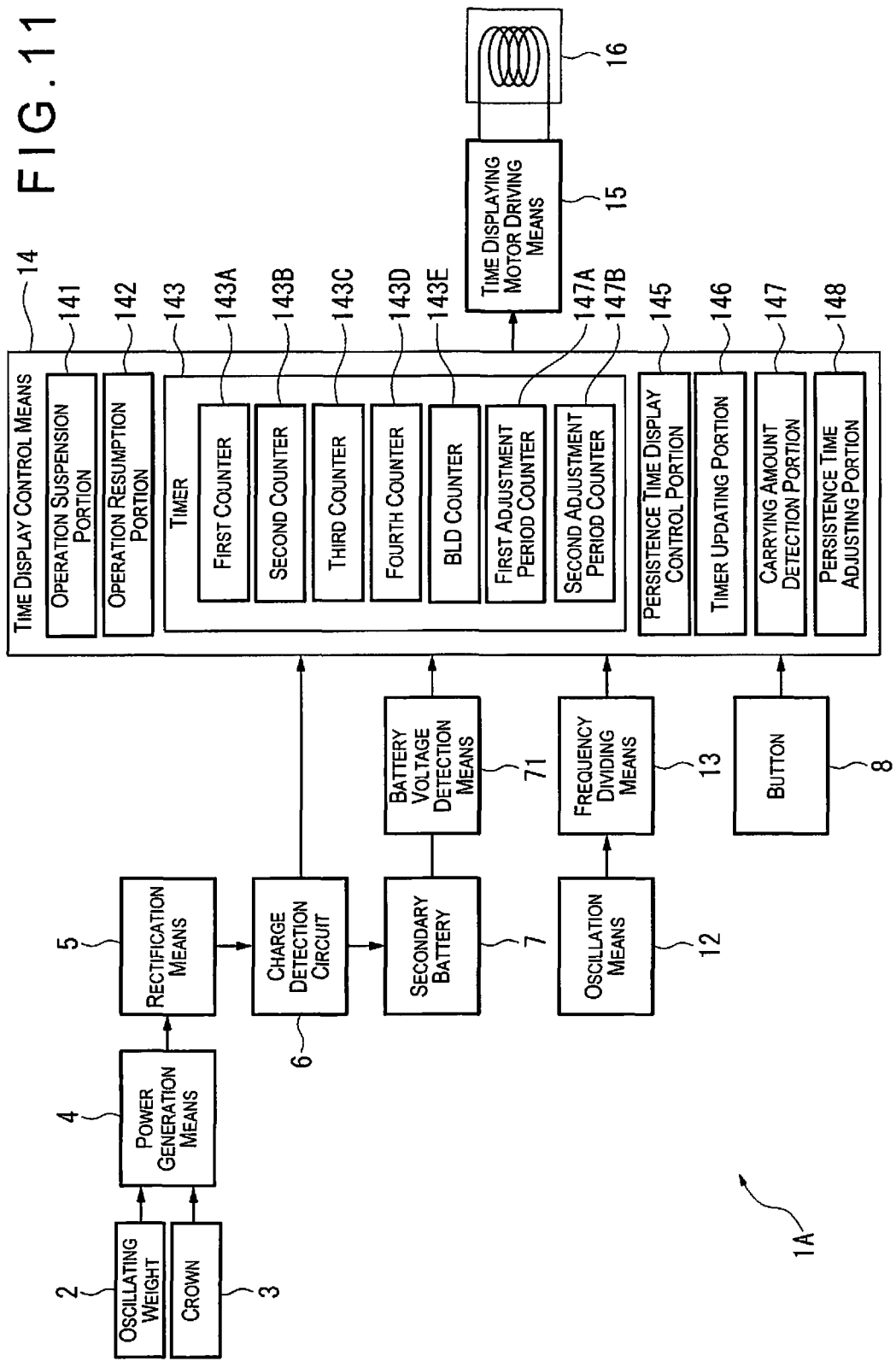
FIG. 11 a block diagram showing a structure of an electronic timepiece as a portable electronic device having a power generation function.

The electronic timepiece 1A is equipped with an oscillating weight 2, a crown 3, a power generation means (unit) 4, a rectification means (unit) 5, a charge detection means (unit) 6, a secondary battery 7 as a power storage means (unit), a button 8 as a display operation means (unit), an oscillation means (unit) 12, a frequency dividing means (unit) 13, a time display control means (unit) 14 as an operation control means (unit), a time displaying motor driving means (unit) 15, and a time displaying motor 16, as shown in FIG. 11. Furthermore, the electronic timepiece 1A is equipped with a battery voltage detection means (unit) 71 as a voltage detection means (unit) for detecting the voltage of the secondary battery 7.

Figure 12:
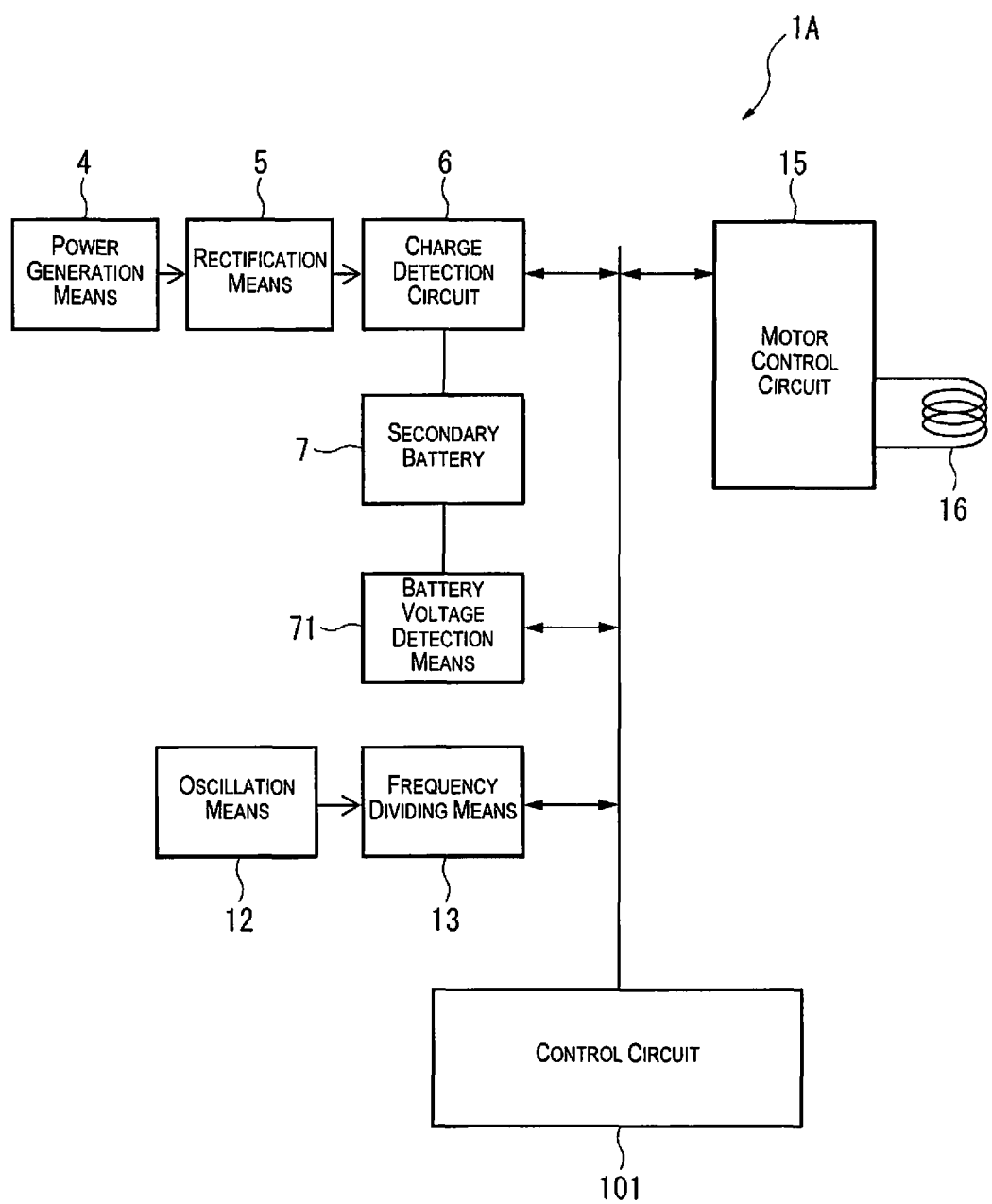
FIG. 12 is a circuit block diagram of the electronic timepiece.

As shown in the hardware block diagram of FIG. 12, the charge detection means (unit) (charge detection circuit) 6, the frequency dividing means (unit) (frequency dividing circuit) 13, the motor driving means (unit) (motor control circuit) 15, and the battery voltage detection means (unit) (battery voltage detection circuit) 71 are connected to a control circuit (control means (unit)) made of a logic IC (Integrated Circuit). The aforementioned time display control means (unit) 14 is actualized by the control circuit 101. A CPU (central processing unit), a ROM (read only memory), and a RAM (random access memory), etc., can be provided in place of the logic IC. In this case, the time display control means (unit) 14 can be actualized by using a CPU, a ROM, and a RAM to execute a predetermined software.

Figure 13:
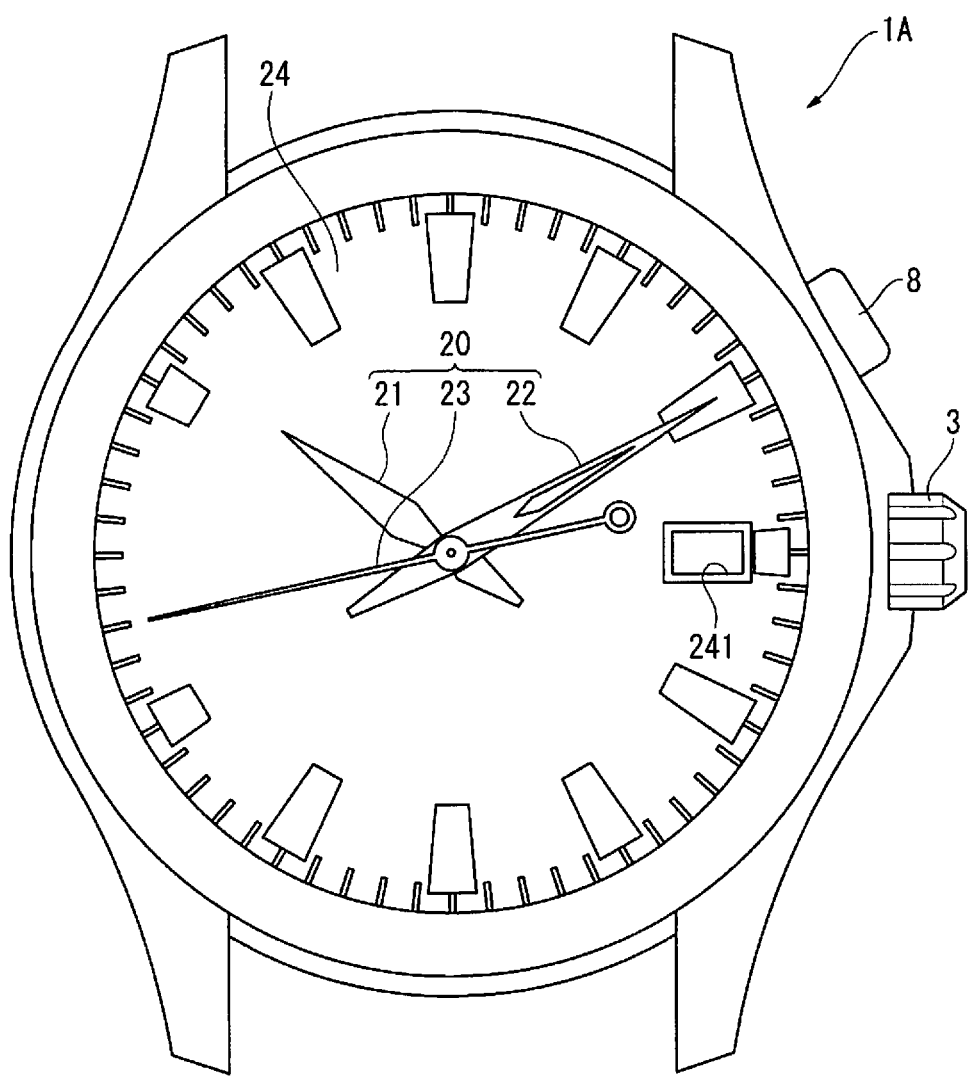
FIG. 13 is a drawing showing the electronic timepiece.

The electronic timepiece 1A, as shown in FIG. 13, is equipped with time displaying pointers 20 including a hour hand 21, a minute hand 22, and a second hand 23, and the time displaying pointers 20 are driven by the time displaying motor 16. A window 241 is formed at the 3 o'clock position on the dial 24, and the date is displayable with a day wheel arranged on the back face of the dial 24. The day wheel is interlocked with the time displaying motor 16.

In the electronic timepiece 1A structured as mentioned above, the timing control means (unit) is structured by the oscillation means (unit) 12, the frequency dividing means (unit) 13, and the time display control means (unit) 14, and the time display means (unit) is structured by a time displaying motor driving means (unit) 15, a time displaying motor 16, and time displaying pointers 20. This time display means (unit) constitutes a device which is the subject of the operation control in the invention.

The persistence time display means (unit) is constituted by the time displaying motor driving means (unit) 15, the time displaying motor 16, and the second hand 23. That is, the persistence time display means (unit) displays the persistence time (hereinafter can be abbreviated as a persistence time in some cases) by the movement of the second hand 23.

The time display control means (unit) 14, as shown in FIG. 11, is equipped with an operation suspension portion 141 for suspending the operation of the time display means (unit, device), an operation resumption portion 142 for resuming the operation, a timer (counter) 143 for measuring the time set by using a reference signal from the frequency dividing means (unit) 13, a persistence time display control portion 145 for controlling the display of the persistence time by controlling the drive of the second hand 23, a timer updating portion 146 for updating the remaining time of the timer 143, a carrying amount detection portion 147, and a persistence time adjusting portion 148.

[Power Generation Means]

Figure 14:
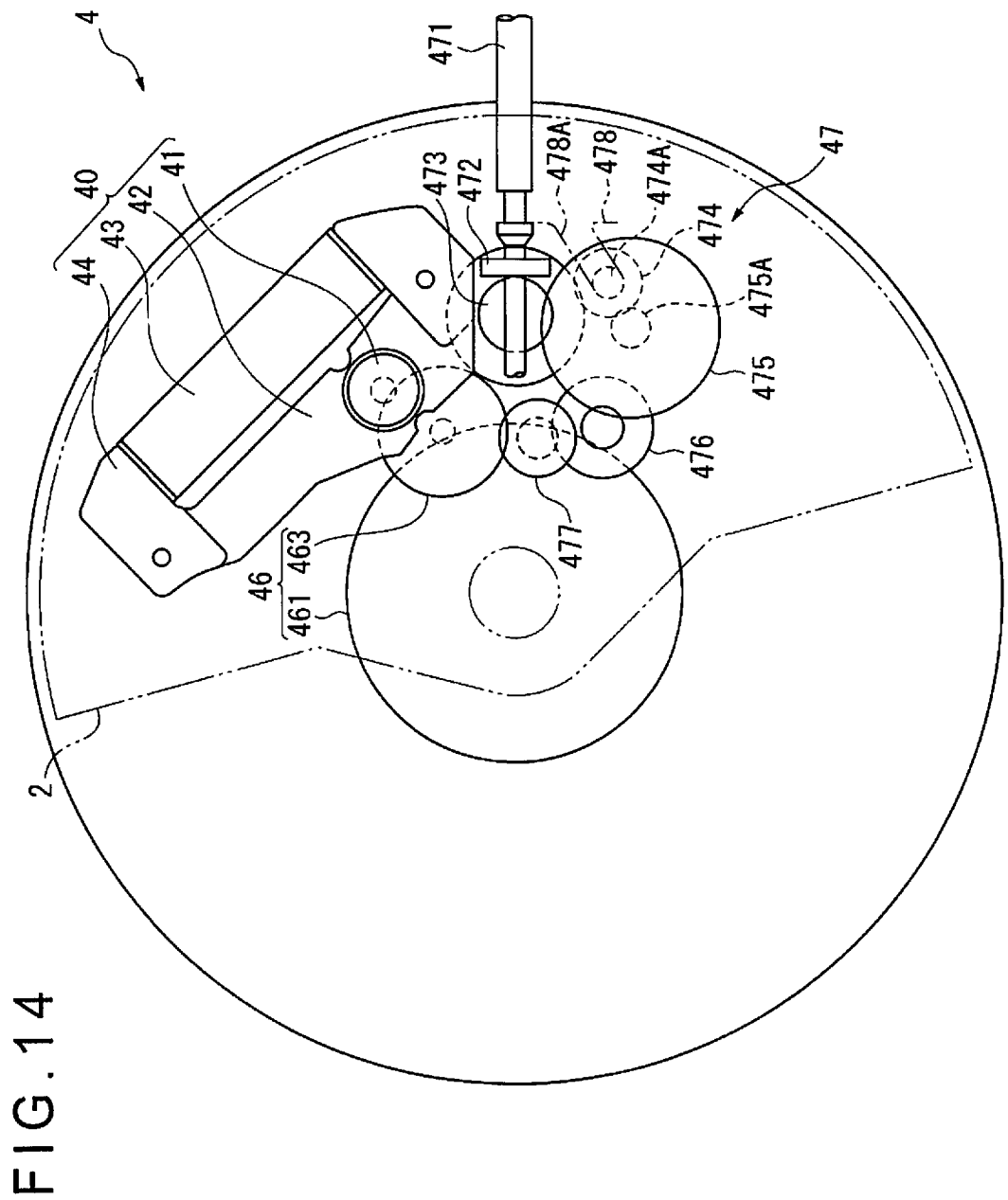
FIG. 14 is a drawing showing a structure of a power generation means (unit) of the electronic timepiece.

The power generation means (unit) 4 is constituted so as to be able to perform self-winding power generation using the oscillating weight 2 disposed inside the case of the electronic timepiece 1, and hand-winding generation using a crown 3, as shown in FIG. 14. That is, the power generation means (unit) 4 is equipped with a power generation device 40, a self-winding power generating transmission means (unit) 46 for transmitting mechanical energy from a crown 3 to the power generation device 40, and a hand-winding power generating transmission means (unit) 47 for transmitting mechanical energy from the crown 3 to the power generation device 40. For the power generation means (unit), only the power generation device 40 or a self-winding power generating transmission means (unit) 46 can be provided without providing a hand-winding power generating transmission means (unit) 47.

The power generation device 40 is a common alternating current generator provided with a stator 42 in which a rotor 41 is rotatably disposed, and a coil block 44 in which a coil 43 is winded.

The self-winding power generating transmission means (unit) 46 is equipped with an oscillating weight wheel 461 that integrally rotates with the oscillating weight 2 and a coupling wheel 463, to which the rotation of the oscillating weight wheel 461 is transmitted. The coupling wheel 463 is engaged with the pinion of the rotor 41, and when the oscillating weight 2 rotates, the revolution force is transmitted to the rotor 41 via the oscillating weight wheel 461 and the coupling wheel 463, and power is generated by the power generation device 40. Also, the coupling wheel 463 has a structure in which an interference avoidance means (unit) by a ratchet wheel or a slippage structure, not illustrated in the drawings, is provided, and constituted so that the transmission of the force at the time of the hand-winding power generation and the transmission of the force from the movement of the rotor at the time of the self-winding power generation do not interfere.

The hand-winding power generating transmission means (unit) 47 is equipped with a pendant winding-mechanism 471, a winding pinion 472, a crown 473, an oscillating wheel 474, a first hand-winding transmission wheel 475, a second hand-winding transmission wheel 476, a third hand-winding transmission wheel 477, and the coupling wheel 463. Since a crown 3 is attached to the front end of the pendant winding-mechanism 471, the pendant winding-mechanism 471 rotates when a user turns the crown 3. The rotation of the pendant winding-mechanism 471 is transmitted to the oscillating wheel 474 via the winding pinion 472 and the crown 473, the rotation of the oscillating wheel 474 is transmitted to the first hand-winding transmission wheel 475, and the rotation of the first hand-winding transmission wheel 475 is transmitted to the coupling wheel 463 via the second hand-winding transmission wheel 476 and the third hand-winding transmission wheel 477.

In this case, the oscillating wheel 474 is engaged with a pinion 475A of the first hand-winding transmission wheel 475 only during the rotation of the pendant winding-mechanism 471 in one direction. Specifically, a slit 478A is provided on a bridge 478 to which the oscillating wheel 474 is attached, and a supporting axis 474A of the oscillating wheel 474 is slidably fit in the slit 478A. Therefore, in the case of FIG. 14, when the crown 473 rotates in the clockwise direction by the winding operation, the oscillating wheel 474 moves toward the center side of the first hand-winding transmission wheel 475 while rotating in the counterclockwise direction, and engages with the pinion 475A. On the other hand, when the first hand-winding transmission wheel 475 rotates in the counterclockwise direction by the drive from the coupling wheel 463, the oscillating wheel 474 separates from the pinion 475A while rotating in the clockwise direction, and disengages from the first hand-winding transmission wheel 475. With such structure, the rotation of the oscillating weight 2 is not transmitted to the pendant winding-mechanism 471. When a hand-winding power generating transmission means (unit) 47 is not provided, there is no need to provide the oscillating wheel 474, the first hand-winding transmission wheel 475, the second hand-winding transmission wheel 476 and the third hand-winding transmission wheel 477.

[Rectification Means]

The rectification means (unit) 5 is for rectifying the alternating current output from the power generation device 40, and a commonly known rectifying circuit such as a full-wave rectifying circuit and a half-wave rectifying circuit can be used.

[Charge Detection Means]

The charge detection means (unit) 6 is for detecting whether or not the electric current generated by the power generation means (unit) 4 is charged in the secondary battery 7. Therefore, the charge detection means (unit) 6 can be an electric current detection circuit for detecting the magnitude of the current rectified by the rectifying means (unit) 5 or a voltage detection circuit for detecting the voltage generated by the rectifying means (unit) 5 during charging. Therefore, for the charge detection means (unit) 6, well-known various types of electric current detection circuits and voltage detection circuits can be used. For example, as an electric current detection circuit, e.g., an electric current detection circuit including a resistance disposed between the rectifying means (unit) 5 and the secondary battery 7, a peak detection circuit for detecting the peak value of the generated current by measuring the electric current flowing through the resistance, and a comparison circuit for comparing the value detected by the peak detection circuit and the threshold value can be used.

The charge detection means (unit) 6 having such a structure checks the charging current to be charged in the secondary battery 7. When a CPU is provided, the charge detection means (unit) 6 can be driven by a predetermined sampling rate (sampling period) by a signal from the CPU, and can sample the charging current to be charged in the secondary battery 7. Also, when a peak detection circuit and a comparison circuit are provided as the charge detection circuit, the peak detection circuit samples the charging current output from the rectifying means (unit) 5 to detect the peak value of each sampling. In the comparison circuit, the peak value detected by the peak detection circuit is compared with a predetermined threshold value and the detected result signal thereof can be output to the time display control means (unit) 14.

[Power Storage Means]

The power storage means (unit) is constituted by a secondary battery 7 capable of charging a charging current (generated current). The secondary battery 7 is, for example, constituted by a lithium-ion battery. In addition, the output of the power generation means (unit) 4 is rectified by the rectifying means (unit) 5 and charged to the secondary battery 7 via the charge detection means (unit) 6. As a power storage means (unit), not only a secondary battery 7 but also a capacitor can be used.

[Charge Detection Means of Secondary Battery]

The voltage of the secondary battery 7 is detected by the battery voltage detection means (unit) 71. The battery voltage detection means (unit) 71 is constituted by a common voltage detection means (unit) for detecting the voltage of the secondary battery 7 by a predetermined sampling timing (2 second intervals, for example).

[Timing Control Means And Time Display Means]

Since a well-known timing control means (unit) and a time display means (unit) for displaying the time have the structure of a well-known and common analog-type quartz timepiece, the detailed explanation will be omitted. That is, the oscillation means (unit) 12 is constituted by a crystal oscillator, an oscillation circuit, etc., and outputs a predetermined frequency signal. The frequency dividing means (unit) 13 divides the frequency of the signal from the oscillation means (unit) 12, and outputs a reference signal of 1 Hz, for example.

The time display control means (unit) 14 outputs a driving signal to the time displaying motor driving means (unit) 15 based on the reference signal of the frequency dividing means (unit) 13. Normally, a driving signal is output every time a reference signal of 1 Hz is input from the oscillation means (unit) 12. The time displaying motor driving means (unit) 15 inputs into a motor coil of the time displaying motor 16 based on the driving signal and the time displaying motor 16 operates the time displaying pointers 20 in a step motion. In this embodiment, the timepiece circuit is constituted by the oscillation means (unit) 12, the frequency dividing means (unit) 13, the time display control means (unit) 14, etc.

[Operation Suspension Portion]

The operation suspension portion 141 of the time display control means (unit) 14 is constituted so that, when the persistence time timed by the timer 143 becomes 0 (zero) hour, the time displaying pointers 20 are suspended and switched to a sleep mode, as explained later. This embodiment is also equipped with a BLD counter 143E as the timer 143, so the BLD display mode will be in operation after the persistence time in a normal operation becomes 0 (zero) hour. Therefore, the operation suspension portion 141 suspends the operation of the pointers when the BLD counter 143E operating in the BLD display mode becomes 0 (zero) hour.

The aforementioned sleep mode includes: (A) a pointer operation suspension mode in which the operation of the pointers 20 are suspended by suspending the time displaying motor driving means (unit) 15 while the oscillation means (unit) 12 and the frequency dividing means (unit) 13 are in operation to continue timing the current time; and (B) an IC operation suspension mode (IC operation suspension function) in which the timing of the current time is suspended by stopping the IC operation and the timing of the current time to further reduce the electricity consumption. In the sleep mode of this embodiment, (B) IC operation suspension mode is to be set. In the electronic timepiece 1, one of the aforementioned suspension modes can be equipped or both suspension modes can be equipped for the user to select the suspension mode. Furthermore, both suspension modes can be provided wherein the operation is switched to an operation suspension mode immediately after switching to the sleep mode, and when the operation suspension mode continues for a predetermined period (for example, one week), the operation can automatically switch to the IC operation suspension mode.

[Operation Resumption Portion]

The operation resumption portion 142 of the time display control means (unit) 14 unlocks the IC operation suspension function to resume the operation when charging (generation of the power generation means (unit) 4) is detected by the charge detection means (unit) 6 when the operation is suspended (during sleep mode).

When the sleep mode is the IC operation suspension mode, since the current time is not apparent, the operation resumption portion 142 starts the operation of the suspended pointers 20 from there. In this case, since the current time and the time that the pointers 20 point to are often unmatched, the user is required to match the time by operating the crown 3 or the button 8. It is configured that, when the time correction operation is being performed with the crown 3, etc., the operation of the timer 143 is continued and the remaining time of the persistence time continues to be counted. When the sleep mode is the operation suspension mode, since the current time is timed, the operation resumption portion 142 automatically corrects the pointers 20 to the current time by operating the time displaying motor driving means (unit) 15.

[Timer]

The timer 143 is a counter for counting the persistence time. In this embodiment, a counter counting the remaining time in the normal operation mode, a counter for counting the remaining time in the warning displaying operation mode (BLD operation mode) for issuing a warning for a decrease in voltage are prepared, and a counter for adjusting the time period (rank-up adjustment period) of the persistence time are prepared.

[Counter for Normal Operation Mode]

As a counter for counting the remaining time of the normal operation mode, a plurality of counters, specifically 4 counters 143A to 143D, are provided. These counters 143A to 143D are down counters that count by sequentially subtracting the set initial value. The first counter (first timer) 143A down counts one day (24 hours). Also, the second counter (second timer) 143B down counts a period of 6 days, the third counter (third timer) 143C down counts a period of 23 days, and the fourth counter (fourth timer) 143D down counts a period of 150 days. Therefore, the persistence time of a maximum of: 1 day+6 days+23 days+150 days=180 days can be counted by the first to fourth counters 143A to 143D.

[Counter for BLD Operation Mode]

As a counter for counting the remaining time in the BLD operation mode, a BLD counter 143E is provided. The BLD counter (BLD timer) 143E down counts 24 hours. The BLD counter 143E is for setting a period for a BLD display by the pointers 20. The BLD display denotes an operation for displaying a warning called a Battery Low Display or a Battery Life Indicator, and for example, the second hand is moved for 2 seconds every 2 seconds as a warning movement that differs from a normal operation. This notifies the user that the battery voltage is decreasing. When the operation is suspended without using the BLD display, the BLD counter 143E does not have to be provided for the timer 143.

[Counter for Adjustment Period]

As a counter for counting the remaining time of the adjustment period, the first adjustment period counter 147A and the second adjustment period counter 147B are provided. The first adjustment period counter 147A is a timer for counting one day (24 hours) by up counting. The second adjustment period counter 147B is a timer for counting 7 days by up counting.

[Persistence time Display Control Portion]

Figure 15:
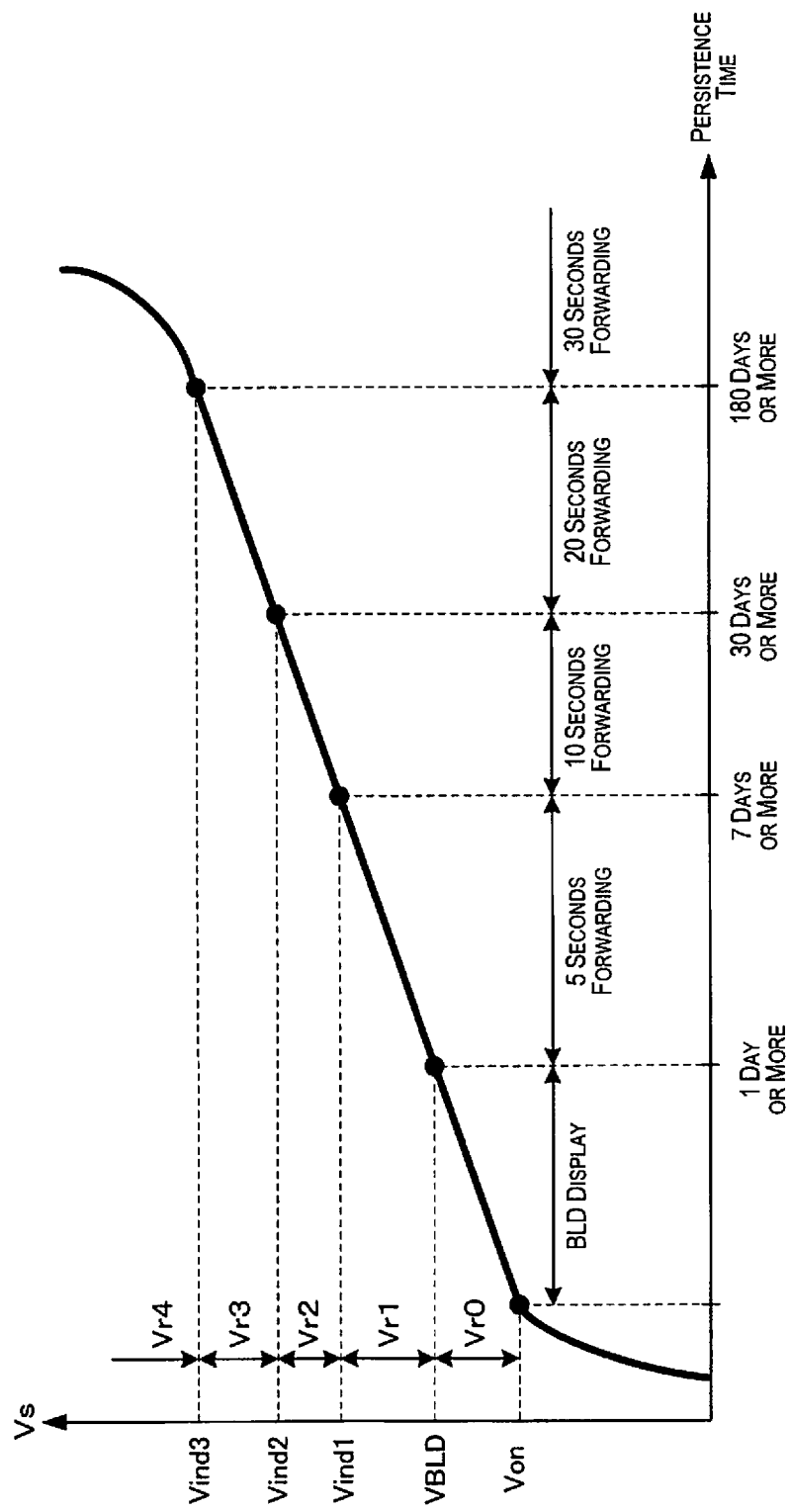
FIG. 15 is a graph showing a relationship between a voltage of a secondary battery and a persistence time.

The persistence time display control portion 145 includes: (A) an indicator display function of the persistence time in which the second hand 23 is used; and (B) a function for controlling the operation of the timer 143. That is, the persistence time display control portion 145 checks the voltage of the secondary battery 7 detected by the battery voltage detection means (unit) 71 when the persistence time display operation is performed by the button 8. The persistence time display control portion 145 judges whether or not the voltage of the secondary battery 7 corresponds to any of the plural voltage ranges preliminarily set. In this embodiment, the four continuous voltage ranges Vr1-Vr4 are set, as shown in FIG. 15. The specific voltage values of each voltage range are arbitrarily set depending on the type of the electronic timepiece 1, etc., and are exemplified as follows. For the first voltage range Vr1, the voltage of the secondary battery is a VBLD (for example, 1.2 V) or more, but less than Vind1 (for example, 1.3 V). For the second voltage range Vr2, the voltage of the secondary battery is a Vind1 (for example, 1.3 V) or more, but less than Vind2 (for example, 1.4 V). For the third voltage range Vr3, the voltage of the secondary battery is a Vind2 (for example, 1.4 V) or more, but less than Vind2 (for example, 1.5 V). For the fourth voltage range Vr4, the voltage of the secondary battery is a Vind3 (for example, 1.5 V) or more. When the voltage of the secondary battery 7 is in a range of less than the VBLD (for example, 1.2 V), but the Von (for example, 1.1 V) or more, the BLD voltage range Vr0 for the BLD display is set.

The persistence time display control portion 145 judges which voltage range the voltage of the secondary battery 7 corresponds to, and performs the indicator display processing set for each voltage range and the persistence time setting processing for the timer 143, as shown in Table 1.

TABLE 1

| Voltage Range | Indicator Display | Persistence Time Setting | Corresponding Counter |
|---|---|---|---|
| First Voltage Range | 5 seconds | 1 Day<br>1 Day of Normal Operation of Pointers + 1 Day BLD | First + BLD (Second counter is prioritized when second counter is in operation) |
| Second Voltage Range | 10 seconds | 1 Week<br>7 Days of Normal Operation of Pointers + 1 Day BLD | First + Second + BLD (Third counter is prioritized when third counter is in operation) |
| Third Voltage Range | 20 seconds | 1 Month<br>30 Days Normal Operation of Pointers + 1 Day BLD | First + Second + Third + BLD (Fourth counter is prioritized when fourth counter is in operation) |
| Fourth Voltage Range | 30 seconds | Full (6 Months) Display 180 Days of Normal Operation of Pointers + 1 Day BLD | First + Second + Third + Fourth + BLD |
| BLD Voltage Range | BLD display | 1 Day of BLD (24 hors) | BLD |

5 seconds in the indicator display refer to an operation method for forwarding the second hand 23 to 5 seconds. That is, the persistence time display control portion 145 controls the time displaying motor driving means (unit) 15 to suspend the second hand 23 for 5 seconds from the forwarding starting point after forwarding it by 5 seconds. Similarly, 10 seconds in the indicator display refer to an operation method of suspending the second hand 23 for 10 seconds from the forwarding starting point after forwarding it for 10 seconds; 20 seconds in the indicator display refer to an operation method of suspending the second hand 23 for 20 seconds from the forwarding starting point after forwarding it for 20 seconds; and 30 seconds in the indicator display refer to an operation method of suspending the second hand 23 for 30 seconds from the forwarding starting point after forwarding it for 30 seconds. As explained above, the BLD display is an operation method for, for example, forwarding the second hand 23 for 2 seconds every 2 seconds.

The persistence time display control portion 145 starts a counter corresponding to the voltage range in which the detected voltage of the secondary battery 7 is included and sets the persistence time of the timer 143. The timer (counter) and the persistence time operated by or set by the persistence time display control portion 145 are as shown in the aforementioned Table 1.

[Timer Updating Portion]

The timer updating portion 146 updates the remaining time of the timer 143 when a charging state is detected by the charge detection means (unit) 6 during the operation of the timer 143 (first to fourth counters 143A to 143D) and when predetermined conditions are met. Specifically, the timer updating portion 146 updates the remaining time of the timer 143 to a persistence time according to the detected voltage when the persistence time according to the detected voltage Vs of the secondary battery 7 detected by the battery voltage detection means (unit) 71 is longer than the remaining time of the operating timer 143. On the other hand, when the persistence time according to the detected voltage is the same as or less than the remaining time of the operating timer 143, the timer updating portion 146 keeps the timer in operation instead of updating the timer 143 in operation. The persistence time according to the detected voltage is the same as the time set by the persistence time display control portion shown in Table 1.

[Carrying Amount Detection Portion]

The carrying amount detection portion 147 detects the carrying amount of the electronic timepiece 1A at the time of resuming the operation by the operation resumption portion 142. The carrying amount of the electronic timepiece 1A is a parameter corresponding to the length of the time in which the electronic timepiece 1A is being carried. In this embodiment, as will be explained later, the carrying amount is detected based on the frequency of the charge detection by the charge detection means (unit) 6.

[Operation Persistence Time Adjusting Portion]

The persistence time adjusting portion 148 adjusts the persistence time when the carrying amount detected by the aforementioned carrying amount detection portion 147 reaches a predetermined value at the time of resuming the operation by the operation resumption portion 142. In this embodiment, as explained later, the persistence time is detected based on the carrying amount and the detected voltage Vs.

[Explanation of Operation of Electronic Timepiece 1]

Next, the operation of the electronic timepiece 1A structured as mentioned above will be explained.

[Operation Suspension Mode S1A]

Figure 16:
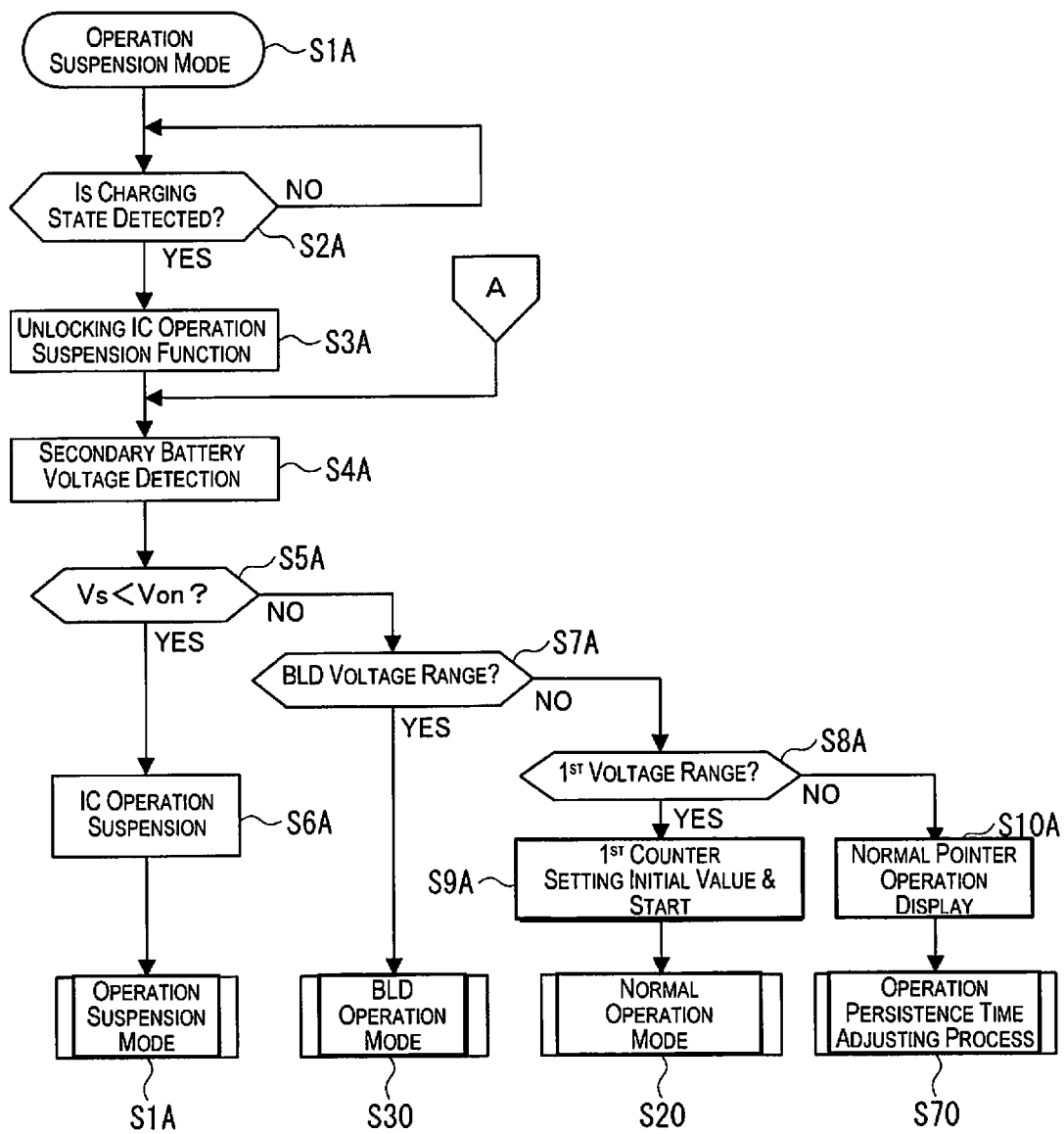
FIG. 16 is a flow chart showing a process of an operation suspension mode of the electronic timepiece.

First, the operation suspension mode in which the time display means (unit, device) is in an IC operation suspension state (Step 1A, hereinafter Step will be abbreviated as "S") will be explained with reference to the flow chart of FIG. 16. The operation suspension mode (sleep mode) S1A is executed when the persistence time in the normal operation becomes 0 (zero) hour and the counter 143E for the BLD display becomes 0 (zero) hour, and when the voltage of the secondary battery 7 decreases below the system suspension voltage Von. The counter 143E for the BLD display becomes 0 (zero) hour when the operation mode is transited from the normal operation mode to the BLD display mode and when the carrying amount does not reach the predetermined value at the time of operation resumption and the period adjustment counters 147A and 147B become 0 (zero) hour and the operation mode is thereby transited to the BLD operation mode in which case charge detection does not exist during the BLD operation mode.

When the operation of the time display means (unit) is suspended and therefore the operation suspension mode S1A is being executed, the motion of IC or the time display control means (unit) 14 is suspended, and only the charge detection means (unit) 6 is in operation. Therefore, the charge detection means (unit) 6 checks whether or not a charging state is detected (S2A). Until a charging state is detected at S2A, the charge detection means (unit) 6 continues to check for the charging detection.

On the other hand, when a charging state is detected and it is judged to be "YES" at S2A, a detection signal is input to the time display control means (unit) 14 from the charge detection means (unit) 6, which starts the operation resumption portion 142, and the IC operation suspension function is unlocked (S3A). The operation resumption portion 142 detects the voltage of the secondary battery 7 during charge detection (detected voltage) Vs with the battery voltage detection means (unit) 71 (S4A). When a memory such as a RAM, etc., is provided, the detected voltage value can be stored in the memory such as a RAM, etc.

Next, the operation resumption portion 142 judges whether or not the detected voltage Vs is below the system suspension voltage Von (S5A). When it is judged to be "YES" at S5A, since the voltage of the secondary battery 7 is low and a normal operation of pointers cannot be resumed, the operation suspension portion 141 suspends the IC operation (S6A) and the operation suspension mode S1A is resumed. When it is judged to be "NO" at S5A, or when the detected voltage Vs is the same as or higher than the system suspension voltage Von, the operation resumption portion 142 judges whether or not the detection voltage Vs is within the BLD voltage range (S7A). Therefore, if the detected voltage Vs is the same as or higher than the system suspension voltage Von, but less than the VBLD, it is judged to be "YES" at S7A.

When it is judged to be "YES" at S7A, the operation resumption portion 142 executes the below mentioned BLD operation mode (S30). When it is judged to be "NO" at S7A, or when the detected voltage Vs is the same as or higher than the VBLD, the operation resumption portion 142 judges whether or not the detected voltage Vs is within the first voltage range (S8A).

[Start-Up Processing in First Voltage Range]

When it is judged to be "YES" at S8A, the operation resumption portion 142 executes the start-up processing in the first voltage range. That is, the operation resumption portion 142 sets an initial value to the first counter 143A and starts counting (S9A). Furthermore, the operation resumption portion 142 executes the below mentioned normal operation mode S20. The first counter 143A is a down counter for counting one day (24 hours). Therefore, an initial value for timing the persistence time for one day is set as a counter value for the first counter 143A to constitute the timer 143 for timing the persistence time for one day. For example, when the first counter 143A down countes every one second, the initial value is 60 seconds×60 minutes×24 hours=86,400. Therefore, the operation resumption portion 142 sets the initial value 86,400 to the first counter 143A and decreases the counter value by "1" every second using, e.g., a reference signal for 1 Hz input from the frequency dividing means (unit) 13.

Here, the lower limit value of the first voltage range, VBLD, is set so that, when the voltage of the secondary battery 7 is the VBLD, and at a point when the time displaying motor 16 is operated for the day with only power from the secondary battery 7 in a state in which power is not generated by the power generation means (unit) 4, the voltage of the secondary battery 7 does not decrease below the system suspension voltage Von.

When it is judged to be "NO" at S8A, or when the detected voltage Vs is the same as or higher than Vind1, the operation resumption portion 142 performs the normal operation of the pointer display (S10A), and further executes the persistence time adjusting processing (rank up adjusting processing) by operating the persistence time adjusting portion 148 (S70).

[Operation Persistence Time Adjusting Processing]

Figure 17:
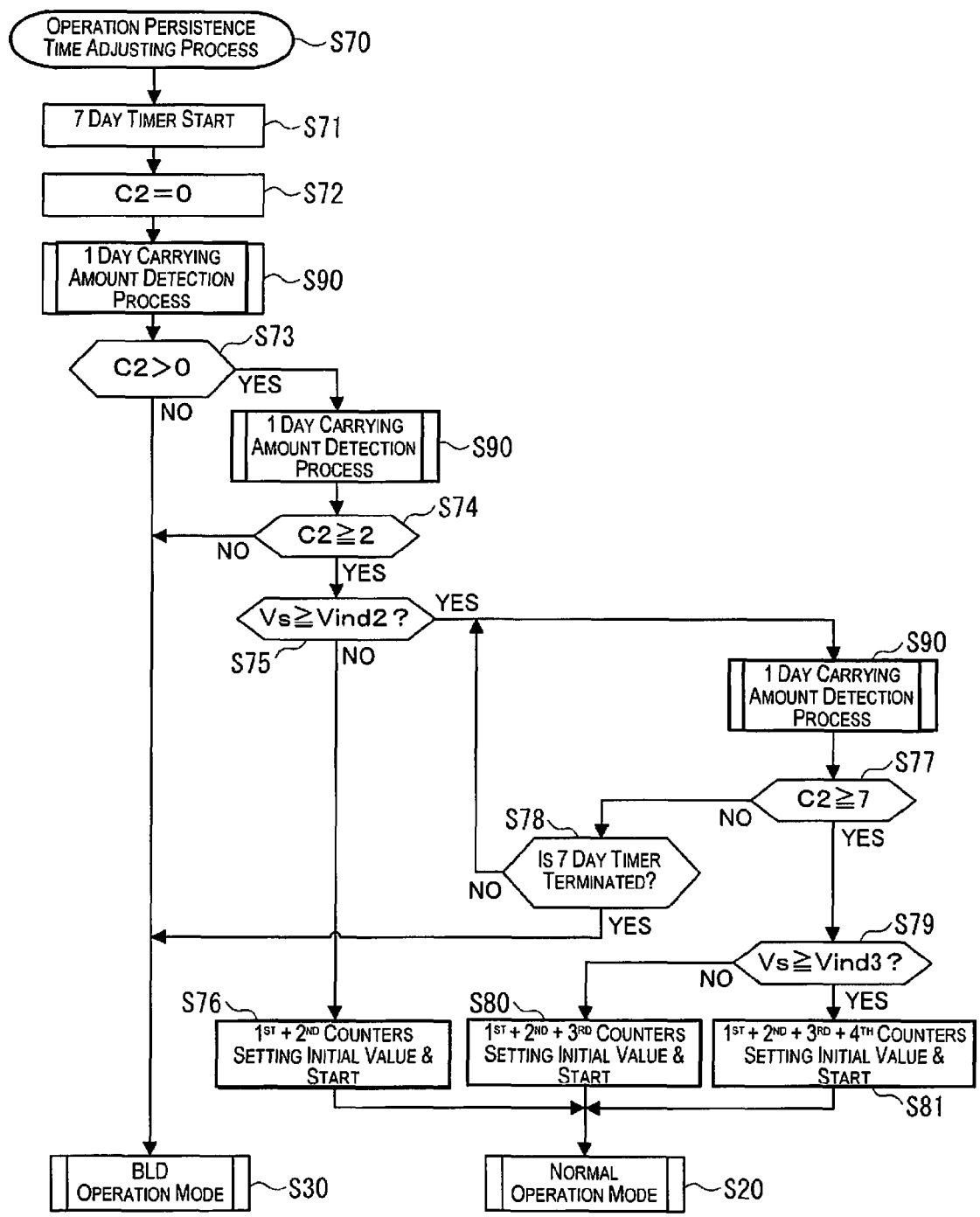
FIG. 17 is a flow chart showing a persistence time adjusting process of the electronic timepiece.

The persistence time adjusting processing S70 will be explained with reference to the flow chart of FIG. 17. The persistence time adjusting processing is a process in which, at the time of resuming the operation, the setting of the persistence time done not only by the voltage value of the detected voltage Vs, but by checking the carrying amount of the electronic timepiece 1A based on its carrying state, and when the carrying amount is small, the persistence time is set to short, and the persistence time is adjusted to longer as the carrying amount increases (rank up adjustment). Therefore, when it is judged to be "NO" at the aforementioned S8A, or when the detected voltage Vs is the same as or higher than Vind1, the persistence time adjusting processing S70 is executed. The reason that the processing is not executed when the detected voltage Vs is in the first voltage range is that, when the detected voltage Vs is in the first voltage range, the persistence time to be set is short such that the initial value of the first counter 143A is one day (24 hours). When such a short persistence time is set, even when a charge detection is performed by temporarily operating the electronic timepiece 1A and the timepiece is not in a state of being carried, the operation is suspended at a point when the operation mode has transited from a normal operation mode S20 to a BLD operation mode S30 after one day and another day have passed (a point when a total of 2 days has passed), thereby continuing the operation for a long period of time and not wastefully consuming the power of the secondary battery 7. However, when it is judged to be "NO" at S7A and the detected voltage Vs is over VBLD, the persistence time adjusting processing S70 can be executed.

The persistence time adjusting portion 148 starts counting by the counter 147B (7 day timer) for the second adjusting period (S71). Furthermore, the carrying amount C2, which is the detected number of the carrying amount for one day, is initialized as "0" (S72). The persistence time adjusting portion 148 operates the carrying amount detection portion 147 to execute the one day carrying amount detection processing.

[One Day Carrying Amount Detection Processing]

Figure 18:
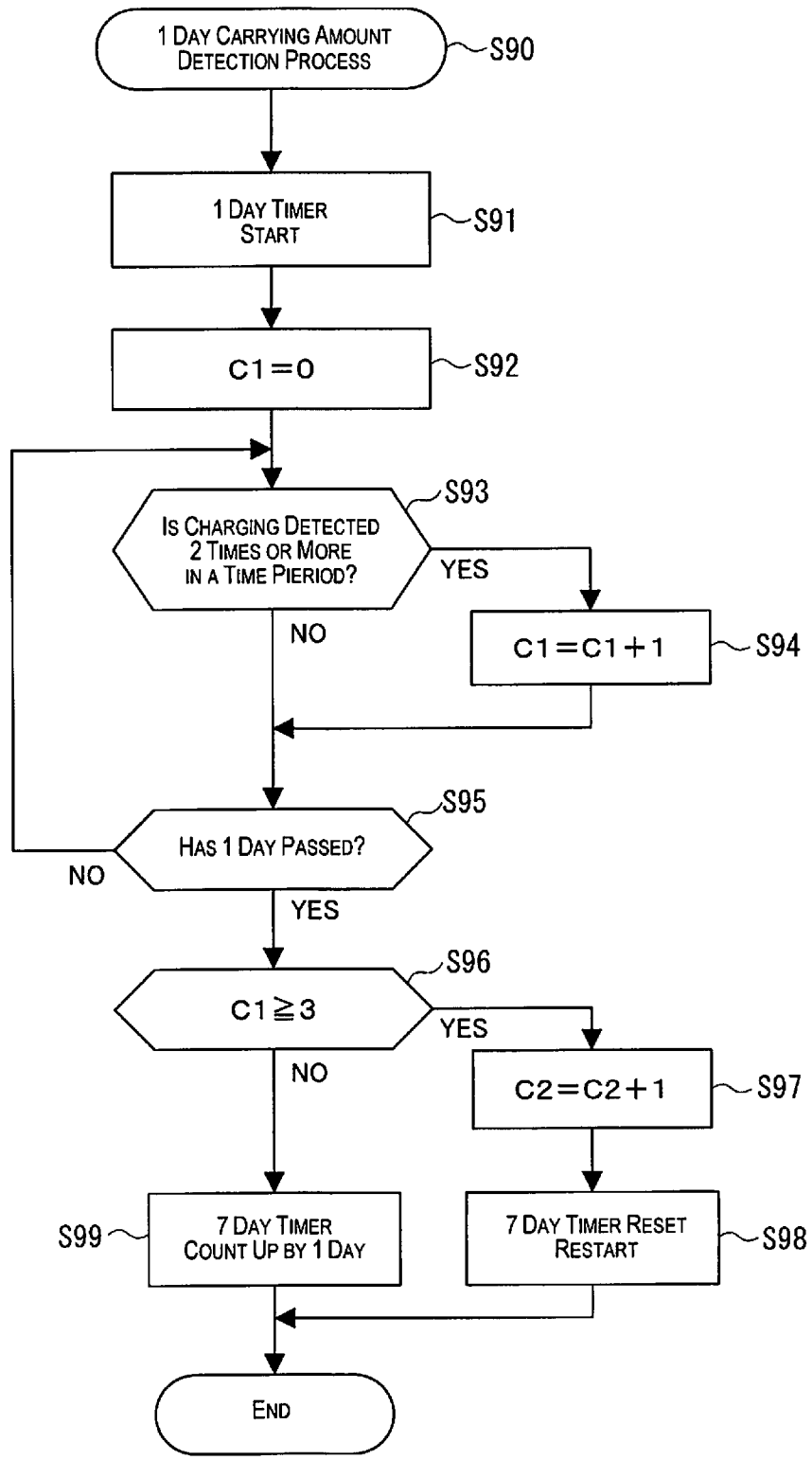
FIG. 18 is a flow chart showing a detection process of one day's carrying amount in the persistence time adjusting process of the electronic timepiece.

The carrying amount detection portion 147 starts counting by the counter 147A (one day timer) for the first adjusting period (S91). Also, the variable C1 showing the number of time periods in which a carrying state is detected (carrying state detection time period) is initialized as "0" (S92), as shown in FIG. 18. In this embodiment, one day is divided into 8 time periods from the starting point of the one day carrying amount detection processing S90 as a starting point. Therefore, the length of each time period is 3 hours. Therefore, for example, if 7:10 becomes a starting point, the first time period is 7:10 to 10:10, the second time period is 10:10 to 13:10, the third time period is 13:10 to 16:10, the fourth time period is 16:10 to 19:10, the fifth time period is 19:10 to 22:10, the sixth time period is 22:10 to 1:10 of the next day, the seventh time period is 1:10 to 4:10, and the eighth time period is 4:10 to 7:10.

The division number of time periods of one day is not limited to 8. For example, one day can be divided into 12 time periods, so that the length of each time period is 2 hours. Also, one day can be divided into 24 time periods, so that the length of each time period is 1 hour.

The carrying amount detection portion 147 judges whether or not 2 or more charging state was detected in one time period by the charge detection means (unit) 6 (S93). For example, when 2 or more charging states are detected in the aforementioned first time period, it is judged to be "YES" at S93. When it is judged to be "YES" at S93, the carrying amount detection portion 147 adds "1" to C1 (S94). Therefore, when 2 or more charges are detected in the first time period and it is judged to be "YES" at S93, C1 is updated to "1". Also, in each time period, the carrying amount detection portion 147 does not perform charge detection for a predetermined time (for example, 6 to 8 minutes) after the first charge detection. The reason for that is that, when 2 continuous charge detections are allowed, a single movement such as changing the disposed position of the electronic timepiece 1A, not carrying the electronic timepiece 1A, is judged as a carrying state, so an interval of several minutes is provided for charge detection to prevent erroneous judgments.

The carrying amount detection portion 147 judges whether or not one day is counted by the counter 147A for the first adjusting period which is one day timer, that is, whether or not one day has passed since the start of the one day carrying amount detection processing S90 (S95). When it is judged to be "NO" at S95, the carrying amount detection portion 147 repeats the processing of S93-S95 again. Therefore, when it detects 2 or more charges in any of the second to eighth time periods, it is judged to be "YES" at S93 and "1" is added to the variable C1 (S94).

When it is judged in S95 that 1 day has passed ("YES" at S95), the carrying amount detection portion 147 judges whether or not the C1 is "3" or more (S96). When it is judged to be "YES" at S96, the carrying amount detection portion 147 adds "1" to the aforementioned carrying amount C2 (S97). Since C2 is the initial value "0" for the first one day carrying amount detection processing S90 to be executed following S72 in FIG. 17, the carrying amount detection portion 147 updates C2 to "1" and terminates the one day carrying amount detection processing S90. After the processing of S97, the carrying amount detection portion 147 resets and resumes the counter 147B for the second adjusting period as a 7 day timer (S98).

In this embodiment, the threshold value "3" for the judging processing at S96 is set with consideration to the length of time in which the electronic timepiece 1S needs to be carried at a minimum based on the relationship of the amount of power generation and power consumption of the electronic timepiece 1A. That is, in the power generation means (unit) 4 of this embodiment, a carrying time of about 4 to 10 hours is needed to increase the voltage of the secondary battery 7. The time is set to 6 hours in this embodiment. Also, if carried for longer than 6 hours, it is judged that the carrying amount has reached one day. In this embodiment, since the length of each time period is 3 hours, when carrying state is detected in 3 time periods, it is judged that the carrying amount has reached one day. Therefore, at S96, it is judged whether or not C1 is "3" or more. Therefore, when the time period is divided into 12, since the length of each time period is 2 hours, it is judged that the carrying amount has reached one day when carrying states are detected in 4 time periods (total of 8 hours). Similarly, when the time period is divided into 24, since the length of each time period is 1 hour, it is judged that the carrying amount has reached one day when carrying states are detected in 7 time periods (total of 7 hours).

Also, if 3 divided time periods are set (8 hours×3 time periods), it is judged that the carrying amount has reached one day only by detecting charging in one time period. In this case, since the count number is 1 and small, there is an advantage that the circuit scale can be made small. However, if judgment is done only by one time period, erroneous judgments can be made in cases where a time checking operation is temporarily performed within the time period, causing a temporary power generation and detection of charging state even when the electronic timepiece 1A is not being carried. On the other hand, when the count number of the judgment condition is increased too much by setting the threshold value of S96 as "6", etc., it becomes difficult to meet the conditions. Therefore, regardless that the electronic timepiece is not being carried, it can be erroneously judged that the electronic timepiece is being carried, causing suspension of the operation of pointers. Also, if the length of the time period is too long, such as 24 hours, for example, it can be erroneously judged that the electronic timepiece is being carried even if it is not actually being carried when a certain amount of oscillation is applied at the time of starting up the electronic timepiece 1A. Therefore, as in the aforementioned embodiment, it is necessary to judge carrying states in plural time periods in one day.

On the other hand, if it is judged to be "NO" at S96, or when there are 2 or less time periods in which 2 or more charge detections are performed, the carrying amount detection portion 147 counts up the counter 147B for the second adjusting period, which is a 7 day timer, for one day (S99). That is, the 7 day timer is reset when it is judged to be "YES" at S96 and a carrying amount for one day is detected, and counts up by one day when it is judged to be "NO" at S96 and the carrying amount for one day cannot be detected. Therefore, the 7 day timer (counter 147B for the second adjusting period) counts the number of days when a state in which the carrying amount for one day cannot be detected continues. The carrying amount detection portion 147 terminates the processing of the one day carrying amount detection processing S90 without updating C2.

Returning to FIG. 17, when the one day carrying amount detection processing S90 is completed, the persistence time adjusting portion 148 judges whether or not C2 is larger than "0" (S73). When the carrying amount for one day cannot be detected by the one day carrying amount detection processing S90 and it is judged to be "NO" at S73, there is a high possibility that the user is not using the electronic timepiece 1A. Therefore, the persistence time adjusting portion 148 executes the BLD operation mode S30. The BLD operation mode S30 performs the BLD display processing for 24 hours and suspends the operation if there is no charge detection during the time period. Therefore, if the user is using the electronic timepiece 1A, the electronic timepiece 1A will return to the normal operation since the user will notice the warning display and perform charging processing.

[Carrying Detection for 2 Days]

When it is judged to be "YES" at S73, the persistence time adjusting portion 148 performs the one day carrying amount detection processing S90 again following the previous day. Therefore, if 2 or more charge is detected in any of the 3 time periods from the first to eighth time periods, "1" is added to C2, and C2 becomes "2". Then, the persistence time adjusting portion 148 judge whether or not C2 is "2" or more at a point when the one day carrying amount detection processing S90 for the second day is terminated (S74). When it is judged to be "NO" at S74, since the carrying state of the electronic timepiece 1A could be detected for the first day but a charge detection could not be performed and therefore the carrying state could not be detected for the second day, it is predicted that the user stopped carrying the electronic timepiece 1A. Therefore, the persistence time adjusting portion 148 executes the BLD operation mode S30 in a similar way as when it is judged to be "NO" at S73. On the other hand, when it is judged to be "YES" at S74, the persistence time adjusting portion 148 judges whether or not the detected voltage Vs at that point is Vind2 or more (S75).

[Start-Up Process in Second Voltage Range]

When it is judged to be "NO" at S75, since the detected voltage Vs is not in a high voltage range that is the third voltage range or more, the operation resumption portion 142 sets an initial value to the first counter 143A and the second counter 143B and starts counting (S76). In the second counter 143B, an initial value corresponding to 6 days is set as a counter value. Therefore, a timer 143 for timing a persistence timepersistence time for 7 days is constituted by the first counter 143A and the second counter 143B. When the timer 143 is constituted by a plurality of counters, the down counting is started at the counter having the longest period to count. Therefore, at the second voltage range using the first counter 143A and the second counter 143B, the down counting is initially performed by the second counter 143B, and when the counter value of the second counter 143B becomes 0 (zero) hour after 6 days has passed, one days is counted by down counting by the first counter 143A. That is, a period of 6 days+1 day=7 days is counted by the first counter 143A and the second counter 143B.

Here, the Vind1 which is the lower limit value of the second voltage range is set so that the voltage of the secondary battery 7 does not decrease below the system suspension voltage VBLD when the voltage of the secondary battery 7 is Vind1 at a point when the time displaying motor 16 is operated for 7 days only by the power from the secondary battery 7 in a state in which no power is generated by the power generation means (unit) 4. In this embodiment, Vind1 is set to a voltage capable of securing a margin of about 20 days of persistence time.

[Carrying Amount Detection for 7 Days]

When it is judged to be "YES" at S75, the persistence time adjusting portion 148 judges whether or not a carrying state for 7 days can be detected so as to judge whether or not the persistence time can be set as a long time period such as 30 days or 180 days. That is, the persistence time adjusting portion 148 executes the aforementioned one day carrying amount detection processing S90 again and the persistence time adjusting portion 148 judges whether or not C2 is "7" or more (S77). The counter 147B for the second adjustment period starts counting at the time of starting the persistence time adjusting processing S70, and has already executed the one day carrying amount detection processing S90 twice. Therefore, at a point when it is judged to be "YES" at S75, the carrying amount C2 is "2". Therefore, even if a carrying amount for one day is detected at S90 again, C2 becomes only "3". Therefore, it is judged to be "NO" in the first judgment process of S77.

When it is judged to be "NO" at S77, the persistence time adjusting portion 148 judges whether or not the 7 days has been counted by the 7 day timer (counter 147B for the second adjustment period) (S78). As described above, the 7 day timer counts the number of days in which a carrying amount for one day was not continuously detected. Therefore, in the one day carrying amount detection processing S90 after it is judged to be "YES" at S75, if a carrying amount for one day has been detected ("YES" at S96), the count value is "0" since the 7 day timer is reset and resumed. Also, when the carrying amount for one day is not detected ("NO" at S96), the count value is "for one day" since it is the first day in which a carrying amount is not detected. Therefore, since it is judged to be "NO" at S78, the one day carrying amount detection processing S90 is executed again.

When a carrying amount for one day is not detected in the one day carrying amount detection process S90, the value of C2 is not updated, and the 7 day timer counts up by one day. Therefore, until it is judged to be "YES" at S78, the processing of S90, S77, and S78 are repeated. Then, when carrying amount for one day is not detected continuously for 7 days, 7 days is counted by the 7 day timer and counting is terminated. Therefore, it is judged to be "YES" at S78. In this case, the persistence time adjusting portion 148 executes the BLD operation mode S30 to warn the user that the device is not being carried.

On the other hand, when it is judged to be "YES" at S77, i.e., when the number of days in which the carrying amount for one day could be detected has accumulated to 7 days before it becomes a state wherein the carrying amount for one days could not be detected for 7 continuous days, the persistence time adjusting portion 148 judges whether or not the detected voltage Vs is Vind3 or more (S79). That is, even if it becomes C2=2 by the 2 days carrying amount detection and there is a day in which no one day carrying amount could be detected after it is judged to be "YES" at S75, at a point when there are 5 accumulated days in which the carrying amount for one day could be detected and it becomes C2=2+5=7, it is judged to be "YES" at S77.

[Start-Up Process in Third Voltage Range]

When it is judged to be "NO" at S79, the operation resumption portion 142 sets an initial value to the first counter 143A, the second counter 143B, and the third counter 143C, and starts counting (S80). In the third counter 143C, an initial value corresponding to 23 days is set as the counter value. Therefore, a timer 143 for timing a persistence timepersistence time for 30 days is constituted by the first counter 143A, the second counter 143B, and the third counter 143C. In the third voltage range, the third counter 143C initially performs down counting, and when the counter value of the third counter 143C becomes 0 (zero) hour after 23 days, the second counter 143B performs down counting. Next, when the counter value of the second counter 143B becomes 0 (zero) hour after 6 days have passed, the first counter 143A performs down counting. That is, a period of 23 days+6 days+1 day=30 days (1 month) is counted by the first counter 143A, the second counter 143B, and the third counter 143C.

Here, the Vind2 which is the lower limit value of the third voltage range is set so that the voltage of the secondary battery 7 does not decrease below the system suspension voltage VBLD, when the voltage of the secondary battery 7 is Vind2 at a point when the time displaying motor 16 is operated for 30 days only by the power from the secondary battery 7 in a state in which no power is generated by the power generation means (unit) 4. In this embodiment, Vind2 is set to a voltage capable of securing a margin of about 80 days of persistence time.

[Start-Up Process in Fourth Voltage Range]

When it is judged to be "YES" at S79, the operation resumption portion 142 sets an initial value to the first counter 143A, the second counter 143B, the third counter 143C, and the fourth counter 143D, and starts counting (S81). In the fourth counter 143D, an initial value corresponding to 150 days is set as the counter value. Therefore, a timer 143 for timing a persistence timepersistence time for 180 days is constituted by the first counter 143A, the second counter 143B, the third counter 143C, and the fourth counter 143D. In the fourth voltage range, the fourth counter 143D initially performs down counting, and when the counter value of the fourth counter 143D becomes 0 (zero) hour after 150 days, the third counter 143C performs down counting. Next, when the counter value of the third counter 143C becomes 0 (zero) hour after 23 days have passed, the second counter 143B performs down counting. Next, when the counter value of the second counter 143B becomes 0 (zero) hour after 6 days have passed, the first counter 143A performs down counting. That is, a period of 150 days+23 days+6 days+1 day=180 days (6 months) is counted by the first counter 143A, the second counter 143B, the third counter 143C, and the fourth counter 143D.

Here, the Vind3 which is the lower limit value of the fourth voltage range is set so that the voltage of the secondary battery 7 does not decrease below the system suspension voltage VBLD, when the voltage of the secondary battery 7 is Vind3 at a point when the time displaying motor 16 is operated for 180 days only by the power from the secondary battery 7 in a state in which no power is generated by the power generation means (unit) 4. In this embodiment, Vind3 is set to a voltage capable of securing a margin of about 200 days of persistence time.

The operation resumption portion 142 transits the operation to the below mentioned processing of the normal operation mode S20 when the persistence time based on the carrying amount and the detected voltage Vs is set by the processing of S76 to S81 by the persistence time adjusting portion 148 and the adjusting processing (rank up processing) of the persistence time is completed.

[Normal Operation Mode]

Next, the process of the normal operation mode S20 will be explained with reference to FIG. 19. In the normal operation mode S20, the time display control means (unit) 14 controls the time displaying motor driving means (unit) 15 to perform the process of the normal operation of pointers (S21). The normal pointer operation process is continued until the operation is suspended by the operation suspension portion 141. However, in the persistence time display process S50 and the BLD operation mode S30, which will be explained later, a pointer driving control different from the normal operation of pointers is performed.

The time display control means (unit) 14 judges whether or not the persistence time of the normal operation has become 0 (zero) hour (S20). Specifically, since the persistence time set in each voltage range terminates at the time when the first counter 143A finally becomes 0 (zero) hour, it is judged whether or not the first counter 143A becomes 0. If it is judged to be "YES" at S22, the time display control means (unit) 14 executes the BLD operation mode (S30) which will be explained later.

On the other hand, if it is judged to be "NO" at S22, the time display control means (unit) 14 checks the output of the charge detection means (unit) 6 to judge if a charging state is detected (S23). When it is judged to be "YES" at S23, the time display control means (unit) 14 executes the timer updating process S40 which will be explained later by the timer updating portion 146. On the other hand, if it is judged to be "NO" at S23, that is, when no charge detection is performed, the time updating process S40 will not be executed.

After the execution of the timer updating process S40, or when it is judged to be "NO" at the charging state detection process S23, the time display control means (unit) 14 judges whether or not the persistence time display operation is performed by the operation of the button 8 (S24). If it is judged to be "YES" at S24, the persistence time display control portion 145 executes the persistence time display process S50 and returns to the normal pointer operation process (S21). On the other hand, if it is judged to be "NO" at S24, the time display control means (unit) 14 returns to the normal pointer operation process (S21) without executing the persistence time display process. Therefore, the normal operation mode S20 is continuously executed until the normal persistence time becomes 0 (zero) hour.

[Timer Updating Process]

Figure 20:
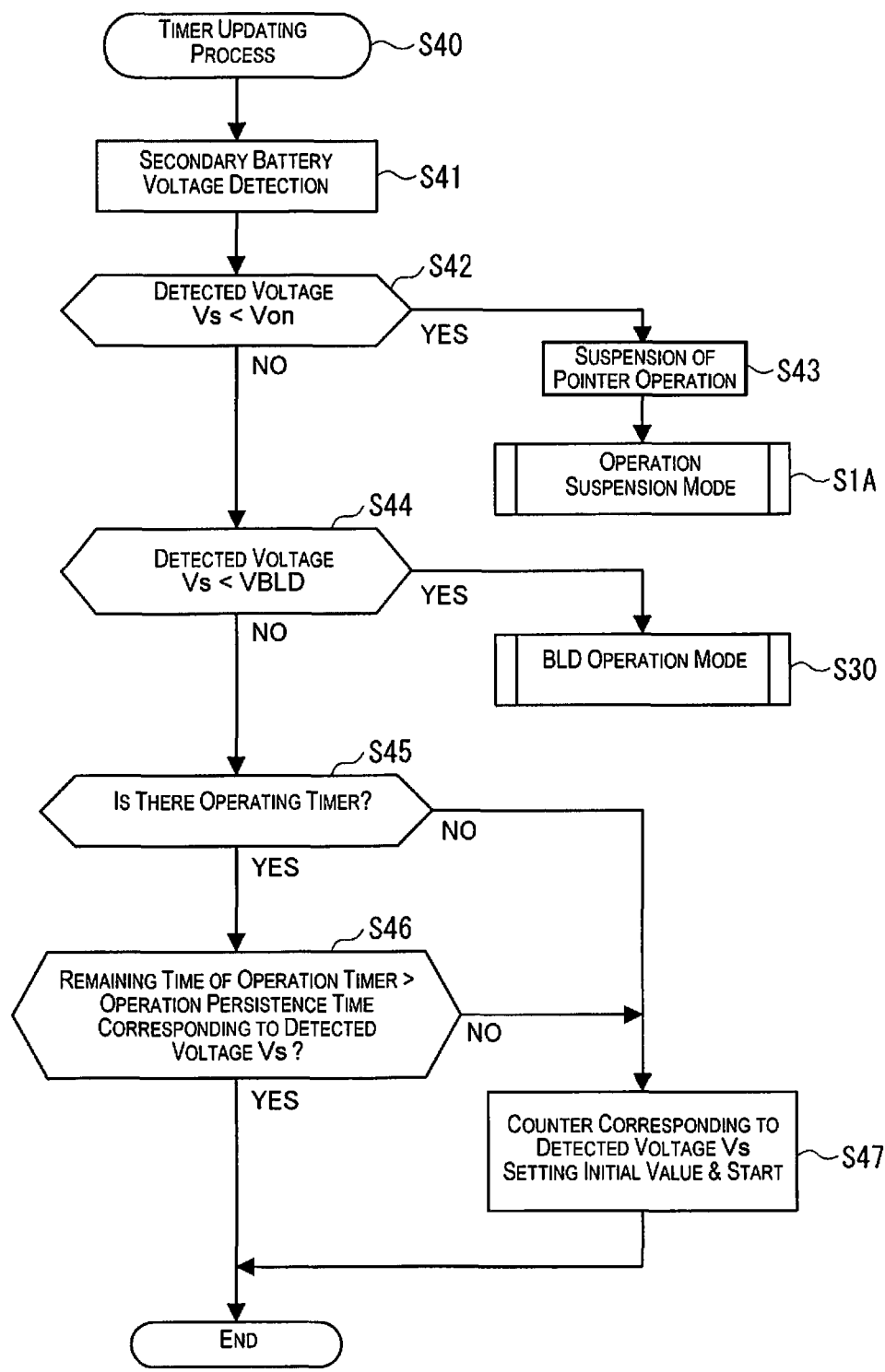
FIG. 20 is a flow chart showing a timer updating processing of the electronic timepiece.

Next, the process of the timer updating process S40 will be explained with reference to FIG. 20. When the timer updating process S40 is executed, the timer updating portion 146 acquires the voltage Vs of the secondary battery 7 detected by the battery voltage detection means (unit) 71 (S41). Next, the timer updating portion 146 judges whether or not the detected voltage Vs is below the system suspension voltage Von (S42). If it is judged to be "YES" at S42, the operation suspension portion 141 suspends the operation of the pointers (S43) and executes the previously mentioned operation suspension mode S1A which is an operation processing when the operation is suspended.

On the other hand, if it is judged to be "NO" at S42, the timer updating portion 146 judges whether or not the detected voltage Vs is below VBLD (S44). If it is judged to be "YES" at S44, the time display control means (unit) 14 executes the BLD operation mode S30. Also, since the timer updating process S40 is executed when a charge is detected during the normal operation mode, there is rarely a possibility that the detected voltage Vs becomes below the system suspension voltage Von or the VBLD, but in this embodiment, the processes of S42 to S44 are set as a countermeasure for errors when the voltage decreases.

When it is judged to be "NO" at S44, the timer updating portion 146 checks whether or not there is an operating timer 143 (S45). During the normal operation mode, normally, since the timer 143 constituted by one or more counters in which the initial values are set in the operation suspension mode S1A as shown in FIG. 16 is operating, it is judged to be "YES" at S45. In that case, the timer updating portion 146 judges whether or not the remaining time which is being counted by the operating timer 143 is longer than the persistence time set according to the detected voltage Vs detected at 541, that is, the initial value of the timer 143 set by the first to fourth voltage ranges in which the detected voltage Vs is included (S46). That is, the timer updating portion 146 determines that it is judged to be "YES" at S46 if, at the counter constituting the operating timer, there is a counter corresponding to a higher voltage range than the voltage range in which the detected voltage Vs corresponds to.

For example, when the detected voltage Vs is in the first voltage range, the corresponding persistence time is 1 day. Therefore, when the remaining persistence time of the timer 143 in operation is longer than 1 day, it is judged to be "YES" at S46, and the timer updating portion 146 uses the timer 143 currently in operation as it is without resetting the timer 143. Also, when the remaining persistence time of the timer in operation is longer than 1 day, it is a case in which down counting is being performed by the second counter 143B, or a case in which an initial value is set for the second counter 143B and down counting is being performed by the third counter 143C or the fourth counter 143D. Therefore, it can be judged whether or not the remaining persistence time of the timer 143 in operation is longer than 1 day by checking whether the second counter 143B has become 0 hours. Similarly, when the detected voltage Vs is in the second voltage range and the remaining persistence time of the timer 143 in operation is longer than 7 days, it is judged to be "YES" at S46 and the timer updating portion 146 uses the counter currently in operation as it is without resetting the timer 143. Also in this case, the judgment can be made by checking whether or not the third counter 143C has become 0 (zero) hour. Also, when the detected voltage Vs is in the third voltage range and the remaining persistence time of the timer 143 in operation is longer than 30 days, it is judged to be "YES" at S46, and the timer updating portion 146 uses the counter currently in operation as it is without resetting the timer 143. In this case, the determination can be made by checking whether or not the fourth counter 143D has become 0 (zero) hour.

That is, the timer updating portion 146 can judge to be "YES" at S46 when the voltage value of the current detected voltage Vs decreases and corresponds to a voltage range lower than the detected voltage Vs when the timer 143 currently in operation was set. In that case, the timer 143 in operation is used as it is.

On the other hand, the timer updating portion 146 judges to be "NO" at S46 when the persistence time corresponding to the current detected voltage Vs is longer than the remaining persistence time of the timer 143 currently in operation. For example, when an operation of 175 days is operated without charge detection after originally setting a persistence time of 180 days, the remaining persistence time will be 5 days. In this case, a user can oscillate the electronic timepiece 1 to extend the persistence time or generate a power by the power generation means (unit) by operating the crown 3 to charge the secondary battery 7 and increase the voltage. When the voltage of the secondary battery 7 is increased to the second, third or fourth voltage range in such a way, the persistence time according to the detected voltage becomes longer than 7 days, 30 days, or 180 days, which are longer than the current remaining persistence time of 5 days. In this case, it is judged to be "NO" at S46.

When it is judged to be "NO" at S45, and when it is judged to be "NO" at S46, the timer updating portion 146 sets an initial value of the counter (timer 143) corresponding to the detected voltage Vs and starts counting by the counter (S47). For example, when there is 5 days of remaining persistence time and the detected voltage Vs is in the third voltage range, it is judged to be "NO" at S46. In that case, the timer updating portion 146 sets initial values to the timer 143 (the timer 143 constituted by the first counter 143A, the second counter 143B, and the third counter 143C) corresponding to the third voltage range in which the detected voltage Vs is included and starts counting.

Figure 19:
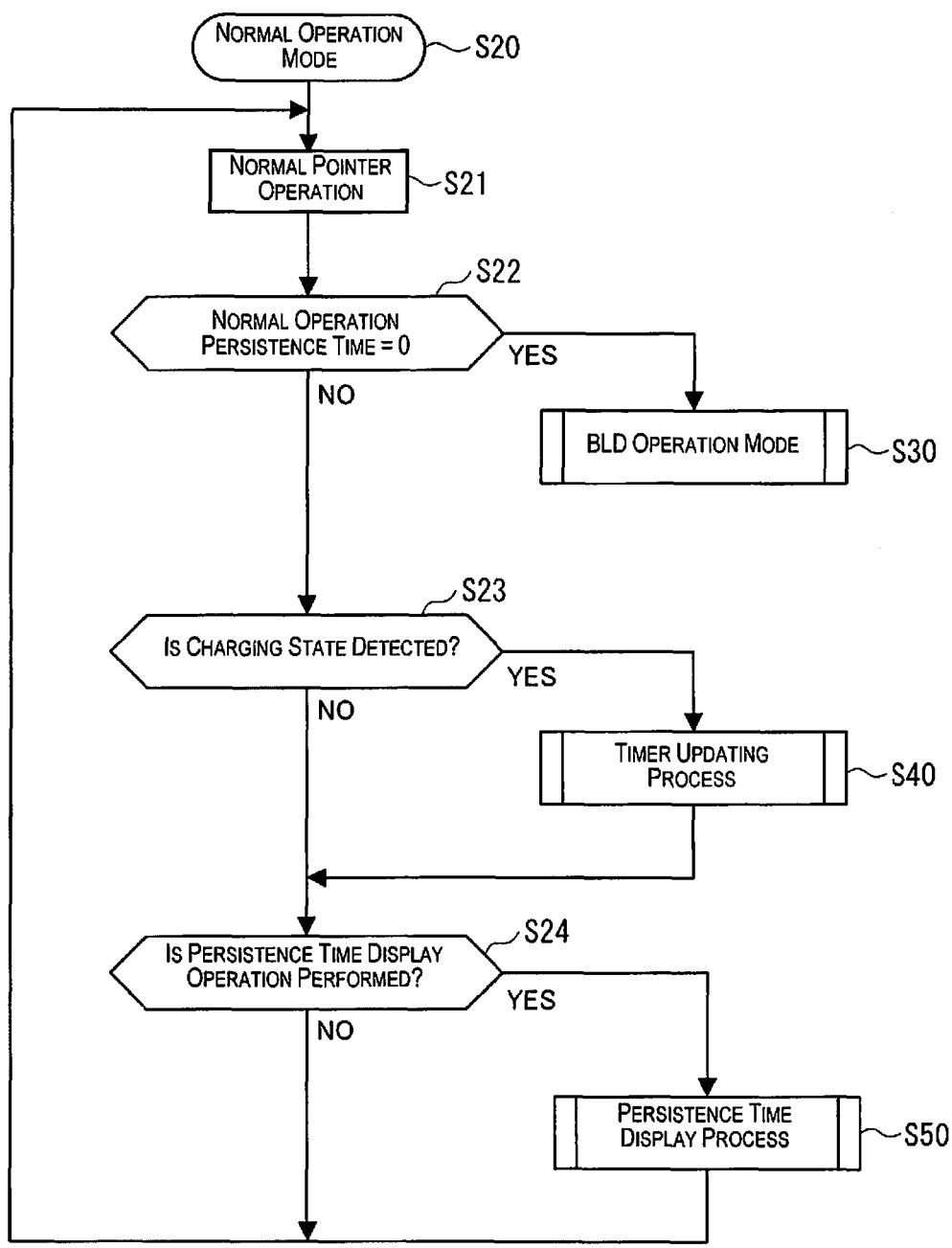
FIG. 19 is a flow chart showing a process of a normal operation mode of the electronic timepiece.

When the process of S47 is performed, and when it is judged to be "YES" at S46, the time display control means (unit) 14 terminates the timer updating process S40 performed by the timer updating portion 146, and returns to the normal operation mode S20 as shown in FIG. 19.

[Persistent Time Display Process S50]

Figure 21:
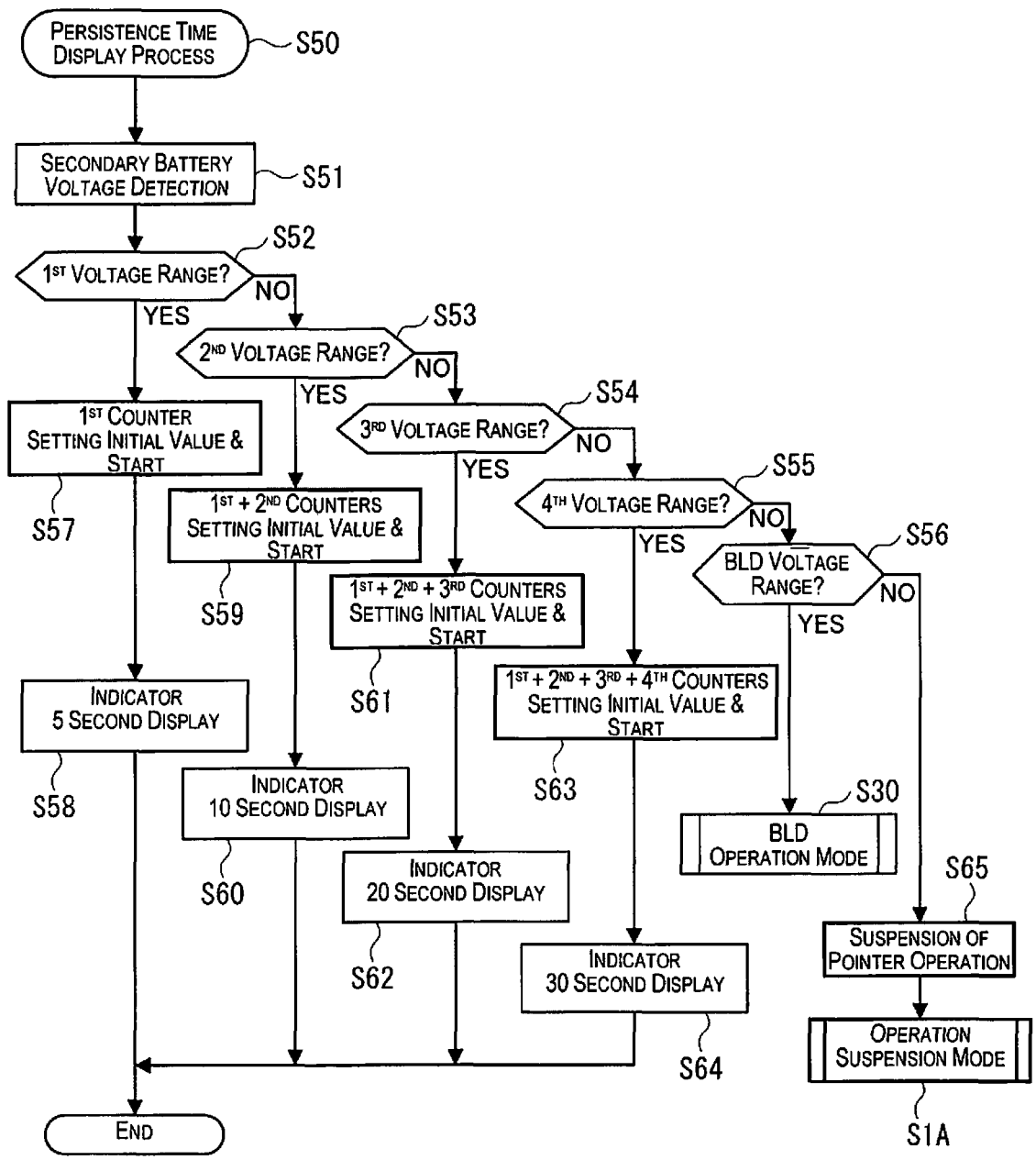
FIG. 21 is a flow chart showing a persistence time display process of the electronic timepiece.

Next, the process of the persistence time display process S50 will be explained with reference to FIG. 21. When the persistence time display process S50 is executed, the persistence time display control portion 145 acquires the voltage Vs of the secondary battery 7 detected by the battery voltage detection means (unit) 71 (S51). Next, the persistence time display control portion 145 judges whether or not the detected voltage Vs corresponds to the first to fourth voltage ranges and the BLD voltage range (S52 to S56).

[Persistence Time Display Process in First Voltage Range]

When the detected voltage Vs is included in the first voltage range ("YES" at S52), the persistence time display control portion 145 sets an initial value to the timer 143 constituted by the first counter 143A, and starts counting (S57). Furthermore, the 5 second display process of the aforementioned indicator will be executed by controlling the time displaying motor driving means (unit) 15 (S58).

[Persistence Time Display Process in Second Voltage Range]

When the detected voltage Vs is included in the second voltage range ("YES" at S53), the persistence time display control portion 145 sets an initial value to the timer 143 constituted by the first counter 143A and the second counter 143B, and starts counting (S59). Furthermore, the 10 second display process of the aforementioned indicator will be executed by controlling the time displaying motor driving means (unit) 15 (S60).

[Persistence Time Display Process in Third Voltage Range]

When the detected voltage Vs is included in the third voltage range ("YES" at S54), the persistence time display control portion 145 sets an initial value to the timer 143 constituted by the first counter 143A, the second counter 143B, and the third counter 143C, and starts counting (S61). Furthermore, the 20 second display process of the aforementioned indicator will be executed by controlling the time displaying motor driving means (unit) 15 (S62).

[Persistence Time Display Process in Fourth Voltage Range]

When the detected voltage Vs is included in the second voltage range ("YES" at S55), the persistence time display control portion 145 sets an initial value to the timer 143 constituted by the first counter 143A, the second counter 143B, the third counter 143C, and the fourth counter 143D, and starts counting (S63). Furthermore, the 30 second display process of the aforementioned indicator will be executed by controlling the time displaying motor driving means (unit) 15 (S64).

Normally, each indicator display process S58, S60, S62, and S64 can be executed just once, but can be continued for a predetermined period of time (for example, for 1 minute) or a predetermined number of times (for example, 4 times). For example, the indicator 5 second display of S58 is a display process to forward the second hand 23 by 5 seconds and then suspend it for 5 seconds from the forwarding starting point, and this process can be performed only once, for 1 minute (that is, 12 times), or a predetermined number of times, such as 4 times.

Also, when the detected voltage Vs is included in the BLD voltage range ("YES" at S56), the BLD operation mode S30 is executed. Furthermore, when it is judged to be "NO" at S56, the detected voltage Vs is below the system suspension voltage Von, so the operation suspension portion 141 suspends the operation of the pointers (S65), and executes the aforementioned operation suspended mode S1A, which is the process executed during operation suspension.

As described above, in the persistence time display process S50, a persistence time according to the detected voltage Vs is set to the timer 143, thereby starting the counting of the remaining time thereof. Furthermore, the indicator display for displaying the set persistence time is operated using the second hand 23.

[BLD Operation Mode]

Figure 22:
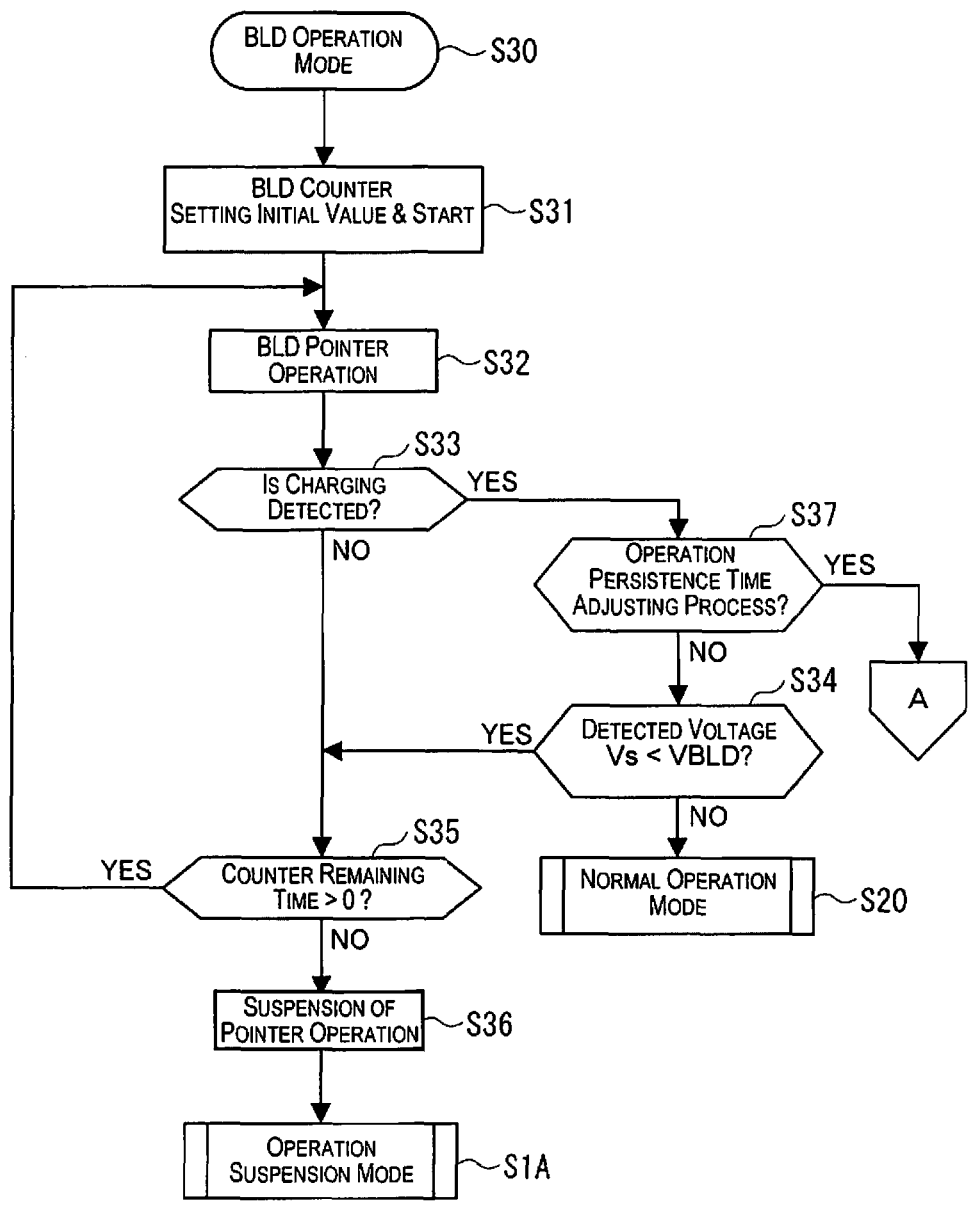
FIG. 22 is a flow chart showing a process of a BLD operation mode of the electronic timepiece.

Next, the BLD operation mode S30 will be explained with reference to FIG. 22. The BLD operation mode S30 is executed when it is judged to be "YES" at S7A (FIG. 16), S22 (FIG. 19), S44 (FIG. 20), and S56 (FIG. 21), when it is judged to be "NO" at S73 and S74 (FIG. 17) (during the persistence time adjusting processing), and when it is judged to be "YES" at S78 (FIG. 17).

The time display control means (unit) 14 sets an initial value to the BLD counter 143E (24 hours in this embodiment) and starts down counting upon the execution of the BLD operation mode S30 to set the remaining time of the BLD operation (S31). Next, the time display control means (unit) 14 executes the BLD operation of pointers (S32). The BLD operation of pointers forwards the second hand 23 by 2 seconds every 2 second, for example, and can be sufficient if it is capable of notifying the user that a BLD operation of pointers different from a normal operation of needles is being executed.

Next, the time display control means (unit) 14 judges whether or not there was a charge detection from the power generation means (unit) to the secondary battery 7 (S33). When it is judged that there is a charge detection ("YES" at S33), the time display control means (unit) 14 judges whether or not the BLD operation mode S30 is executed upon the judgment of "NO" at S73, or whether or not the persistence time adjusting processing S70 is being processed (S37). When it is judged to be "YES" at S37, the operation is brought back to the processing of S4A at the time of resuming the operation as shown in FIG. 16, since it means that there was a charge detection during the persistence time adjusting processing in a state in which the BLD operation mode S30 is being executed without detecting a predetermined carrying amount. Therefore, the operation resumption portion 142 repeats the process S4A and processes thereafter again.

On the other hand, if it is judged to be "NO" at S37, the time display control means (unit) 14 judges whether or not the detected voltage Vs is below the VBLD (S34). When it is judged to be "NO" at S34, or when the voltage of the secondary battery 7 has returned to a higher level than the BLD voltage range, the time display control means (unit) 14 executes the aforementioned normal operation mode S20.

When it is judged to be "NO" at S33 or when it is judged to be "YES" at S34, the time display control means (unit) 14 judges whether or not the remaining time of the BLD counter 143E is more than 0 hours (S35). When it is judged to be "YES" at S35, since the BLD operation period remains, the BLD operation of pointers is continued by returning to the process of S32. On the other hand, when it is judged to be "NO" at S35, since the BLD operation period is terminated, the operation suspension portion 141 suspends the operation of pointers (S36) and executes the aforementioned operation suspension mode S1A.

According to the embodiment, the following effects will be exerted.

(1) The time display control means (unit) 14 is equipped with a carrying amount detection portion 147 and a persistence timepersistence time adjusting portion 148, and sets a persistence time according to the carrying amount and the detected voltage Vs to the aforementioned timer 143 after confirming that the carrying amount has become a predetermined value when detecting a charging state and resuming the operation from an operation suspended state. That is, the persistence time adjusting portion 148 sets the predetermined persistence time after it has become a state in which it can be judged that a user is carrying and using the electronic timepiece 1A. Therefore, a long persistence time can be prevented from being set only by a temporary charge detection, and the power of the secondary battery 7 can be prevented from being wastefully consumed.

(2) Furthermore, the operation resumption portion 142 executes a persistence time adjusting processing S70 by the persistence time adjusting portion 148 in cases other than the case in which it is judged to be "YES" at S8A and the shortest persistence time (one day) at S9A is set ("NO" at S8A), among the plural persistence times that can be set (1 day, 7 days, 30 days, 180 days). Also, the persistence time can be set stepwisely to 7 days, 30 days, and 180 days when the carrying amount detected by the carrying amount detection portion 147 is increased from 2 days to 7 days or the detected voltage Vs is increased. Therefore, when the electronic timepiece 1A is not being carried, the operation can be suspended at an early stage after resuming the operation, and the power consumption of the secondary battery 7 can be controlled.

(3) When detecting the carrying amount of the electronic timepiece 1A, since the charge detection means (unit) 6 used for operation resumption is used, an element for detecting the carrying state by measuring a value such as an electric charge that corresponds to the actual capacity of the secondary battery 7 does not need to be provided, and therefore a circuit can be constituted at low cost. Furthermore, since the carrying amount detection portion 147 divides one day into plural time periods and counts that there is a carrying amount for one day when carrying state is detected in plural time periods, it can accurately detect that the user is wearing the device for 7 hours, for example, in one day. Therefore, the carrying state can be accurately judged.

(4) Since the persistence time display control portion 145 and the timer updating portion 146 are provided, when the display of a persistence time is performed, the suspension of operation in a shorter time than the displayed persistence time can be prevented, and when the secondary battery 7 is charged, a persistence time can be appropriately adjusted according to the voltage of the secondary battery 7. Therefore, the convenience can be enhanced. That is, when the persistence time display process S50 is performed by an operation of the button 8, the persistence time display control portion 145 resets the timer 143 according to the detected voltage Vs, and displays a persistence time according to the detected voltage Vs. Also, since the timer updating portion 146 operates only when a charging state is detected, when power generation is not performed by the power generation means (unit) 4, a normal operation is terminated at the time when the displayed persistence time has passed and the operation can be transited to the BLD operation mode. Therefore, when the power generation means (unit) 4 is not in operation and it is highly likely that the electronic timepiece 1 is not being used, the voltage of the secondary battery 7 can be prevented from decreasing to below the system suspension voltage Von by continuing the operation state beyond necessity. Also, when the power generation means (unit) 4 is operated and it is highly likely that the electronic timepiece 1A is in use, the persistence time is updated according to the voltage of the secondary battery 7, and therefore the operation can be prevented from being suspended while the electronic timepiece 1A is in use. Thus, the convenience can be enhanced. For example, if the timer updating portion 146 is operated even in cases where a charging state is not detected, the persistence time is consistently updated as long as the detected voltage Vs is maintained in the same voltage range, thereby continuing a normal operation until the voltage of the secondary battery 7 decreases below the VBLD. When a charging state cannot be detected, it is highly likely that the electronic timepiece 1A is not being used, and, therefore, electricity is wastefully consumed, and the voltage of the secondary battery 7 during operation suspension decreases and it is highly likely that the secondary battery 7 needs to be charged at the time of resuming the operation. Therefore, there is a disadvantage that the electronic timepiece 1 cannot be immediately used. On the other hand, in this embodiment, since the timer updating portion 146 operates only when a charging state is detected, when a charge detection is not performed for the electronic timepiece 1A, the operation can be suspended by transiting to the BLD operation mode S30 at the time when the set persistence time has passed, thereby making it possible to maintain the voltage of the secondary battery 7 high at the time of operation suspension, and the electronic timepiece 1A can be immediately used when resuming operation.

(5) Furthermore, the timer updating portion 146 newly resets the persistence time of the timer 143 only when the persistence time corresponding to the detected voltage Vs is longer than the remaining persistence time of the timer 143 in operation. Therefore, an inconvenience that a normal operation terminates before the displayed persistence time has passed can be prevented. For example, after the persistence time is set to 180 days when the detected voltage during the persistence time display processing S50 was slightly higher than Vind3 and if the detected voltage Vs becomes in the third voltage range when a charging detection is performed after 10 days of operation, the remaining persistence time becomes shortened from 170 days to 30 days when the timer is automatically switched to a persistence time corresponding to the detected voltage Vs at that time. Therefore, since the normal operation terminates in a shorter time than the persistence time that a user has been aware, the user cannot trust the displayed persistence time, which, as a result, diminishes the convenience. On the other hand, in this embodiment, when the persistence time according to the detected voltage Vs is shorter than the remaining persistence time of the timer 143 in operation, the convenience can be enhanced since the timer 143 in operation can be continuously used and the operation can be continued for the display persistence time.

(6) Furthermore, the timer updating portion 146 newly resets the persistence time of the timer 143 when the persistence time corresponding to the detected voltage Vs is longer than the remaining persistence time of the timer 143 in operation. Therefore, in cases where the user performs a manual power generating operation, such as rotating the oscillating weight 2 by shaking the electronic timepiece 1, for the purpose of extending the persistence time and the voltage of the secondary battery 7 increases, a persistence time according to the voltage value thereof can be newly set. Therefore, convenience can be enhanced by meeting the expectations of the user who performed the power generation operation to extend the persistence time.

(7) In resuming the operation from the operation suspension state (sleep mode), when the voltage Vs of the secondary battery 7 at the time of resuming the operation is detected and the voltage value is Vind1 or higher, the persistence time is set to any of 7 days, 30 days, or 180 days, according to the carrying amount and the detected voltage Vs. At this time, higher the detected voltage Vs is, the timer having a longer persistence time is operated. Therefore, an appropriate operation resumption processing according to the detected voltage Vs can be performed. Specifically, since a persistence time can be set considering the detected voltage Vs, the voltage of the secondary battery 7 can be set so that it doesn't decrease to the system suspension voltage Von or the BLD voltage range even when no power is generated by the power generation means (unit) 4 and the operation is performed for the persistence time only by the charged power. Therefore, the secondary battery 7 can be maintained at the VBLD or higher even while operation is suspended, and when power is generated by the power generation means (unit) 4 and a charging state is detected, the operation of the pointers is immediately resumed, so the user can check the time, which enhances the convenience.

(8) Four timers (counters) of the first to fourth counters 143A to 143D are provided as the timer 143 and each counter 143A to 143D is set corresponding to each voltage range Vr1 to Vr4. Therefore, the structural design of the timer 143 can be simplified in comparison to a case in which only one timer is provided for counting different persistence times. That is, when plural persistence times are managed by one timer, it should be designed such that different persistence times can be set. On the other hand, in this embodiment, the structural design of the timer can be simplified since only the initial value which is the maximum value capable of being counted by each counter 143A to 143D needs to be set.

(9) In this embodiment, the operation of the timer 143 is continued even during the time correction operation by the crown 3, etc. Therefore, for example, even when the electronic timepiece 1A is left in a state in which the crown 3 is pulled out two steps in a timer correction state, the voltage of the secondary battery 7 can be prevented from decreasing to the system suspension voltage Von or below, the timer 143 operates and the operation is suspended when the persistence time becomes 0 (zero) hour.

[Second Embodiment of Portable Electronic Device Having Power Generation Function]

Figure 23:
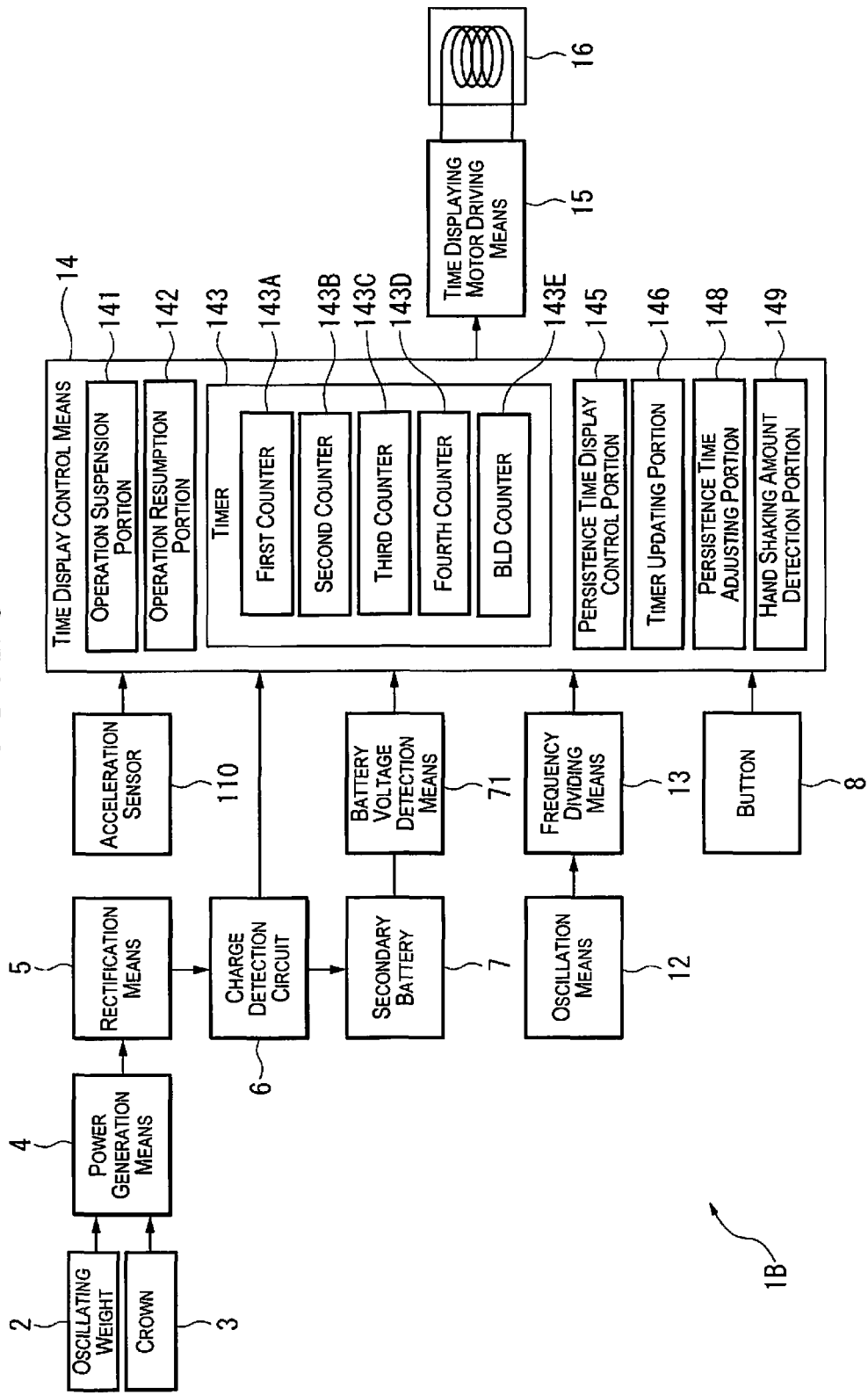
FIG. 23 is a block diagram showing a structure of an electronic timepiece of a second embodiment of a portable electronic device having a power generation function.

In the electronic timepiece 1A of the aforementioned embodiment, the carrying amount is detected by detecting a charging state. However, in the electronic timepiece 1B of the second embodiment of a portable electronic device having a power generation function as shown in FIG. 23, the carrying amount is detected by detecting a continuous charging state of the electronic timepiece 1B. That is, when generating power using an oscillating weight 2, power can be generated by rotating the oscillating weight 2 by shaking the electronic timepiece 1B by hand. Therefore, when starting to use the electronic timepiece 1B in an operation suspension state, a user can sometimes perform a quick charging operation for quickly increasing the voltage of the secondary battery 7 by continuously shaking the device tens to hundreds of times by hand. In this way, when tens to hundreds of shaking motions are continuously performed, in most cases, a user is performing a quick charging operation before using the device with the intention of carrying the electronic timepiece 1B. Therefore, the carrying amount can be estimated from the number of continuous shaking motions to adjust the persistence time.

Therefore, the electronic timepiece 1B is equipped with an acceleration sensor (hand shaking detection means (unit)) for detecting the hand shaking state as a charge detection means (unit) for detecting a continuous charging state in addition to the structure of the electronic timepiece 1A of the aforementioned embodiment. The charge detection means (unit) for detecting a continuous charging state is not limited to the acceleration sensor 110, and an electric current detection means (unit) or a voltage detection means (unit) (charge detection means (unit) 6) for detecting a charging electric current or voltage to the secondary battery 7 can also be used.

Also, the time display control means (unit) 14 is equipped with a hand shaking amount detection portion 149 to which a hand shaking detection signal output from the acceleration sensor 110 is input. The hand shaking amount detection portion 149 counts the time during which the hand shaking detection signal is in a detection state by a 1 Hz clock, and outputs the continuous count number to the persistence time adjusting portion 148. That is, the hand shaking amount detection portion 149 checks every second whether or not the hand shaking state is continued and updates the count number when it is continued. Therefore, the hand shaking amount detection portion 149 detects a continuous charging state, and constitutes the carrying amount detection portion for detecting the continuous charge detection time as the carrying amount.

As the conditions for judging a continuous charging state, it can be judged to be a continuous charging state not only in a case in which a hand shaking state is continuously detected for every sampling of detection of condition (every one second), but also in a case in which, even when there is a time period in which a shaking state is not continuously detected, the time period is a predetermined time period (10 seconds, for example) or less and when a hand shaking state can be continuously detected again. Also, even when there is a time period in which a hand shaking state is not continuously detected, it can be judged to be a continuous charging state when a predetermined number of hand shaking state is counted within a set period of time from the start of the hand shaking state detection. For example, when the count number corresponding to the carrying amount for one day is 200, the count number is reached in 200 seconds when detection is continuously performed every second. In this case, for example, when the set time is 600 seconds (10 minutes) and the detected count number for hand shaking state reaches 200 times within 600 seconds from the starting of the hand shaking state detection, it can be judged to be a continuous charging state. If a carrying amount of one day can be reached in 10 minutes, there is no problem if it is judged to be a continuous charging state although it is in a quick charging state.

On the other hand, since the electronic timepiece 1B does not detect the carrying amount by the charging state like the aforementioned electronic timepiece 1A, the counter 147A for the first adjusting period, the counter 147B for the second adjusting period, and the carrying amount detection portion 147 are not provided to the time display control means (unit) 14.

Figure 24:
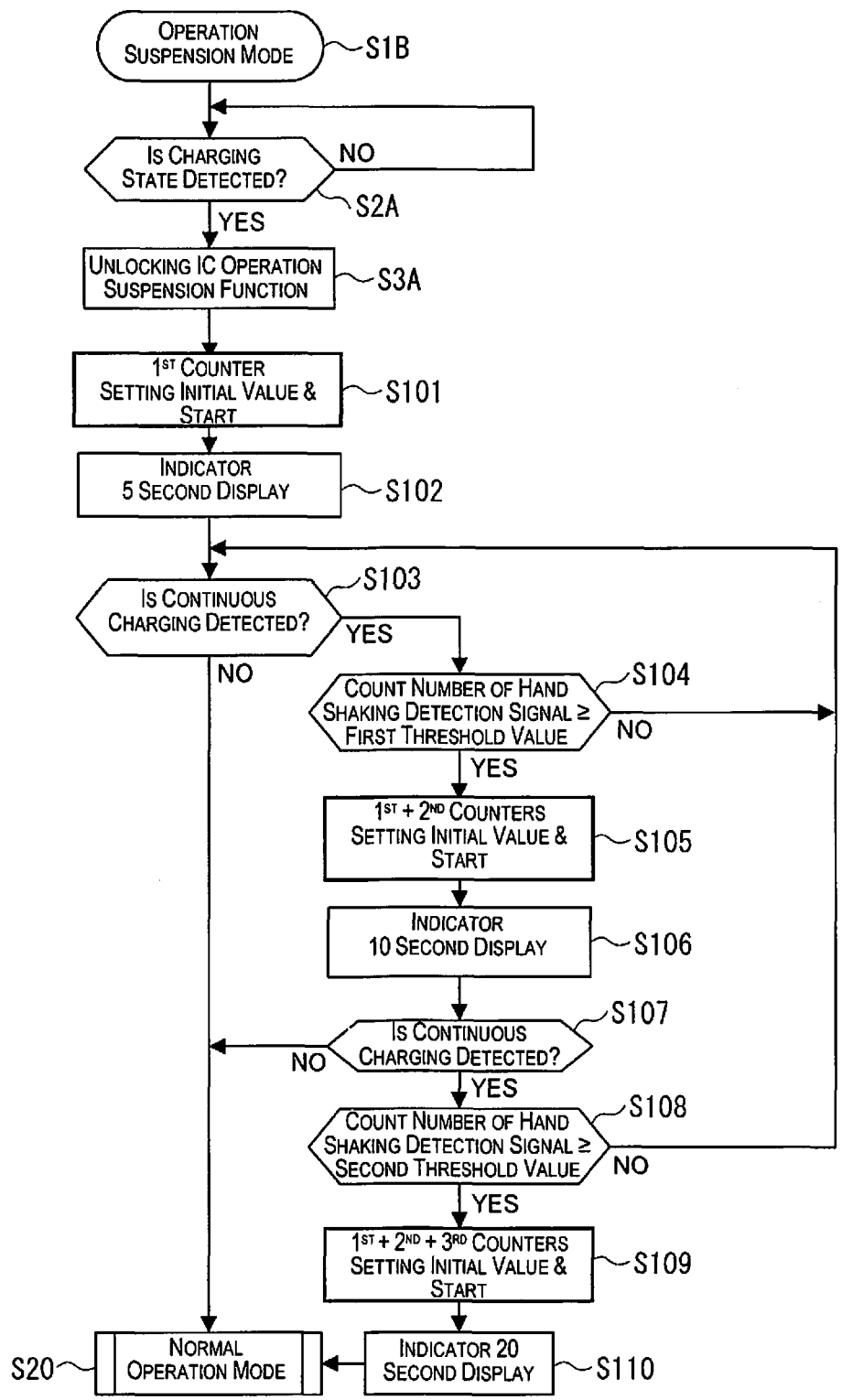
FIG. 24 is a flow chart showing a process of an operation suspension mode of an electronic timepiece of the second embodiment.

Next, the processing at the time of resuming the operation for the electronic timepiece 1B will be explained with reference to the flow chart of FIG. 24. In the operation suspension mode SIB, similarly as the aforementioned electronic timepiece 1A, only the charge detection means (unit) 6 is operated and the charge detection means (unit) 6 judges whether or not there is a charge detection (S2A). Then, when it is judged to be "YES" at S2A, the IC operation suspension function is unlocked (S3A).

Next, when the electronic timepiece 1B is hand shaked and a charging state is detected, the operation resumption portion 142 causes the persistence time adjusting portion 148 to set the initial value to the first counter 143A to set the persistence time to one day and starts counting (S101). Also, a 5 second display corresponding to a persistence time for one day is set and a charging amount indicator display is performed by the second hand 23 (S102).

Next, the persistence time adjusting portion 148 checks for a changes in the count number of the hand shaking amount detection portion 149 and judges whether or not a continuous charging state is being detected (S103). When it is judged to be "YES" at S103, the persistence time adjusting portion 148 judges whether or not the count number of the hand shaking amount detection portion 149 has reached the first threshold value or more (S104). When it is judged to be "NO" at S104, the processing returns to S103 and continues.

When it is judged to be "YES" at S104, that is, at the time when the count number of the shaking detection state has reached the first threshold value, the persistence time adjusting portion 148 sets an initial value to the first counter 143A and the second counter 143B to set the persistence time to 7 days and starts counting (S105). The first threshold value can be set as a number of times corresponding to the charging amount (power generation amount) when the electronic timepiece 1B is carried for one day. For example, if the first threshold value is 200 times, the aforementioned count value reaches the first threshold value when the shaking detection state continues for 200 seconds. Therefore, since it can be judged that a user intends to carry and use the device for one day or more, the persistence time is updated from one day, the shortest persistence time, to 7 days, which is the next step. Therefore, the persistence time adjusting portion 148 sets and displays the charging amount indicator display to a 10 second display corresponding to the persistence time of 7 days (S106). In addition, if the electronic timepiece 1B is subjected to exercising while being worn on an arm, a continuous charging state can be detected without the intension of the user. In this case, if the conditions of the aforementioned S103 or S104 are met, the processing of S105 or S106 can be performed.

The persistence time adjusting portion 148 further judges whether or not continuous charging state is detected (S107). When it is judged to be "YES" at S107, the persistence time adjusting portion 148 judges whether or not the count number of the hand shaking amount detection portion 149 has reached the second threshold value or more (S108). When it is judged to be "NO" at S108, the processing is continued after returning to S103.

When it is judged to be "YES" at S108, that is, at a time when the aforementioned count number has reached the second threshold value, the persistence time adjusting portion 148 sets an initial value to the first counter 143A, the second counter 143B, and the third counter 143C and sets the persistence time to 30 days and starts counting (S109). Also, the persistence time adjusting portion 148 sets and displays the charging amount indicator display to a 20 second display corresponding to a persistence time of 30 days (S110). In this embodiment, the second threshold value corresponds to the charging amount (power generation amount) when the electronic timepiece 1B is carried for 7 days. For example, when the first threshold value corresponding to a charging amount of one day is 200 times, the second threshold value is 200 times×7 days=1,400 times. In this case, since it can be judged that the user has an intention to carry and use the device for 7 days or more, the persistence time is upgraded to 30 days, which is the next step from 7 days. Also, the similar processing can be performed when conditions are met by exercise. Also, in the electronic timepiece 1B, although the persistence time is limited to upgrades up to 30 days, when the count number increases when a hand shaking detection state continues, the persistence time can be upgraded to 180, which is the next persistence time.

The persistence time adjusting portion 148 terminates the persistence time adjusting processing up to S103-S110 and transits to a normal operation mode S20 when no continuous charging state is detected at S103 and S107 and when the processing of S110 is performed.

In such an electronic timepiece 1B, similar functions and effects as the aforementioned electronic timepiece 1A can be exerted. That is, since the persistence time is adjusted at the time of resuming the operation based on the count number of the hand shaking detection state corresponding to the carrying amount, the same functions and effects as the aforementioned electronic timepiece 1A can be exerted. Further, by performing an indicator display by the second hand 23 while the electronic timepiece 1B is hand shaken, the user can judge how much persistence time was set by the charging by hand shaking and easily check whether or not the hand shaking operation should be continued.

[Third Embodiment of Portable Electronic Device Having Power Generation Function]

Figure 25:
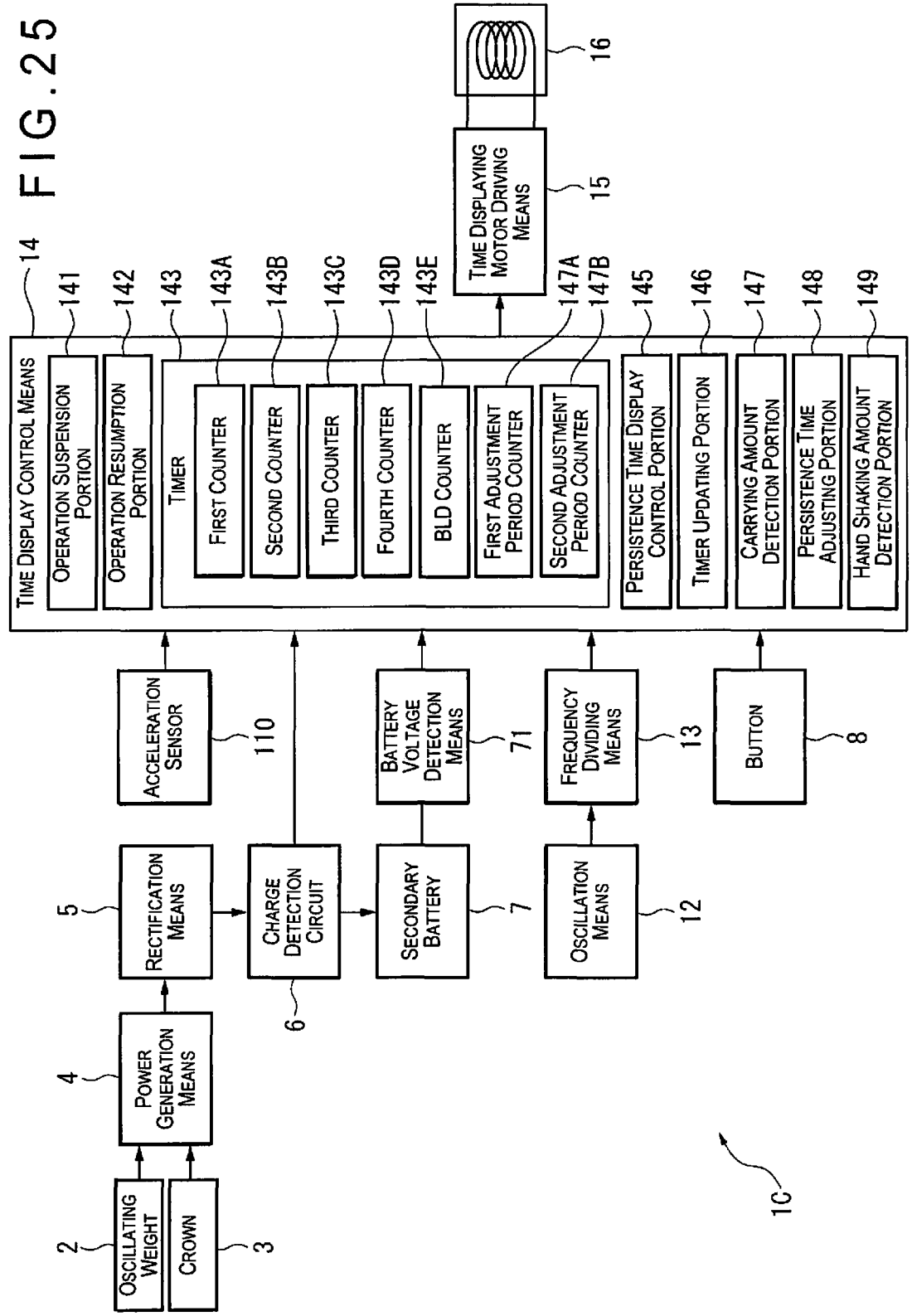
FIG. 25 is a block diagram showing a structure of an electronic timepiece of a third embodiment of a portable electronic device having a power generation function.

Next, a third embodiment of the portable electronic device having a power generation function of the invention will be explained. As shown in FIG. 25, the electronic timepiece 1C of the third embodiment combines the detection process of a carrying amount and the setting process of the persistence time by the detection of the charging state of the aforementioned electronic timepiece 1A and the detection process of the carrying amount and the setting process of the persistence time by the continuous charging detection of the aforementioned electronic timepiece 1B. Therefore, in the electronic timepiece 1C, an acceleration sensor 110 and a hand shaking amount detection portion 149 are added to the aforementioned electronic timepiece 1A.

According to the electronic timepiece 1C, when a user performs a hand shaking operation to unlock the electronic timepiece 1C in a suspended state from the suspension state, the IC suspension state is unlocked by the charge detection and starts a normal operation of pointers. Then, when the count number of the hand shaking detection state has reached the first threshold value, the persistence time adjusting portion 148 upgrades the persistence time to 7 days (the indicator display is 10 seconds). Then, when the electronic timepiece 1C is carried and a state in which the carrying amount for 1 day is detected is detected 7 days, the persistence time adjusting portion 148 upgrades the persistence time to 30 days (the indicator display is 20 seconds).

In this way, if two types of detection methods of the carrying amount are provided, both operations, a case in which power generation is performed by hand shaking detection from the intention of a user and automatic power generation in a normal carrying state, can be appropriately detected and the persistence time adjusting processing at the time of resuming the operation can be appropriately executed. Thus, the convenience can be enhanced.

[Fourth Embodiment of Portable Electronic Device Having Power Generation Function]

Figure 26:
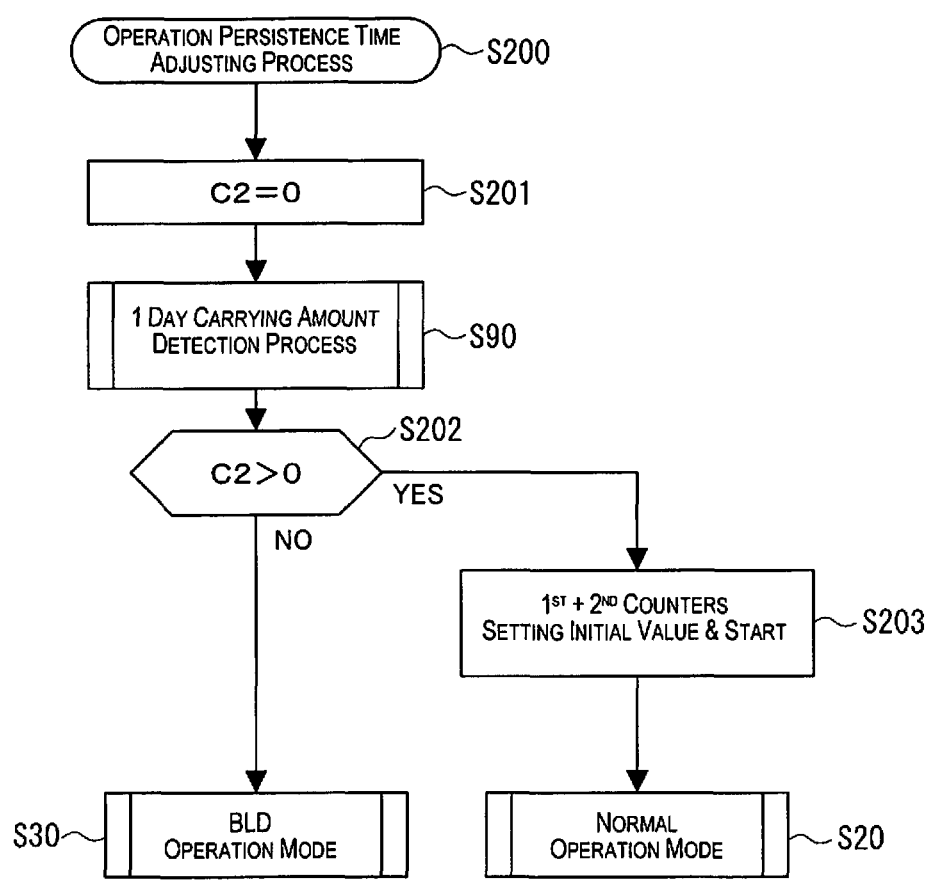
FIG. 26 is a flow chart showing a persistence time adjusting process of an electronic timepiece of a fourth embodiment of a portable electronic device having a power generation function.

Next, a fourth embodiment of a portable electronic device having a power generation function will be explained. In the aforementioned electronic timepieces 1A, 1B, and 1C, the persistence time adjusting portion 148 is configured such that the persistence time is adjustably set to plural steps of 7 days, 30 days, and 180 days. However, in this embodiment, the persistence time is set as one step. That is, the electronic timepiece 1A of the fourth embodiment has the same structure as the aforementioned electronic timepiece 1A, but only the persistence time adjusting process is changed into processing shown in FIG. 26. In the persistence time adjusting processing S200, the persistence time adjusting portion 148 initializes the carrying amount C2 to "0" (S201), and judges whether or not C2 is larger than 0 at a time when the one day carrying amount detection processing S90 is performed (S202). Then, when it is judged to be "YES" at S202, the persistence time adjusting portion 148 sets an initial value to the first counter 143A and the second counter 143B to set the persistence time to 7 days, starts counting (S203), and transits to the normal operation mode S20. On the other hand, when it is judged to be "NO" at S202, the persistence time adjusting portion 148 executes the BLD operation mode S30.

Also in the fourth embodiment, in the normal operation mode, when the voltage of the secondary battery 7 increases due to the charging from the power generation means (unit) 4, a persistence time can be set according to the amount of power generation and the voltage level of the secondary battery 7 by adjusting the persistence time according to the level of the detected voltage Vs. In summary, in the invention, it is enough the persistence time can be extended at the time when it is confirmed that the mode will not transit to a normal operation mode upon a comparatively long persistence time (7 days or more, for example) immediately by a temporary charge detection and that a user is using the electronic timepiece 1A in a continuous carrying state. In addition, when it is judged to be "YES" at S202 in the fourth embodiment, a persistence time can be selected based on the detected voltage Vs at that time.

The invention is not limited to the aforementioned embodiments, and design changes and improvements within the scope of capable of achieving the advantages of the invention are included in the invention. For example, in the aforementioned embodiments, the persistence time adjusted by the persistence time adjusting portion 148 at the time of resuming the operation are the same as the persistence times capable of being set for the normal operation mode, i.e., 1 day, 7 days, 30 days, and 180 days, but the number of steps and values of the adjustable persistence time can be different from those in the normal operation mode. Further, the adjustable persistence time adjustable by the persistence time adjusting portion 148 can be set to 7 days or 15 days, to reduce the steps and set different persistence times. Also, in the persistence time adjusting portion 148, the adjustable persistence time can be adjusted to 7 days, 15 days, 30 days, 60 days, 120 days, and 180 days to increase the steps and set different persistence times.

The aforementioned embodiments, the counters 143A to 143D for counting the persistence time, the counter 147A for the first adjusting time period, and the counter 147B for the second adjusting time period used at the time of operation resumption are constituted by different counters, but it can be realized by using the same counters.

At the time when the persistence time of the normal operation set to the timer 143 according to the detected voltage Vs becomes 0 (zero) hour, a normal operation is suspended and transited to the BLD operation mode, and the operation is suspended when a predetermined time (24 hours in the embodiment) has pass in the BLD operation mode. However, the operation can be suspended at the time when the persistence time of the normal operation becomes 0 (zero) hour, without transiting to the BLD operation mode.

The voltage range for judging the detected voltage Vs is not limited to the first to fourth voltage ranges. The number of the voltage ranges and the specific voltage values set to each voltage range can be arbitrarily set based on the types of the electronic timepieces 1A, 1B, and 1C and the characteristics of the charging means (unit) such as the secondary battery 7. Furthermore, the method for determining the persistence time according to the detected voltage Vs is not limited to setting the voltage range. For example, a formula for calculating the persistence time by substituting the voltage of the detected voltage Vs can be set. Also, counters 143A to 143D corresponding to each voltage range were combined as the timer 143, but a separate counter for timing the persistence time of each voltage range can be used. For example, a counter for timing one day, a counter for timing 7 days, a counter for timing 30 days, and a counter for timing 180 days are prepared, and any one of the counters can be selected and used. Furthermore, the timer 143 can be constituted by one counter constituted so to be able to time a plurality of persistence times.

Also, a persistence time display means (unit) is not limited to a means using a second hand 23, but can display by using pointers exclusively for persistence time display. Furthermore, numbers and indicators can be used for displaying in the display means (unit) such as a liquid crystal display.

As a power generation device 40, other than a hand-winding power generation device and a self-winding power generation device as described in the aforementioned embodiments, various types of power generation devices such as a power generation device using an external alternate-current magnetic field, a solar power generation device, a temperature difference power generation device, etc., can be used. Also, for the electronic timepieces 1A, 1B, and 1C, one type of the various types of the aforementioned power generation devices can be integrated or a plurality of types of power generation device can be combined. Furthermore, the processing of the aforementioned second embodiment can be performed when using an external charger for quick charging. A charger is a device for charging the secondary battery 7 by generating an electric current to the coil 43 of the power generation means (unit) 4 by generating a magnetic field. Therefore, when charging electric currents or charging voltages from the power generation means (unit) 4 are detected and a continuous charging state is detected by detecting the charging electric current or charging voltage, in the same way as in the aforementioned second embodiment, when the charging amount based on the charging time corresponds to one day, the persistence time can be upgraded to 7 days and upgraded to 30 days when corresponding to 7 days.

Further, the invention is not limited for use in a wrist watch and can also be applied to other portable timepieces such as a pocket watch, etc. Furthermore, the invention is not limited to be used in an electronic controlled mechanical timepiece in the aforementioned embodiments, and can also be applied to various types of portable electronic devices such as a portable timepiece, a portable blood pressure manometer, a mobile phone device, a pager, a pedometer, a calculator, a portable personal computer, an electronic notebook, a portable radio, a music box, a metronome, an electric razor, etc. It is especially suited for a portable electronic device equipped with a power generation function and used only when needed, rather than all the time.

What is claimed is:

1. An electronic device having a power generation function, comprising:
   a power generation unit;
   a power storage unit configured to store electric energy generated by the power generation unit;
   a device which is operated by the electric energy stored in the power storage unit;
   a charge detection unit configured to detect a charging state from the power generation unit to the power storage unit;
   a voltage detection unit configured to detect a voltage of the power storage unit;
   a display operation unit configured to instruct a display of an operation persistence time of the device;
   a persistence time display unit configured to display the operation persistence time of the device; and
   an operation control unit configured to control an operation status of the device,
   wherein the operation control unit includes:
   an operation suspension portion configured to control the device into an operation suspension state;
   an operation resuming portion configured to resume an operation of the device when the device is in the suspension state;
   persistence time display control portion configured to operate the persistence time display unit to display the operation persistence time when the display operation unit is operated;
   a timer configured to time the remaining time of the operation persistence time; and
   a timer updating portion configured to update the remaining time of the timer when the charging state is detected by the charge detection unit during an operation of the timer;
   wherein, the operation resuming portion resumes the operation of the device and operates the timer by setting a persistence time according to the detected voltage when a detected voltage detected by the voltage detection unit is higher than an operation resuming voltage at a time of detecting the charging state by the charge detection unit,
   wherein the suspension portion controls the device into the operation suspension state when the remaining time becomes 0 (zero) hour,
   wherein, the operation duration display control portion displays the operation persistence time according to the detected voltage detected by the voltage detection unit by the persistence time display unit and operates the timer by setting the persistence time when the display operation unit is operated; and
   wherein the timer updating portion updates the remaining time of the timer to the operation persistence time according to the detected voltage when the operation persistence time according to the detected voltage detected by the voltage detection unit is longer than the remaining time of the timer in operation, and operates the timer in operation as it is when the operation persistence time according to the detected voltage is not longer than the remaining time of the timer in operation.

2. The electronic device having a power generation function according to claim 1,
wherein the operation persistence time is set every plural voltage ranges preliminarily sectioned, and
wherein the operation persistence time according to the detected voltage is a persistence time set in a voltage corresponding to the detected voltage.

3. The electronic device having a power generation function according to claim 2,
wherein the timer includes a plurality of timers corresponding to the plural voltage ranges, and
wherein, when setting the persistence time according to the detected voltage, the persistence time is set by combining the timer corresponding to a voltage range in which the detected voltage is included and the timer corresponding to a voltage range lower than the voltage range including the detected voltage.

4. The electronic device having a power generation function according to claim 2,
wherein the timer is equipped with a timer for timing a remaining time of a normal operation mode and a timer for timing a remaining time of a warning operation mode which issues a warning of a low voltage state,
wherein the operation control unit operates the device in the warning operation mode when the remaining time of the timer for timing the remaining time of the normal operation mode becomes 0 (zero) hour, and
wherein the operation suspension portion controls the device into the operation suspension state when the timer for timing the remaining time of the warning mode becomes 0 (zero) hour.

5. The electronic device having a power generation function according to claim 1,
wherein the device is a time display unit configured to display a time, and
wherein the operation control unit continues the operation of the timer even when it becomes a time correction state for correcting a time to be displayed by the time display unit.

6. A control method of an electronic device having power generating functions, the electronic device including
a power generation unit,
a power storage unit configured to store electric energy generated by the power generation unit,
a device which is operated by the electric energy stored in the electric storage unit,
a charge detection unit configured to detect a charging state in which a charge is supplied from the power generation unit to the power storage unit,
a voltage detection unit configured to detect a voltage of the power storage unit,
a display operation unit configured to instruct a display of an operation persistence time of the device,
a persistence time display unit configured to display the operation persistence time of the device, and
an operation control unit configured to control the operation status of the device; the operation control unit having a timer being a counter configured to count a remaining time of the operation persistence time, the control method comprising:
when the display operation unit is operated, displaying the operation persistence time according to the detected voltage detected by the voltage detection unit by the persistence time display portion and operating the timer by setting the operation persistence time;
performing timer updating in response to detecting, by the charge detection unit, that the charge is supplied while the timer is counting the remaining time of the operation persistence time, the timer updating including updating the remaining time of the timer to an operation persistence time according to the detected voltage when the persistence time according to the detected voltage detected by the voltage detection unit is longer than the remaining time of the timer in operation, and including operating the timer in operation as it is when the operation persistence time according to the detected voltage is equal to or less than the remaining time of the timer in operation;
controlling the device into an operation suspension state when the remaining time of the timer becomes 0 (zero); and
when the detected voltage detected by the voltage detection unit is larger than an operation resuming voltage at a time of detecting the charging state by the charge detection unit, resuming the operation of the device and operating the timer by setting the persistence time according to the detected voltage.

7. A portable electronic device having a power generation function for portable use, comprising:
a power generation unit;
a power storage unit configured to store electric energy generated by the power generation unit;
a device which is operated by the electric energy stored in the electric storage unit;
a charge detection unit configured to detect a charging state from the power generation unit to the power storage unit; and
an operation control unit configured to control the operation state of the device,
the operation control unit including:
an operation suspension portion configured to control the device into an operation suspension status,
an operation resumption portion configured to resume an operation of the device when the device is in the suspension status,
a timer configured to set the persistence time of the device and time a remaining time of the persistence time,
a carrying amount detection portion configured to detect a carrying amount at the time of resuming the operation of the device, the carrying amount being a parameter corresponding to a length of time in which the portable electronic device is being carried by a user and
a persistence time adjusting portion configured to adjust the persistence time of the timer at the time of resuming the operation of the device,
the operation suspension portion controlling the device into the operation suspension status when the remaining time becomes 0 (zero),
the operation resumption portion resuming the operation of the device when the charging state is detected by the charge detection unit, and
the persistence time adjusting portion setting the persistence time to the timer in response to the carrying amount detected by the carrying amount detection portion becoming a predetermined value.

8. The portable electronic device having a power generation function according to claim 7, further comprising a voltage detection unit configured to detect a voltage of the power storage unit,
wherein the persistence time adjusting portion sets the operation persistence time to be set to the timer into plural steps based on the detected voltage detected by the voltage detection unit and the carrying amount.

9. The portable electronic device having a power generation function according to claim 7, further comprising voltage detection unit configured to detect a voltage of the power storage unit,
wherein the operation persistence time is set every plural voltage ranges preliminarily sectioned,
wherein, the operation resumption portion sets the timer to a shortest persistence time when the detected voltage detected by the voltage detection unit at a time of detecting the charging state by the charge detection unit corresponds to a first voltage range corresponding to the shortest persistence time, and operates the persistence time adjusting portion when the detected voltage corresponds to a voltage range higher than the first voltage range.

10. The portable electronic device having a power generation function according to claim 7,
wherein, when one days is divided into plural time periods from the operation resumption time as starting point, and the charging state is detected plural time by the charge detection unit in the time period, the carrying amount detection portion sets the time period as a carrying state detection time period when the charging state is detected plural time in the time period by the charge detection unit, and judges that there is one day's carrying amount when there exists more than a predetermined number of carrying state detection time period in one day,
wherein the persistence time adjusting portion sets the persistence time to the timer when the number of days of the carrying amount reaches a predetermined value.

11. The portable electronic device having a power generation function according to claim 7,
wherein the charge detection unit is constituted so as to detect a continuous charging state from the power generating unit to the power storage unit, and
wherein the carrying amount detection portion detects the carrying amount based on a length of the detected time of the continuous charging state.

12. The portable electronic device having a power generation function according to claim 7,
wherein the timer is equipped with a timer configured to time the remaining time of a normal operation mode and a timer configured to time the remaining time of a warning operation mode for which issues a warning of a low voltage state,
wherein the operation control unit operates the device in the warning mode when the timer for timing the remaining time of the normal operation mode becomes 0 (zero) hour and when the carrying amount detected by the carrying amount detection portion is less than a predetermined value,
wherein the operation suspension portion controls the device into the operation suspension status when the remaining time of the timer for timing the remaining time of the warning mode becomes 0 (zero) hour, and
wherein the operation resumption portion operates the persistence time adjusting portion when the charging state is detected in the warning operation mode.

13. The portable electronic device having a power generation function according to claim 7,
wherein the device is a time displaying unit configured to display a time, and
wherein the operation control unit continues the operation of the timer even when it becomes a time correction state in which a time to be displayed by the time display unit is to be corrected.

14. A control method of a portable electronic device having power generation function for portable use, the portable electronic device comprising:
a power generation unit;
a power storage unit configured to store electric energy generated by the power generation unit;
a device which is operated by the electric energy stored in the electric storage unit;
a charge detection unit configured to detect a charging state from the power generation unit to the power storage unit; and
an operation control unit configured to control the operation state of the device,
the operation control unit including a timer configured to set the persistence time and configured to time a remaining time thereof, and
the control method comprising:
controlling the device into an operation suspension state when the remaining time of the timer becomes 0 (zero);
resuming the operation of the device when the charging state is detected by the charge detection unit;
detecting a carrying amount at the time of resuming the operation of the device, the carrying amount being a parameter corresponding to a length of time in which the portable electronic device is being carried by a user; and
setting the persistence time to the timer in response to the carrying amount becoming a predetermined value by detecting the carrying amount.

* * * * *